US010432885B2

(12) United States Patent
Jeong et al.

(10) Patent No.: US 10,432,885 B2
(45) Date of Patent: *Oct. 1, 2019

(54) IMAGE DISPLAY APPARATUS FOR A PLURALITY OF SNSS AND METHOD FOR OPERATING THE SAME

(71) Applicant: LG ELECTRONICS INC., Seoul (KR)

(72) Inventors: Youngho Jeong, Seoul (KR); Jeonghee Ahn, Seoul (KR)

(73) Assignee: LG ELECTRONICS INC., Seoul (KR)

(*) Notice: Subject to any disclaimer, the term of this patent is extended or adjusted under 35 U.S.C. 154(b) by 43 days.

This patent is subject to a terminal disclaimer.

(21) Appl. No.: 15/154,421

(22) Filed: May 13, 2016

(65) Prior Publication Data

US 2016/0255297 A1 Sep. 1, 2016

Related U.S. Application Data

(63) Continuation of application No. 12/972,357, filed on Dec. 17, 2010, now Pat. No. 9,363,470.
(Continued)

(30) Foreign Application Priority Data

Jun. 17, 2010 (KR) ........................ 10-2010-0057640

(51) Int. Cl.
*H04N 7/14* (2006.01)
*H04N 5/44* (2011.01)
(Continued)

(52) U.S. Cl.
CPC ......... *H04N 5/4401* (2013.01); *G06F 3/0487* (2013.01); *H04L 67/02* (2013.01);
(Continued)

(58) Field of Classification Search
CPC ............... H04N 5/4401; H04N 5/4403; H04N 21/6175; H04N 21/4788
See application file for complete search history.

(56) References Cited

U.S. PATENT DOCUMENTS 7,143,428 B1 11/2006 Bruck et al.
7,552,463 B2 6/2009 Ebisu et al.
(Continued)

FOREIGN PATENT DOCUMENTS

EP 1 176 817 A2 1/2002
KR 10-2002-0031873 A 5/2002
(Continued)

OTHER PUBLICATIONS

The Lync Team Blog (published on Apr. 11, 2008).*
(Continued)

*Primary Examiner* — Rinna Yi
(74) *Attorney, Agent, or Firm* — Birch, Stewart, Kolasch & Birch, LLP

(57) ABSTRACT

An image display apparatus is discussed. The apparatus includes a tuner; a display; an interface configured to receive a signal from a remote controller; and a controller configured to: display a first identification (ID) information of a first social network service (SNS) and a second ID information of a second SNS on the display in response to a first input from the remote controller, execute an SNS application in response to a second input from the remote controller for selecting an SNS application item, and display a broadcast image based on a broadcast signal received from the tuner on a first area of the display and an object corresponding to the SNS application on a second area of the display, wherein the object is related to the first SNS and the second SNS.

12 Claims, 43 Drawing Sheets

Related U.S. Application Data

(60) Provisional application No. 61/355,962, filed on Jun. 17, 2010.

(51) Int. Cl.

| | | |
|---|---|---|
| *G06F 3/0487* | (2013.01) | |
| *H04N 21/2665* | (2011.01) | |
| *H04N 21/2668* | (2011.01) | |
| *H04N 21/431* | (2011.01) | |
| *H04N 21/4788* | (2011.01) | |
| *H04N 21/482* | (2011.01) | |
| *H04N 21/61* | (2011.01) | |
| *H04L 29/08* | (2006.01) | |
| *H04N 21/2362* | (2011.01) | |
| *H04N 21/258* | (2011.01) | |

(52) U.S. Cl.
CPC .......... *H04N 5/4403* (2013.01); *H04N 7/141* (2013.01); *H04N 21/2665* (2013.01); *H04N 21/2668* (2013.01); *H04N 21/4312* (2013.01); *H04N 21/4788* (2013.01); *H04N 21/482* (2013.01); *H04N 21/6125* (2013.01); *H04N 21/6175* (2013.01); *H04N 21/2362* (2013.01); *H04N 21/25875* (2013.01); *H04N 2005/441* (2013.01)

(56) References Cited

U.S. PATENT DOCUMENTS

| | | | |
|---|---|---|---|
| 7,673,327 B1 | 3/2010 | Polis et al. | |
| 2001/0027475 A1 | 10/2001 | Givol et al. | |
| 2002/0005910 A1* | 1/2002 | Kikinis | G06F 3/037 348/601 |
| 2002/0042925 A1 | 4/2002 | Ebisu et al. | |
| 2004/0117831 A1 | 6/2004 | Ellis et al. | |
| 2005/0149854 A1 | 7/2005 | Pennell et al. | |
| 2005/0204389 A1 | 9/2005 | Proehl et al. | |
| 2005/0231760 A1* | 10/2005 | Minato | G06F 21/31 358/1.15 |
| 2006/0005222 A1 | 1/2006 | Sato | |
| 2006/0048179 A1 | 3/2006 | Kortum et al. | |
| 2006/0136974 A1 | 6/2006 | Lee et al. | |
| 2007/0094352 A1 | 4/2007 | Choi et al. | |
| 2007/0107019 A1 | 5/2007 | Romano et al. | |
| 2008/0199144 A1* | 8/2008 | Hailey | G06F 3/04817 386/297 |
| 2009/0144237 A1 | 6/2009 | Branam et al. | |
| 2009/0313660 A1 | 12/2009 | Ni et al. | |
| 2010/0011299 A1* | 1/2010 | Brodersen | H04L 67/36 715/740 |
| 2010/0011394 A1 | 1/2010 | Lee et al. | |
| 2010/0011425 A1 | 1/2010 | Eyal | |
| 2010/0135781 A1 | 6/2010 | Goto et al. | |
| 2010/0235781 A1 | 9/2010 | Friedlander et al. | |
| 2011/0050477 A1* | 3/2011 | Choi | G06F 3/0346 341/176 |

FOREIGN PATENT DOCUMENTS

| | | |
|---|---|---|
| KR | 10-2010-0006846 A | 1/2010 |
| WO | WO 98/00976 A1 | 1/1998 |

OTHER PUBLICATIONS

Connect to Live Meeting via Office Communicator (published on Mar. 3, 2008) http://blogs.technet.com/b/lync/archive/2008/03/03/connect-to-live-meeting-via-office-communicator.aspx.

Digsby does Instant Messaging, Email, and Social Networking (posted in May 8, 2008) http://funkrocks.com/2008/05/08/digsby-does-instant-messaging-email-and-social-networking/.

IM Plus All-in-One Mobile Messenger (posted in Oct. 11, 2008) http://www.noeman.org/gsm/mobile/69343-im-plus-all-one-mobile-messenger-v6-0-2-blackberry-rimpda.h.

Kee Pass—Never Remember a Password Again (published on Apr. 2, 2009) http://web.archive.org/web/20090928010329/http://www.tipsfor.us/2008/09/20/keepass-never-remember-a.

Nimbuzz VOiP app on Apple App Store (published on Nov. 30, 2008) http://blog.tmcnet.com/blog/tom-keating/voip/nimbuzz-voip-app-on-apple-app-store.asp.

Social TV start-up Boxee launches set-top box (published on Dec. 8, 2009) http://www.theguardian.com/technology/blog/2009/dec/08/television-startups.

* cited by examiner

FIG. 20
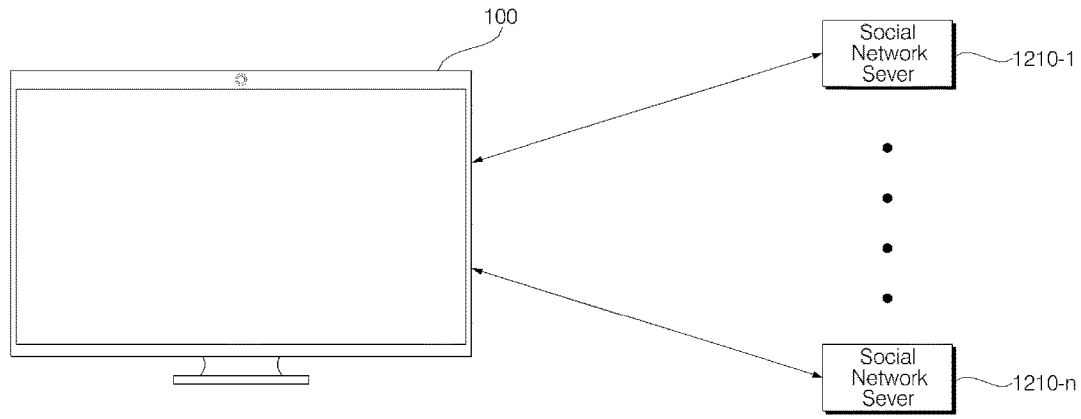
FIG. 21
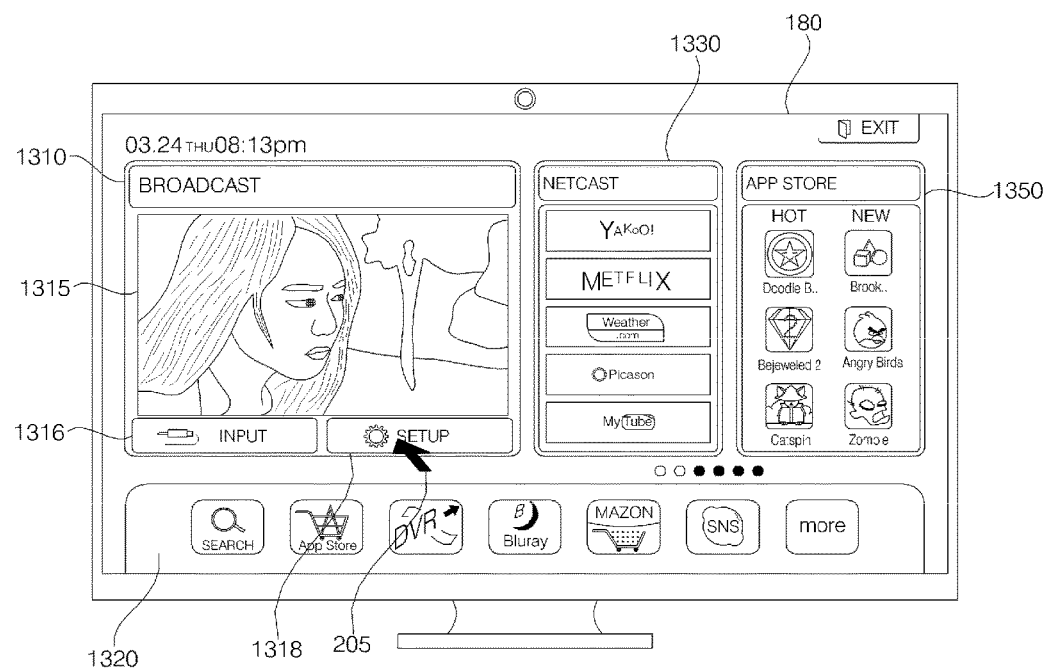
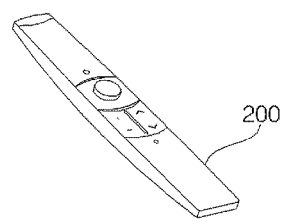

FIG. 23
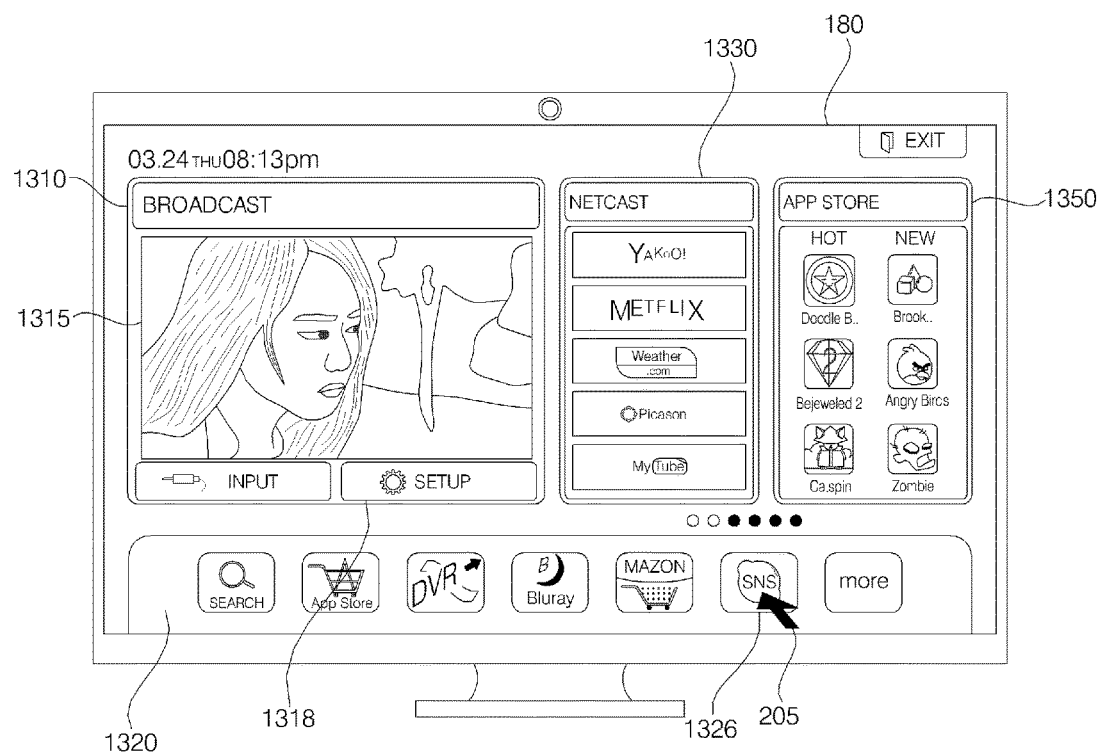
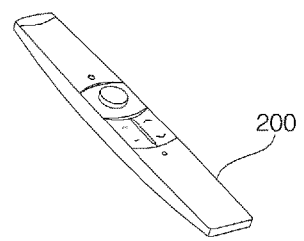

FIG. 31
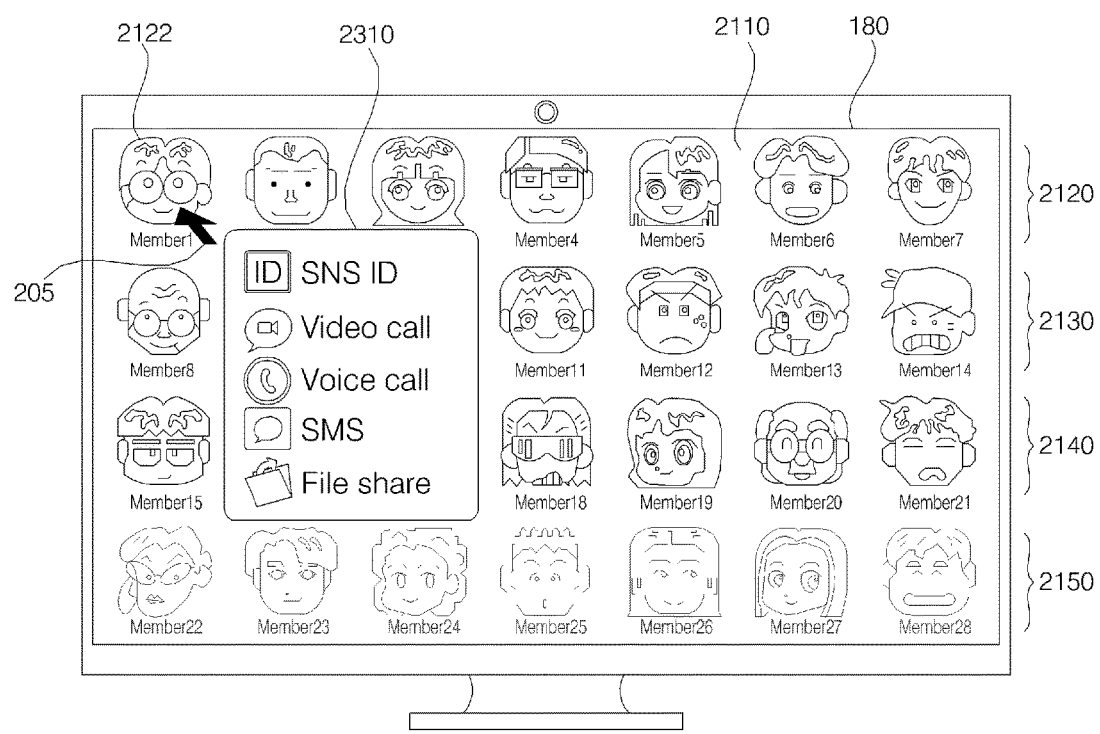
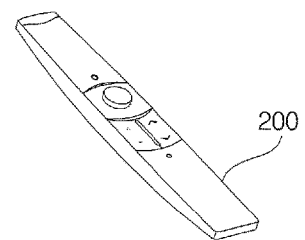

FIG. 32
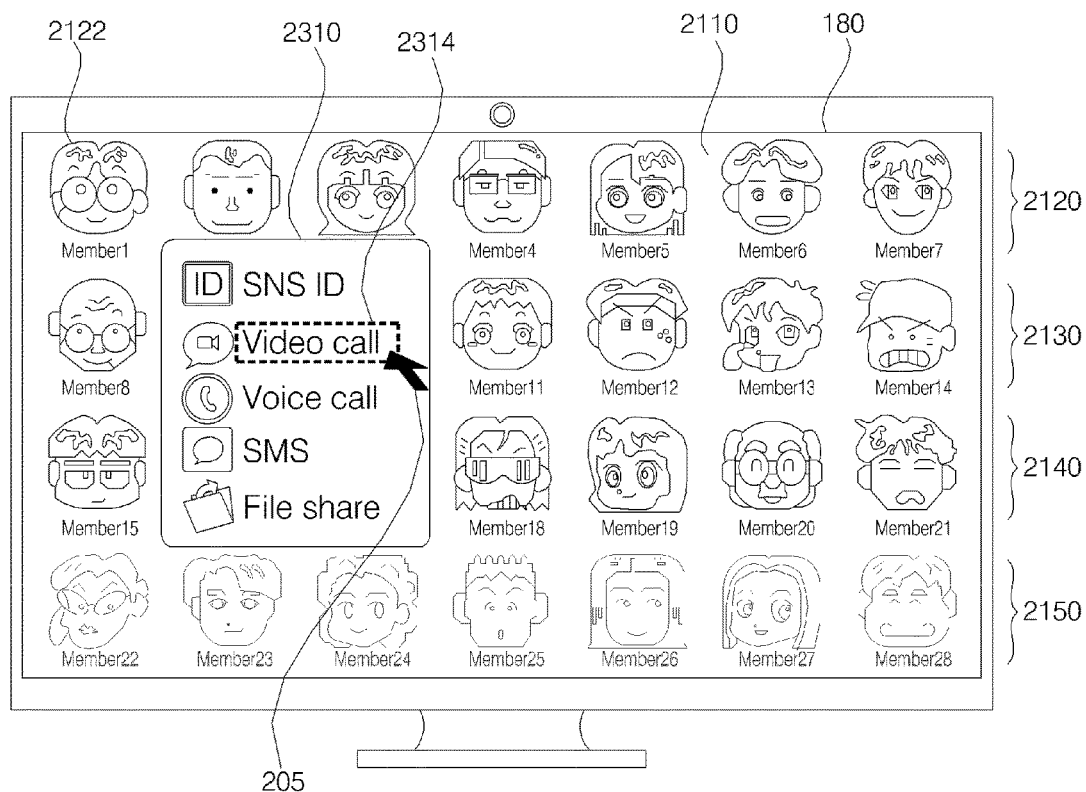
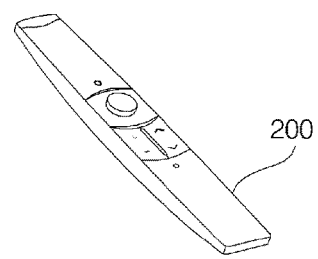

FIG. 34
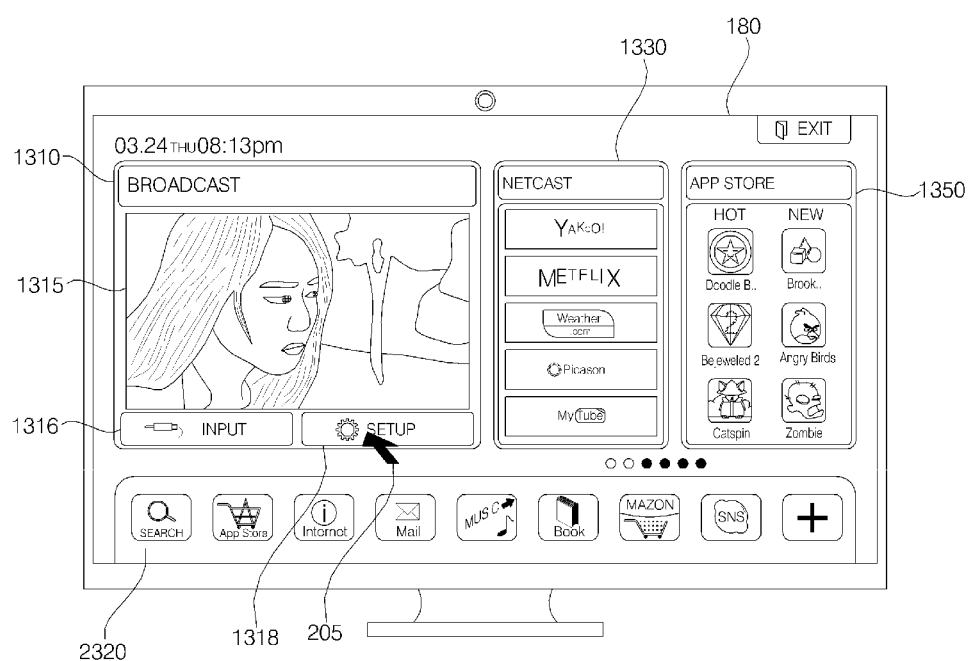
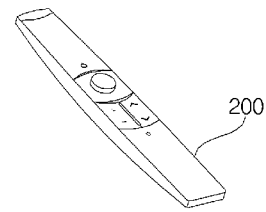

FIG. 36
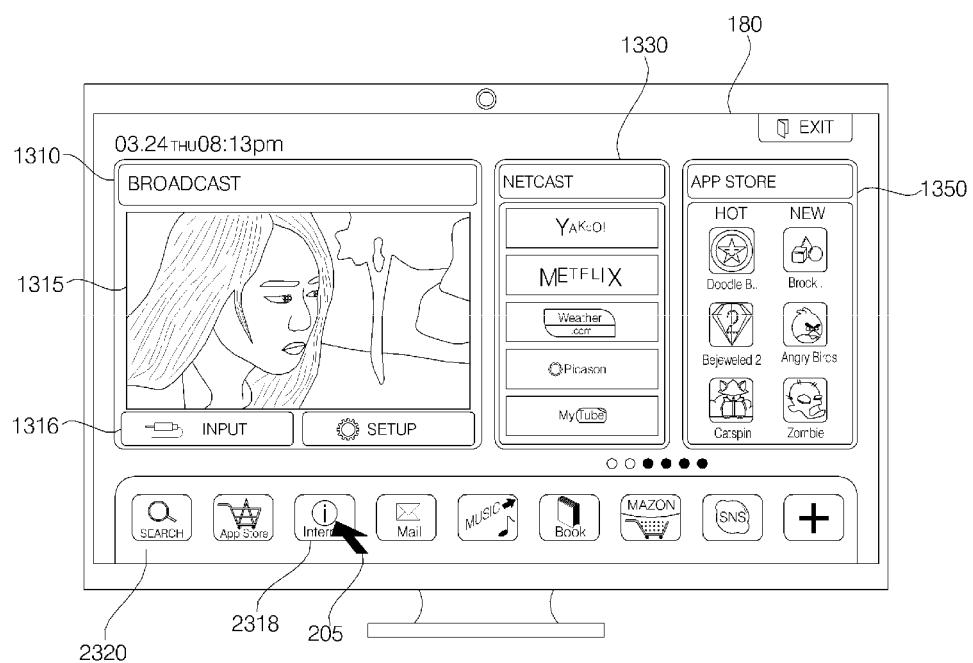
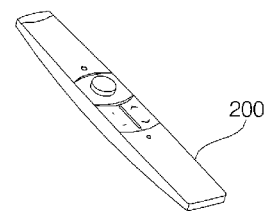

FIG. 37
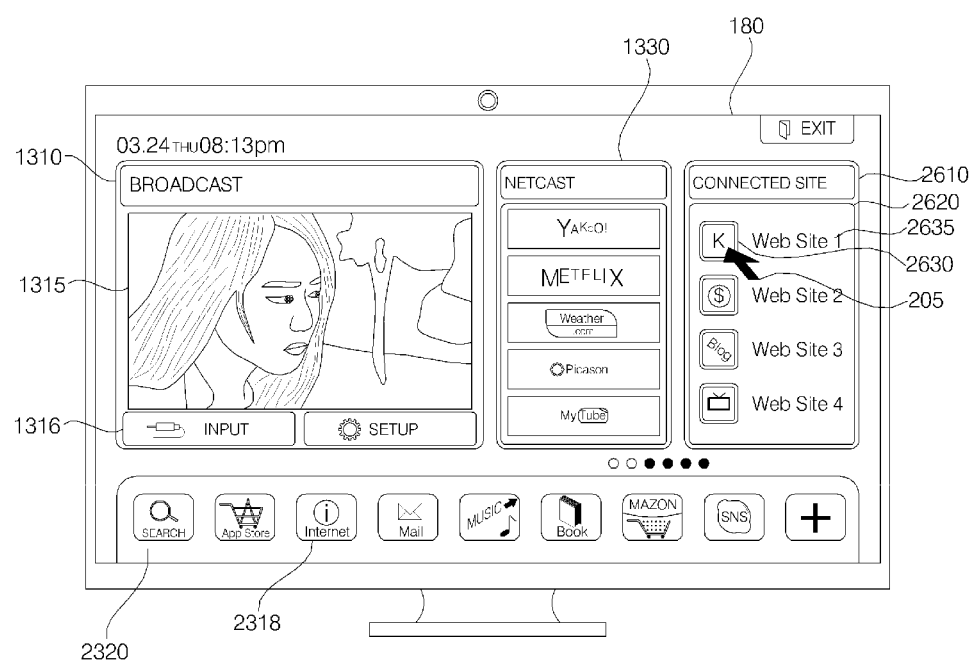
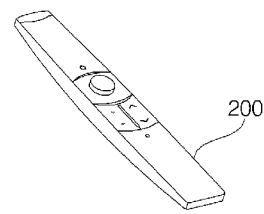

FIG. 40
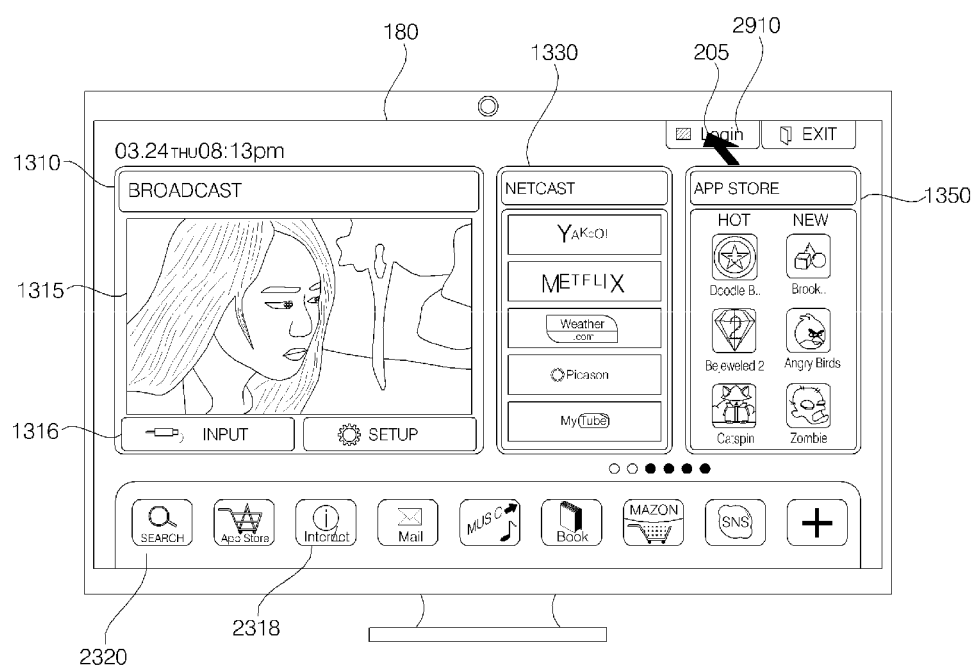
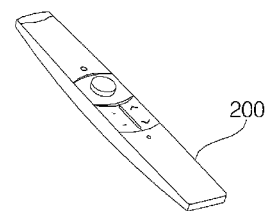

FIG. 42
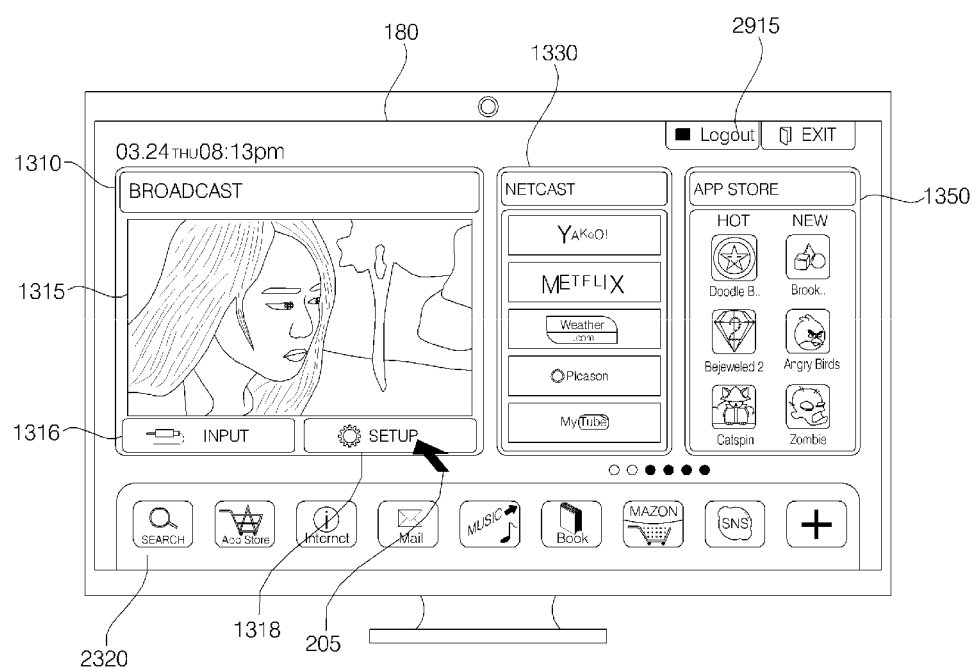
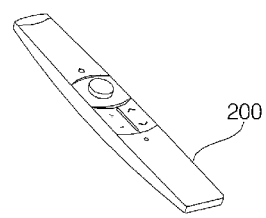

FIG. 44
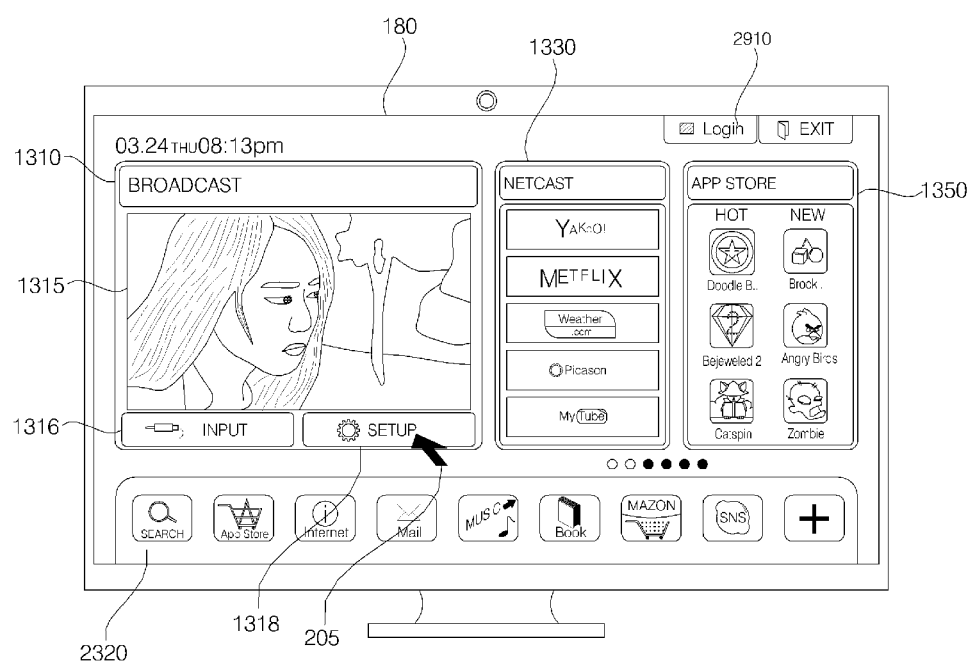
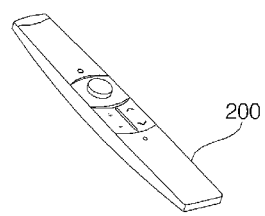

IMAGE DISPLAY APPARATUS FOR A PLURALITY OF SNSS AND METHOD FOR OPERATING THE SAME

CROSS-REFERENCE TO RELATED APPLICATION

This application is a Continuation of co-pending U.S. patent application Ser. No. 12/972,357 filed on Dec. 17, 2010, which in turn claims the benefit of Korean Patent Application No. 10-2010-0057640, filed on Jun. 17, 2010 in the Korean Intellectual Property Office and the benefit of U.S. Provisional Application No. 61/355,962 filed on Jun. 17, 2010 in the USPTO. The entire contents of all these applications are incorporated herein by reference.

BACKGROUND OF THE INVENTION

Field of the Invention

The present invention relates to an image display apparatus and a method for operating the same, and more particularly, to an image display apparatus and a method for operating the same, which increase user convenience.

Description of the Related Art

An image display apparatus has a function of displaying images to a user. The image display apparatus can display a broadcast program selected by the user on a display from among broadcast programs transmitted from broadcasting stations. The recent trend in broadcasting is a worldwide shift from analog broadcasting to digital broadcasting.

As it transmits digital audio and video signals, digital broadcasting offers many advantages over analog broadcasting, such as robustness against noise, less data loss, ease of error correction, and the ability to provide high-definition, clear images. Digital broadcasting also allows interactive viewer services, compared to analog broadcasting.

SUMMARY OF THE INVENTION

Therefore, the present invention has been made in view of the above problems, and it is an object of the present invention to provide an image display apparatus and a method for operating the same, which can increase user convenience.

It is another object of the present invention to provide an image display apparatus and a method for operating the same, which can display a plurality of social network services.

It is another object of the present invention to provide an image display apparatus and a method for operating the same, which can simply access a plurality of Web sites.

It is a further object of the present invention to provide an image display apparatus and a method for operating the same, which can provide various user interfaces.

In accordance with an aspect of the present invention, the above and other objects can be accomplished by the provision of a method for operating an image display apparatus, including storing a Web site list including a plurality of Web sites and login information for the Web sites, connecting to servers of at least two of the stored Web sites using the stored login information, and displaying a list of the connected Web sites or Web pages of the connected Web sites on at least a part of a display.

In accordance with another aspect of the present invention, there is provided a method for operating an image display apparatus, including displaying, upon receipt of an application menu display input, an application menu on at least a part of a display, selecting, upon receipt of a Social Network Service (SNS) selection input, an SNS application in the application menu, connecting to servers of a plurality of SNSs using pre-stored login information for the SNSs, and displaying objects representing users or electronic devices subscribed to the plurality of SNSs on at least a part of the display.

In accordance with another aspect of the present invention, there is provided a method for operating an image display apparatus, including connecting to servers of a plurality of SNSs, and displaying objects representing users or electronic devices subscribed to the plurality of SNSs on at least a part of the display. Each of the objects includes an icon representing an SNS subscribed to by a user or electronic device represented by the object.

In accordance with a further aspect of the present invention, there is provided an image display apparatus including a display for displaying an application menu on at least a part of a display, a memory for storing login information for a plurality of SNSs, a network interface for transmitting or receiving data to or from a network, and a controller for selecting, upon receipt of an SNS application selection input, an SNS application in the application menu, controlling connection to servers of a plurality of SNSs through the network interface, and controlling display of objects representing users or electronic devices subscribed to the plurality of SNSs on at least a part of the display.

In accordance with a further aspect of the present invention, there is provided a method, computer program product and apparatus for operating an image display apparatus. The method includes: simultaneously displaying, on a display of the image display apparatus, a broadcast image and images corresponding to Web sites connected to the image display apparatus. The connected Web sites are at least a subset of a list of Web sites stored within the image display device. The connected Web sites are connected to the image display apparatus based on corresponding Web site login information stored within the image display device. The Web site login information includes a corresponding Web site user identification (ID) and Web site password.

BRIEF DESCRIPTION OF THE DRAWINGS

The above and other objects, features and other advantages of the present invention will be more clearly understood from the following detailed description taken in conjunction with the accompanying drawings, in which:

FIGS. 20 to 45 are views referred to for describing the method for operating an image display apparatus illustrated in FIG. 19.

DETAILED DESCRIPTION OF THE PREFERRED EMBODIMENTS

Embodiments of the present invention will be described below with reference to the attached drawings.

The terms "module" and "unit" used to signify components are used herein to help the understanding of the components and thus they should not be considered as having specific meanings or roles. Accordingly, the terms "module" and "unit" may be used interchangeably.

An image display apparatus as set forth herein is an intelligent image display apparatus equipped with a computer support function in addition to a broadcast reception function, for example. Thus the image display apparatus may have user-friendly interfaces such as a handwriting input device, a touch screen, or a pointing device. Further, because the image display apparatus supports wired or wireless Internet, it is capable of e-mail transmission/reception, Web browsing, banking, gaming, etc. by connecting to the Internet or a computer. To implement these functions, the image display apparatus may operate based on a standard general-purpose Operating System (OS).

Various applications can be freely added to or deleted from, for example, a general-purpose OS kernel in the image display apparatus according to the present invention. Therefore, the image display apparatus may perform a number of user-friendly functions. The image display apparatus may be a network TV, a Hybrid broadcast broadband TV (HbbTV), a smart TV, etc. for example. The image display apparatus is applicable to a smart phone, as needed.

Embodiments of the present invention will be described in detail with reference to the attached drawings, but it should be understood that they are merely illustrative of the present invention and should not be interpreted as limiting the scope of the present invention.

In addition, although the terms used in the present invention are selected from generally known and used terms, some of the terms mentioned in the description of the present invention, the detailed meanings of which are described in relevant parts of the description herein, have been selected by the applicant at his or her discretion. Furthermore, the present invention must be understood, not simply by the actual terms used but by the meanings of each term lying within.

Figure 1:
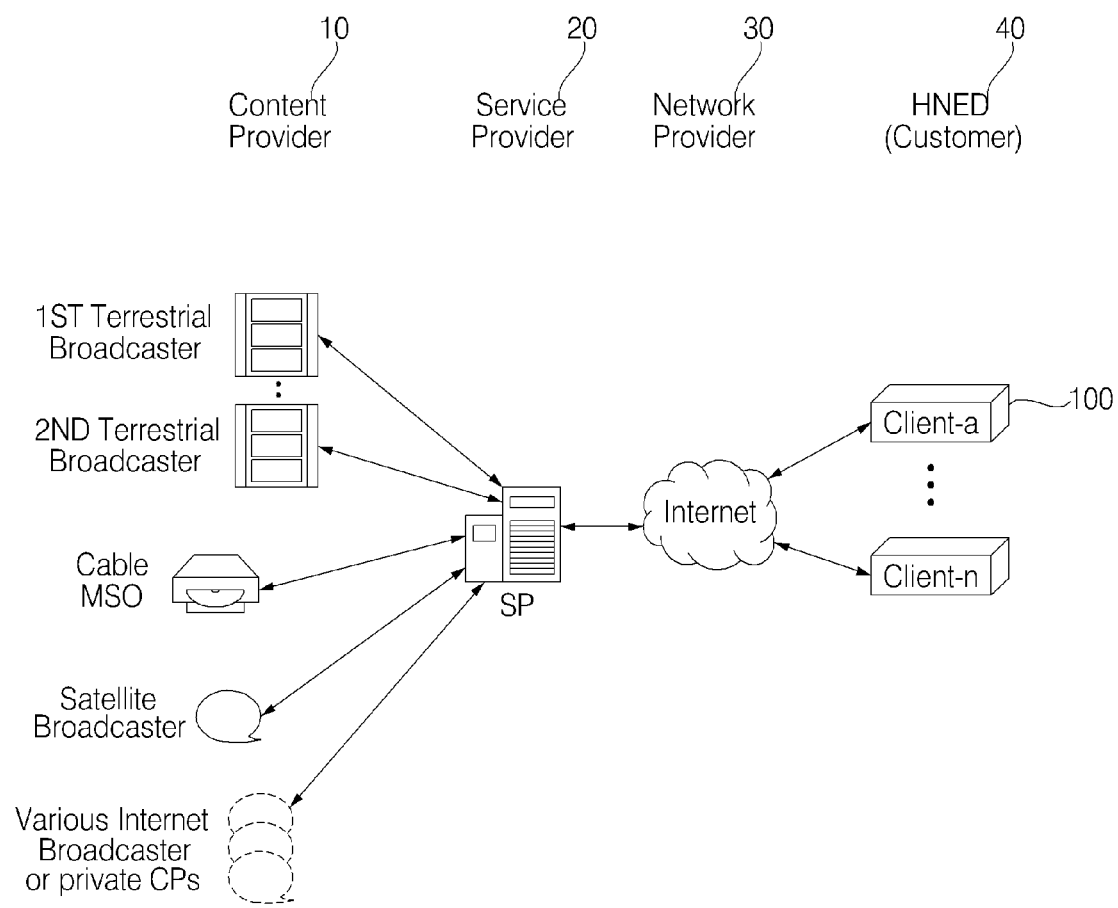
FIG. 1 illustrates the overall configuration of a broadcasting system including an image display apparatus according to an embodiment of the present invention.

FIG. 1 illustrates the overall configuration of a broadcasting system including an image display apparatus according to an embodiment of the present invention.

Referring to FIG. 1, the broadcasting system may include a Content Provider (CP) 10, a Service Provider (SP) 20, a Network Provider (NP) 30, and a Home Network End Device (HNED) 40. The HNED 40 corresponds to, for example, a client 100 which is an image display apparatus according to an embodiment of the present invention. As stated before, the image display apparatus may be a network TV, a smart TV, an Internet Protocol TV (IPTV), etc.

The CP 10 creates and provides content. The CP 10 may be, for example, a terrestrial broadcaster, a cable System Operator (SO) or Multiple System Operator (MSO), a satellite broadcaster, or an Internet broadcaster, as illustrated in FIG. 1.

Besides broadcast content, the CP 10 may provide various applications, which will be described later in detail.

The SP 20 may provide content received from the CP 10 in a service package. For instance, the SP 20 may package first terrestrial broadcasting, second terrestrial broadcasting, cable broadcasting, satellite broadcasting, Internet broadcasting, and applications and provide the package to users.

The SP 20 may unicast or multicast a service to the client 100. Unicast is a form of transmission in which information is sent from only one transmitter to only one receiver. In other words, unicast transmission is point-to-point, involving two nodes only. In an example of unicast transmission, upon receipt of a request for data from a receiver, a server transmits the data to only one receiver. Multicast is a type of transmission or communication in which a transmitter transmits data to a group of receivers. For example, a server may transmit data to a plurality of pre-registered receivers at one time. For multicast registration, the Internet Group Management Protocol (IGMP) may be used.

The NP 30 may provide a network over which a service is provided to the client 100. The client 100 may construct a home network and receive a service over the home network.

Content transmitted in the above-described broadcasting system may be protected through conditional access or content protection. CableCard and Downloadable Conditional Access System (DCAS) are examples of conditional access or content protection.

The client 100 may also transmit content over a network. In this case, the client 100 serves as a CP and thus the CP 10 may receive content from the client 100. Therefore, an interactive content service or data service can be provided.

Figure 2:
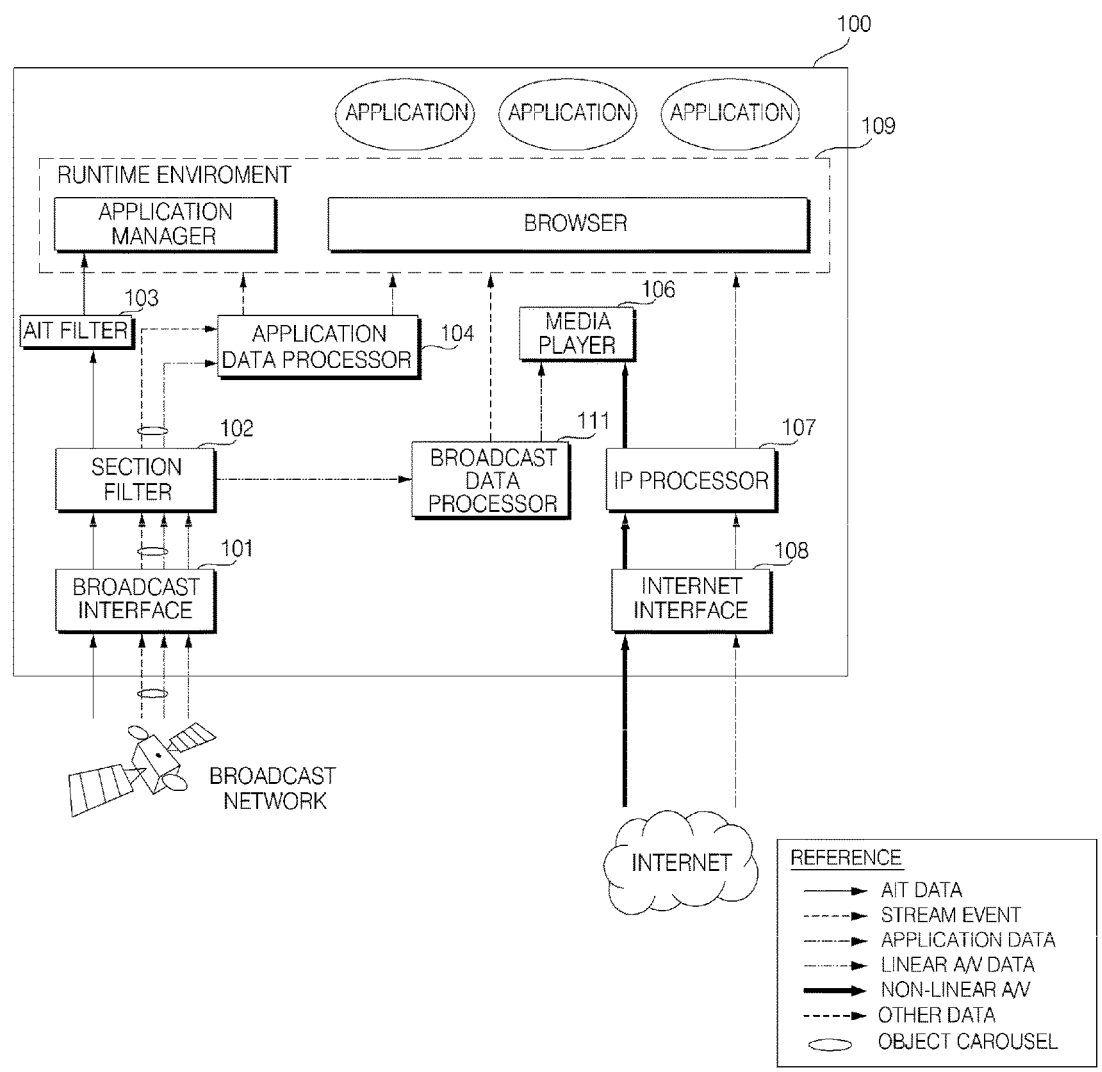
FIG. 2 illustrates the overall configuration of a broadcasting system including an image display apparatus according to another embodiment of the present invention.

FIG. 2 illustrates the overall configuration of a broadcasting system including an image display apparatus according to another embodiment of the present invention.

Referring to FIG. 2, the image display apparatus 100 according to another embodiment of the present invention is connected to a broadcast network and the Internet. The image display apparatus 100 is, for example, a network TV, a smart TV, an HbbTV, etc.

The image display apparatus 100 includes, for example, a broadcast interface 101, a section filter 102, an Application Information Table (AIT) filter 103, an application data processor 104, a broadcast data processor 111, a media player 106, an IP processor 107, an Internet interface 108, and a runtime module 109.

The image display apparatus 100 receives AIT data, real-time broadcast content, application data, and stream events through the broadcast interface 101. The real-time broadcast content may be referred to as linear Audio/Video (A/V) content.

The section filter 102 performs section filtering on the four types of data received through the broadcast interface 101, and outputs the AIT data to the AIT filter 103, the linear A/V content to the broadcast data processor 111, and the stream events and application data to the application data processor 104.

Meanwhile, the image display apparatus 100 receives non-linear A/V content and application data through the Internet interface 108. The non-linear A/V content may be, for example, a Content On Demand (CoD) application.

The non-linear A/V content and the application data are transmitted to the media player 106 and the runtime module 109, respectively.

The runtime module 109 includes, for example, an application manager and a browser as illustrated in FIG. 2. The application manager controls the life cycle of an interactive application using the AIT data, for example. The browser displays and processes the interactive application.

Figure 3:
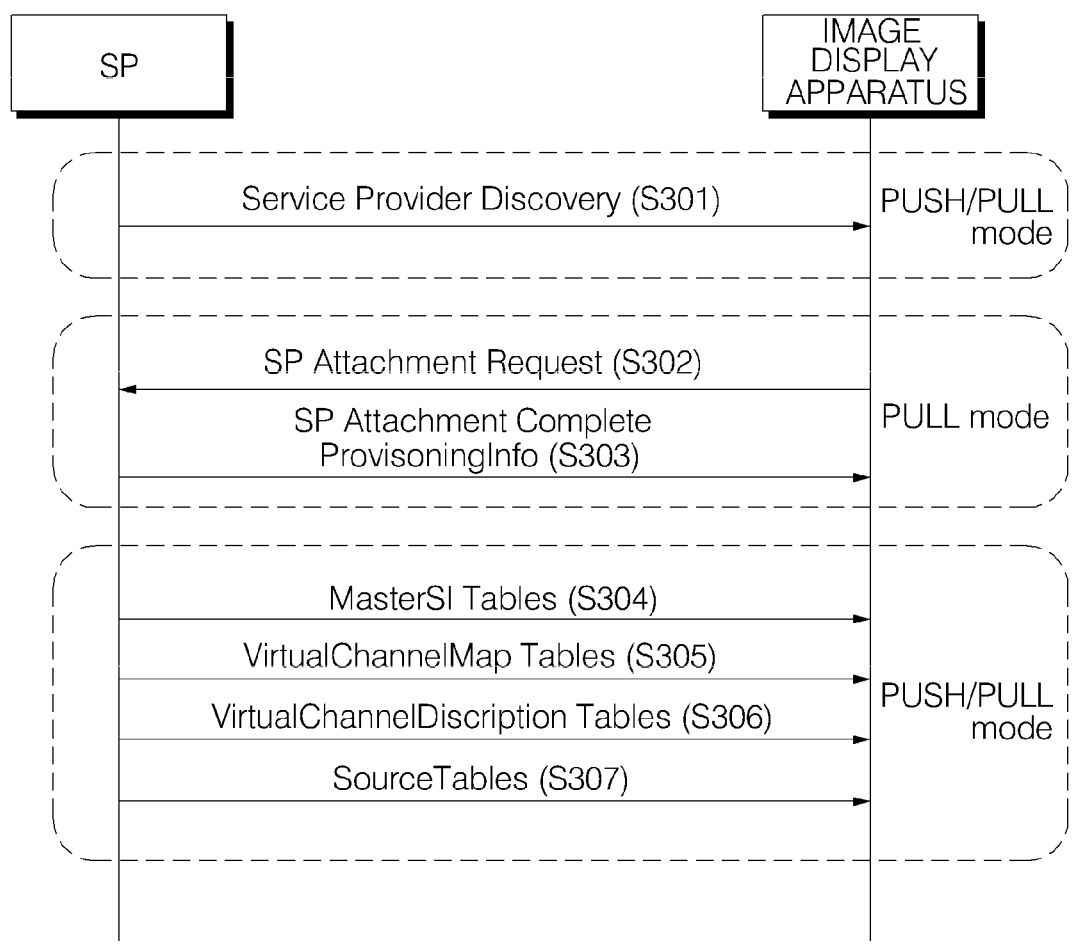
FIG. 3 is a diagram illustrating a signal flow for an operation for attaching to a Service Provider (SP) and receiving channel information from the SP in the image display apparatus illustrated in FIG. 1 or 2 according to an embodiment of the present invention.

FIG. 3 is a diagram illustrating a signal flow for an operation for attaching to an SP and receiving channel information from the SP in the image display apparatus illustrated in FIG. 1 or 2. Needless to say, the operation illustrated in FIG. 3 is an embodiment, which should not be interpreted as limiting the scope of the present invention.

Referring to FIG. 3, an SP performs an SP Discovery operation (S301) and the image display apparatus transmits a Service Provider Attachment Request signal to the SP (S302). Upon completion of attachment to the SP, the image display apparatus receives provisioning information from the SP (S303). Further, the image display apparatus receives Master System Information (SI) Tables, Virtual Channel Map Tables, Virtual Channel Description Tables, and Source Tables from the SP (S304 to S307).

More specifically, SP Discovery is a process by which SPs that provide IPTV services search for Service Discovery (SD) servers having information about the offerings of the SPs.

In order to receive information about the SD servers, an SD server address list can be detected, for example, using three methods, specifically use of an address preset in the image display apparatus or an address manually set by a user, Dynamic Host Configuration Protocol (DHCP)-based SP Discovery, and Domain Name System Service (DNS SRV)-based SP Discovery. The image display apparatus accesses a specific SD server using the SD server address list obtained through one of the above three methods and receives a SP Discovery record from the specific SD server. The Service Provider Discovery record includes information needed to perform Service Discovery on an SP basis. The image display apparatus then starts a Service Discovery operation using the SP Discovery record. These operations can be performed in a push mode or a pull mode.

The image display apparatus accesses an SP attachment server specified by an SP attachment locator included in the SP Discovery record and performs a registration procedure (or a service attachment procedure).

Further, after accessing an authentication service server of an SP specified by an SP authentication locator and performing an authentication procedure, the image display apparatus may perform a service authentication procedure.

After service attachment is successfully performed, a server may transmit data in the form of a provision information table to the image display apparatus.

During service attachment, the image display apparatus may include an Identifier (ID) and location information thereof in data and transmit the data to the service attachment server. Thus the service attachment server may specify a service that the image display apparatus has subscribed to based on the ID and location information. In addition, the service attachment server provides, in the form of a provisioning information table, address information from which the image display apparatus can obtain Service Information (SI). The address information corresponds to access information about a Master SI Table. This method facilitates provision of a customized service to each subscriber.

The SI is divided into a Master SI Table record for managing access information and version information about a Virtual Channel Map, a Virtual Channel Map Table for providing a list of services in the form of a package, a Virtual Channel Description Table that contains details of each channel, and a Source Table that contains access information about actual services.

Figure 4:
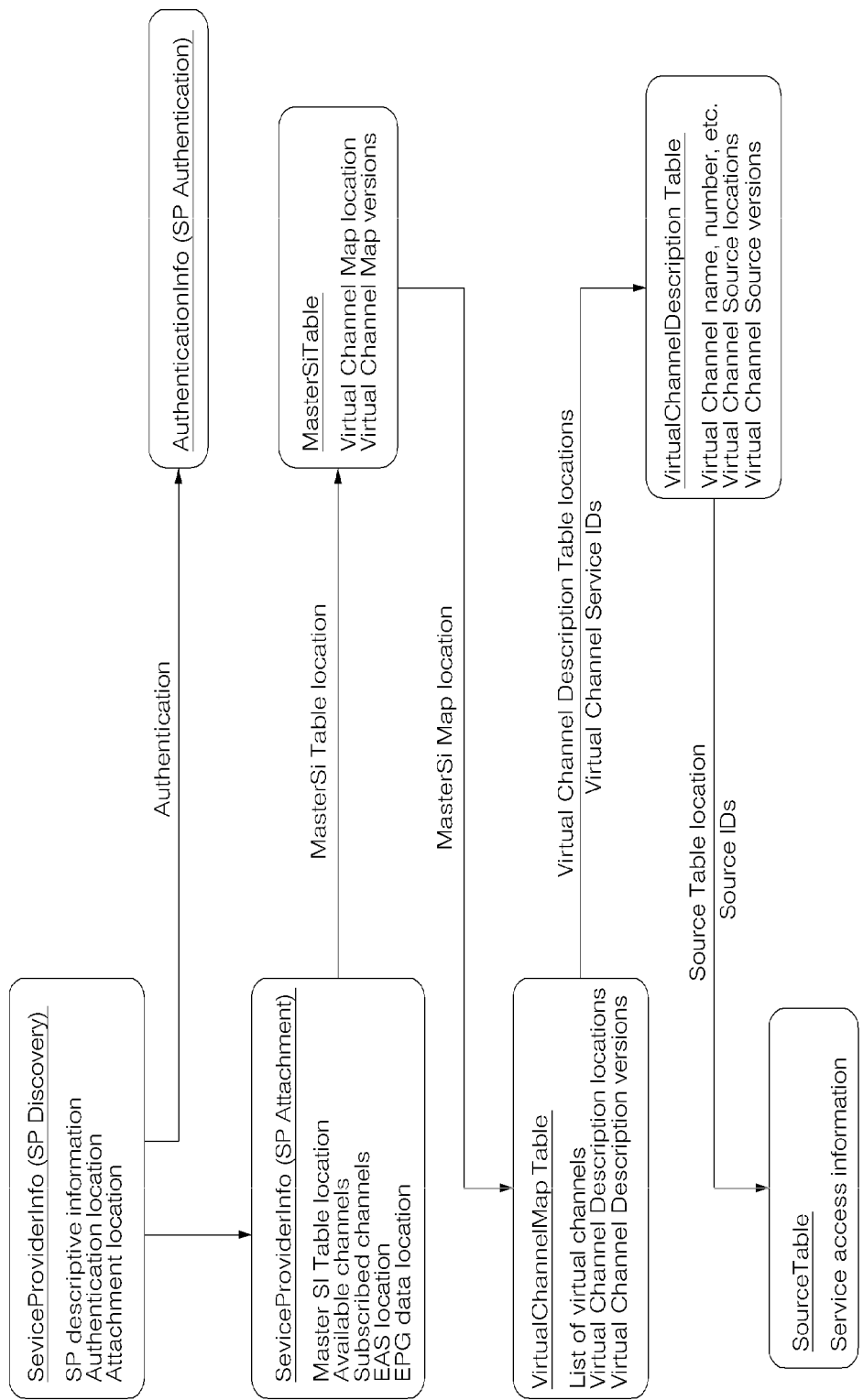
FIG. 4 illustrates an example of data used in the operation illustrated in FIG. 3.

FIG. 4 is a detailed diagram of FIG. 3, illustrating a relationship among data in the SI.

Referring to FIG. 4, a Master SI Table contains information about the location and version of each Virtual Channel MAP.

Each Virtual Channel MAP is identified by its Virtual Channel MAP identifier. VirtualChannelMAPVersion specifies the version number of the Virtual Channel MAP. If any of the tables connected to the Master SI Table in the arrowed direction is modified, the versions of the modified table and overlying tables thereof (up to the Master SI Table) are incremented. Accordingly, a change in any of the SI tables can be readily identified by monitoring the Master SI Table.

For example, when the Source Table is changed, the version of the Source Table is incremented and the version of the Virtual Channel Description Table that references the Source Table is also incremented. In conclusion, a change in any lower table leads to a change in its higher tables and, eventually, a change in the Master SI Table.

One Master SI Table may exist for each SP. However, in the case where service configurations differ for regions or subscribers (or subscriber groups), an SP may have a plurality of Master SI Tables in order to provide a customized service on a region, subscriber or subscriber group basis. Thus it is possible to provide a customized service to a subscriber according to a region in which the subscriber is located and subscriber information regarding the subscriber.

A Virtual Channel Map Table may contain a list of one or more virtual channels. A Virtual Channel Map includes not details of the channels but information about the locations of the details of the channels. In the Virtual Channel Map Table, VirtualChannelDescriptionLocation specifies the location of a Virtual Channel Description Table that provides virtual channel descriptions.

The Virtual Channel Description Table contains the details of the virtual channels. The Virtual Channel Description Table can be accessed using VirtualChannelDescriptionLocation of the Virtual Channel Map Table.

A Source Table provides information necessary to access actual services (e.g. IP addresses, ports, AV Codecs, transmission protocols, etc.) on a service basis.

The above-described Master SI Table, the Virtual Channel Map Table, the Virtual Channel Description Table and the Source Table are delivered in four logically separate flows, in a push mode or a pull mode. For version management, the Master SI Table may be multicast and thus a version change can be monitored by receiving a multicast stream of the Master SI Table.

Figure 5:
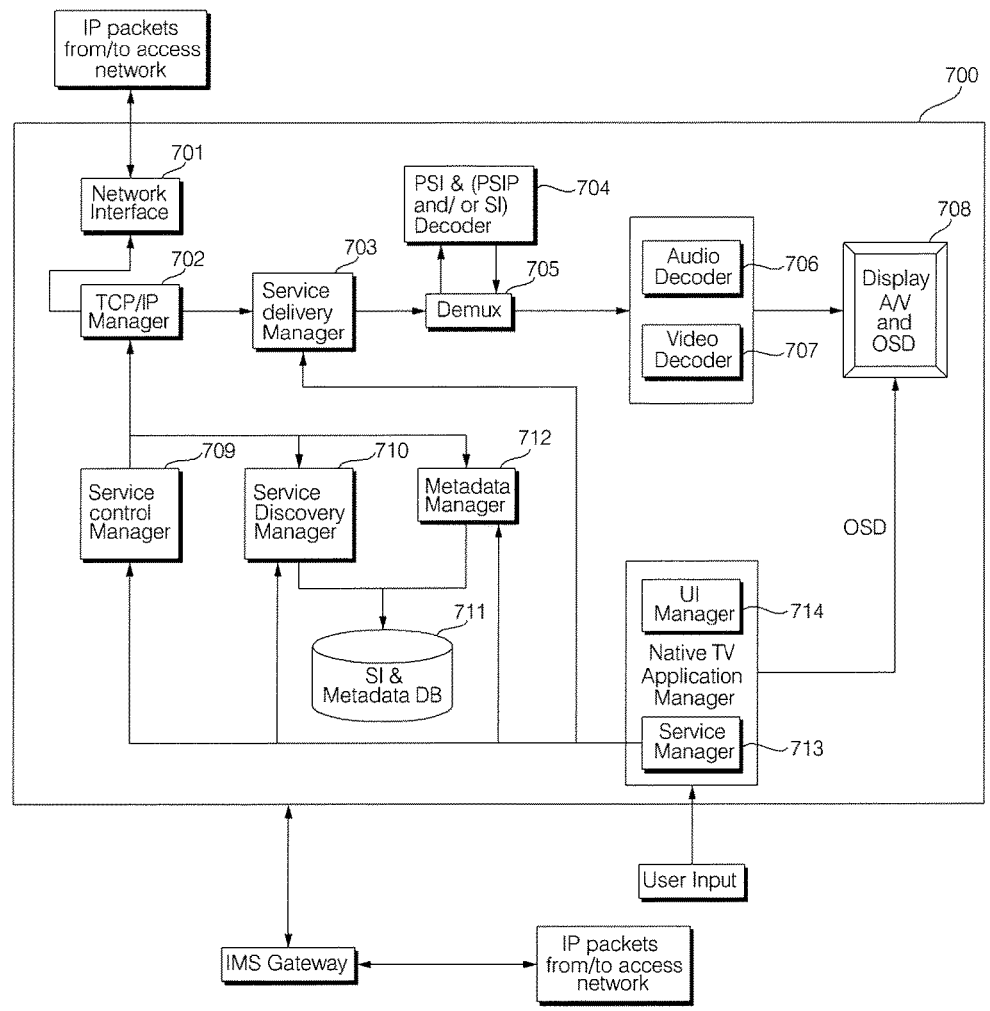
FIG. 5 is a detailed block diagram of the image display apparatus illustrated in FIG. 1 or 2 according to an embodiment of the present invention.

FIG. 5 is a detailed block diagram of the image display apparatus illustrated in FIG. 1 or 2 according to an embodiment of the present invention. The structure of the image display apparatus in FIG. 5 is purely exemplary and should not be interpreted as limiting the scope of the present invention.

Referring to FIG. 5, an image display apparatus 700 includes a network interface 701, a Transmission Control Protocol/Internet Protocol (TCP/IP) manager 702, a service delivery manager 703, a Demultiplexer (DEMUX) 705, a Program Specific Information (PSI) & (Program and System Information Protocol (PSIP) and/or SI) decoder 704, a display A/V and On Screen Display (OSD) module 708, a service control manager 709, a service discovery manager 710, a metadata manager 712, an SI & metadata DataBase (DB) 711, a User Interface (UI) manager 714, and a service manager 713.

The network interface 701 transmits packets to and receives packets from a network. Specifically, the network interface 701 receives services and content from an SP over the network.

The TCP/IP manager 702 is involved in packet reception and transmission of the image display apparatus 700, that is, packet delivery from a source to a destination. The TCP/IP manager 702 classifies received packets according to appropriate protocols and outputs the classified packets to the service delivery manager 705, the service discovery manager 710, the service control manager 709, and the metadata manager 712.

The service delivery manager 703 controls received service data. For example, when controlling real-time streaming data, the service delivery manager 703 may use the Real-time Transport Protocol/Real-time Transport Control Protocol (RTP/RTCP). If real-time streaming data is transmitted over RTP/RTCP, the service delivery manager 703 parses the received real-time streaming data using RTP and outputs the parsed real-time streaming data to the DEMUX 705 or stores the parsed real-time streaming data in the SI & metadata DB 711 under the control of the service manager 713. In addition, the service delivery manager 703 feeds back network reception information to a server that provides the real-time streaming data service using RTCP.

The DEMUX 705 demultiplexes a received packet into audio data, video data and PSI data and outputs the audio data, video data and PSI data to the audio decoder 706, the video decoder 707, and the PSI & (PSIP and/or SI) decoder 704, respectively.

The PSI & (PSIP and/or SI) decoder 704 decodes SI such as PSI. More specifically, the PSI & (PSIP and/or SI) decoder 704 decodes PSI sections, PSIP sections or SI sections received from the DEMUX 705.

The PSI & (PSIP and/or SI) decoder 704 constructs an SI DB by decoding the received sections and stores the SI DB in the SI & metadata DB 711.

The audio decoder 706 and the video decoder 707 decode the audio data and the video data received from the DEMUX 705 and output the decoded audio and video data to a user through the display A/V and OSD module 708.

The UI manager 714 and the service manager 713 manage the overall state of the image display apparatus 700, provide UIs, and manage other managers.

The UI manager 714 provides a Graphical User Interface (GUI) in the form of an OSD and performs a reception operation corresponding to a key input received from the user. For example, upon receipt of a key input signal regarding channel selection from the user, the UI manager 714 transmits the key input signal to the service manager 713.

The service manager 713 controls managers associated with services, such as the service delivery manager 703, the service discovery manager 710, the service control manager 709, and the metadata manager 712.

The service manager 713 also makes a channel map and selects a channel using the channel map according to the key input signal received from the UI manager 714. The service manager 713 sets the audio/video Packet ID (PID) of the selected channel based on SI about the channel received from the PSI & (PSIP and/or SI) decoder 704.

The service discovery manager 710 provides information necessary to select an SP that provides a service. Upon receipt of a channel selection signal from the service manager 713, the service discovery manager 710 detects a service based on the channel selection signal.

The service control manager 709 takes charge of selecting and control services. For example, if a user selects live broadcasting, like a conventional broadcasting service, the service control manager selects and controls the service using Internet Group Management Protocol (IGMP) or Real-Time Streaming Protocol (RTSP). If the user selects Video on Demand (VoD), the service control manager 709 selects and controls the service. RTSP supports trick mode for real-time streaming. Further, the service control manager 709 may initialize and manage a session through an IP Multimedia Control (IMC) gateway using IP Multimedia Subsystem (IMS) and Session Initiation Protocol (SIP). The protocols are given by way of example and thus other protocols are also applicable according to other embodiments.

The metadata manager 712 manages metadata related to services and stores the metadata in the SI & metadata DB 711.

The SI & metadata DB 711 stores the SI decoded by the PSI & (PSIP and/or SI) decoder 704, the metadata managed by the metadata manager 712, and the information required to select an SP, received from the service discovery manager 710. The SI & metadata DB 711 may store setup data for the system.

The SI & metadata DB 711 may be constructed in a Non-Volatile RAM (NVRAM) or a flash memory.

An IMS gateway 705 is a gateway equipped with functions needed to access IMS-based IPTV services.

Figure 6:
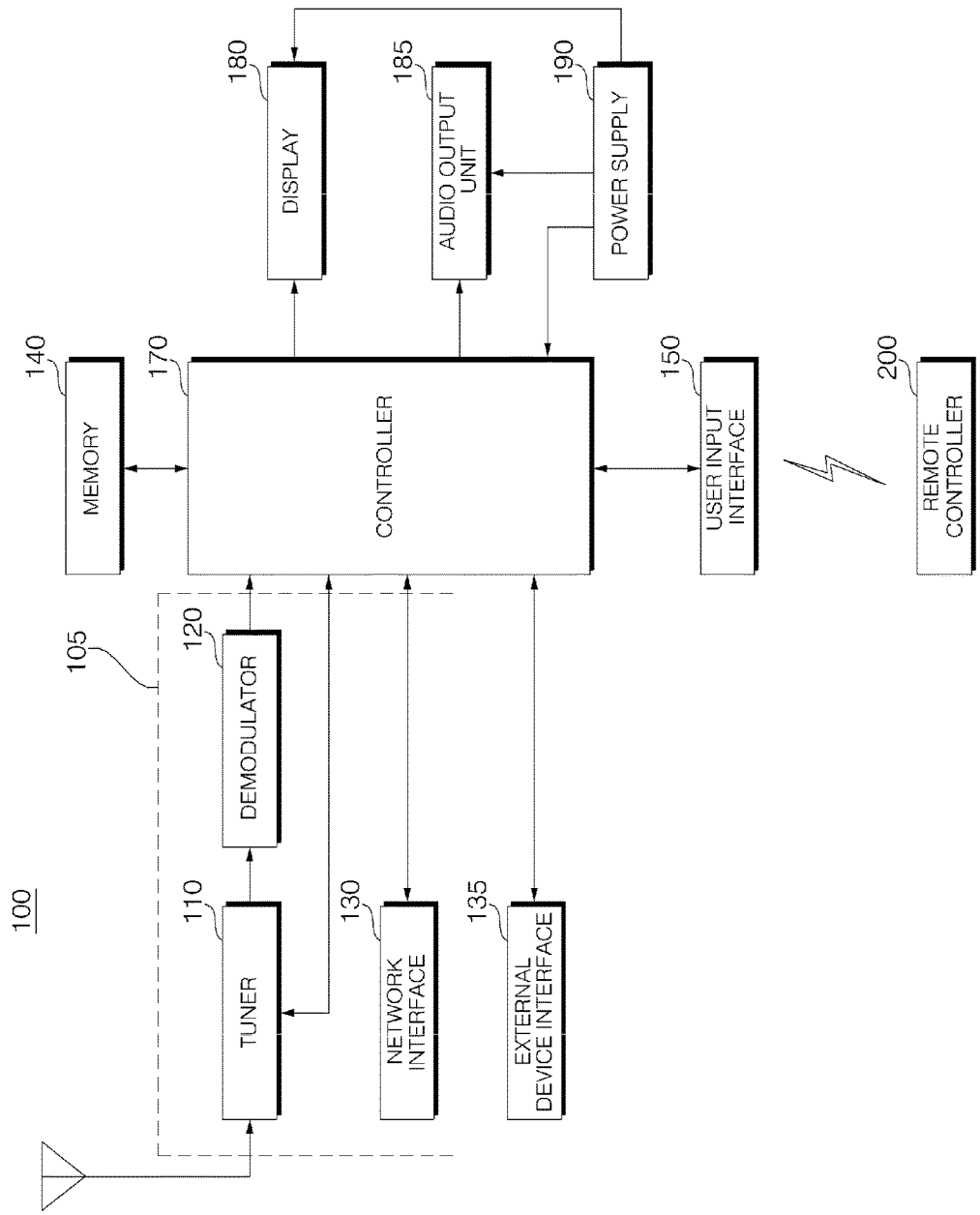
FIG. 6 is a detailed block diagram of the image display apparatus illustrated in FIG. 1 or 2 according to another embodiment of the present invention.

FIG. 6 is a detailed block diagram of the image display apparatus illustrated in FIG. 1 or 2 according to another embodiment of the present invention.

Referring to FIG. 6, an image display apparatus 100 according to another embodiment of the present invention includes a broadcasting receiver 105, an external device interface 135, a memory 140, a user input interface 150, a controller 170, a display 180, an audio output unit 185, a power supply 190, and a camera module. The broadcasting receiver 105 may include a tuner 110, a demodulator 120 and a network interface 130. As needed, the broadcasting receiver 105 may be configured so as to include only the tuner 110 and the demodulator 120 or only the network interface 130.

The tuner 110 selects a Radio Frequency (RF) broadcast signal corresponding to a channel selected by a user from among a plurality of RF broadcast signals received through an antenna and downconverts the selected RF broadcast signal into a digital Intermediate Frequency (IF) signal or an analog baseband A/V signal.

More specifically, if the selected RF broadcast signal is a digital broadcast signal, the tuner 110 downconverts the selected RF broadcast signal into a digital IF signal DIF. On the other hand, if the selected RF broadcast signal is an analog broadcast signal, the tuner 110 downconverts the selected RF broadcast signal into an analog baseband A/V signal, CVBS/SIF. That is, the tuner 110 may be a hybrid tuner capable of processing not only digital broadcast signals but also analog broadcast signals. The analog baseband A/V signal CVBS/SIF may be directly input to the controller 170.

The tuner 110 may be capable of receiving RF broadcast signals from an Advanced Television Systems Committee (ATSC) single-carrier system or from a Digital Video Broadcasting (DVB) multi-carrier system.

The tuner 110 may sequentially select a number of RF broadcast signals corresponding to all broadcast channels previously stored in the image display apparatus 100 by a channel add function from a plurality of RF signals received through the antenna and may downconvert the selected RF broadcast signals into IF signals or baseband A/V signals.

The demodulator 120 receives the digital IF signal DIF from the tuner 110 and demodulates the digital IF signal DIF.

For example, if the digital IF signal DIF is an ATSC signal, the demodulator 120 may perform 8-Vestigal Side-Band (VSB) demodulation on the digital IF signal DIF. The demodulator 120 may also perform channel decoding. For channel decoding, the demodulator 120 may include a Trellis decoder, a de-interleaver and a Reed-Solomon decoder so as to perform Trellis decoding, de-interleaving and Reed-Solomon decoding.

For example, if the digital IF signal DIF is a DVB signal, the demodulator 120 performs Coded Orthogonal Frequency Division Multiple Access (COFDMA) demodulation upon the digital IF signal DIF. The demodulator 120 may also perform channel decoding. For channel decoding, the demodulator 120 may include a convolution decoder, a de-interleaver, and a Reed-Solomon decoder so as to perform convolution decoding, de-interleaving, and Reed-Solomon decoding.

The demodulator 120 may perform demodulation and channel decoding on the digital IF signal DIF, thereby obtaining a stream signal TS. The stream signal TS may be a signal in which a video signal, an audio signal and a data signal are multiplexed. For example, the stream signal TS may be an MPEG-2 TS in which an MPEG-2 video signal and a Dolby AC-3 audio signal are multiplexed. An MPEG-2 TS may include a 4-byte header and a 184-byte payload.

In order to properly handle not only ATSC signals but also DVB signals, the demodulator 120 may include an ATSC demodulator and a DVB demodulator.

The stream signal TS may be input to the controller 170 and thus subjected to demultiplexing and A/V signal processing. The processed video and audio signals are output to the display 180 and the audio output unit 185, respectively.

The external device interface 135 may serve as an interface between an external device and the image display apparatus 100. For interfacing, the external device interface 135 may include an A/V Input/Output (I/O) unit and/or a wireless communication module.

The external device interface 135 may be connected to an external device such as a Digital Versatile Disk (DVD) player, a Blu-ray player, a game console, a camera, a camcorder, or a computer (e.g., a laptop computer), wirelessly or by wire. Then, the external device interface 135 externally receives video, audio, and/or data signals from the external device and transmits the received input signals to the controller 170. In addition, the external device interface 135 may output video, audio, and data signals processed by the controller 170 to the external device. In order to receive or transmit audio, video and data signals from or to the external device, the external device interface 135 includes the A/V I/O unit and/or the wireless communication module.

The A/V I/O unit of the external device interface 135 may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, and a D-sub port.

The wireless communication module of the external device interface 135 may perform short-range wireless communication with other electronic devices. For short-range wireless communication, the wireless communication module may use Bluetooth, Radio-Frequency IDentification (RFID), Infrared Data Association (IrDA), Ultra WideBand (UWB), ZigBee, and Digital Living Network Alliance (DLNA).

The external device interface 135 may be connected to various set-top boxes through at least one of the above-described ports and may thus receive data from or transmit data to the various set-top boxes.

The external device interface 135 may receive applications or an application list from an adjacent external device and provide the applications or the application list to the controller 170 or the memory 140.

The network interface 130 serves as an interface between the image display apparatus 100 and a wired/wireless network such as the Internet. The network interface 130 may include an Ethernet port for connection to a wired network. The wireless communication module of the external signal I/O unit 128 may wirelessly access the Internet. For connection to wireless networks, the network interface 130 may use Wireless Local Area Network (WLAN) (i.e., Wi-Fi), Wireless Broadband (WiBro), World Interoperability for Microwave Access (WiMax), and High Speed Downlink Packet Access (HSDPA).

The network interface 130 may transmit data to or receive data from another user or electronic device over a connected network or another network linked to the connected network. Especially, the network interface 130 may transmit data stored in the image display apparatus 100 to a user or electronic device selected from among users or electronic devices pre-registered with the image display apparatus 100.

The network interface 130 may access a specific Web page over a connected network or another network linked to the connected network. That is, the network interface 130 may access a specific Web page over a network and transmit or receive data to or from a server. Additionally, the network interface 130 may receive content or data from a CP or an NP. Specifically, the network interface 130 may receive content such as movies, advertisements, games, VoD files, and broadcast signals, and information related to the content from a CP or an NP. Also, the network interface 130 may receive update information about firmware and update files of the firmware from the NP. The network interface 130 may transmit data over the Internet or to the CP or the NP.

The network interface 130 may selectively receive a desired application among open applications over a network.

In an embodiment of the present invention, when a game application is executed in the image display apparatus 100, the network interface 130 may transmit data to or receive data from a user terminal connected to the image display apparatus 100 through a network. In addition, the network interface 130 may transmit specific data to or receive specific data from a server that records game scores.

The memory 140 may store various programs necessary for the controller 170 to process and control signals, and may also store processed video, audio and data signals.

The memory 140 may temporarily store a video, audio and/or data signal received from the external device interface 135 or the network interface 130. The memory 140 may store information about broadcast channels by the channel-add function.

The memory 140 may store applications or a list of applications received from the external device interface 135 or the network interface 130.

The memory 140 may store a variety of platforms which will be described later.

In an embodiment of the present invention, when the image display apparatus 100 executes a game application, the memory 140 may store user-specific information and game play information about a user terminal used as a game controller.

The memory 140 may include, for example, at least one of a flash memory-type storage medium, a hard disk-type storage medium, a multimedia card micro-type storage medium, a card-type memory (e.g. a Secure Digital (SD) or eXtreme Digital (XD) memory), a Random Access Memory (RAM), or a Read-Only Memory (ROM) such as an Electrically Erasable and Programmable Read Only Memory. The image display apparatus 100 may reproduce content stored in the memory 140 (e.g. video files, still image files, music files, text files, and application files) to the user.

While the memory 140 is shown in FIG. 6 as configured separately from the controller 170, to which the present invention is not limited, the memory 140 may be incorporated into the controller 170, for example.

The user input interface 150 transmits a signal received from the user to the controller 170 or transmits a signal received from the controller 170 to the user.

For example, the user input interface 150 may receive various user input signals such as a power-on/off signal, a channel selection signal, and a screen setting signal from a remote controller 200 or may transmit a signal received from the controller 170 to the remote controller 200, according to various communication schemes, for example, RF communication and IR communication.

For example, the user input interface 150 may provide the controller 170 with user input signals or control signals received from local keys, such as inputs of a power key, a channel key, a volume key, and setting values.

Also, the user input interface 150 may transmit a control signal received from a sensor unit for sensing a user gesture to the controller 170 or transmit a signal received from the controller 170 to the sensor unit. The sensor unit may include a touch sensor, a voice sensor, a position sensor, a motion sensor, etc.

The controller 170 may demultiplex the stream signal TS received from the tuner 110, the demodulator 120, or the external device interface 135 into a number of signals and process the demultiplexed signals into audio and video data.

The video signal processed by the controller 170 may be displayed as an image on the display 180. The video signal processed by the controller 170 may also be transmitted to an external output device through the external device interface 135.

The audio signal processed by the controller 170 may be output to the audio output unit 185. Also, the audio signal processed by the controller 170 may be transmitted to the external output device through the external device interface 135.

While not shown in FIG. 6, the controller 170 may include a DEMUX and a video processor, which will be described later with reference to FIG. 10.

In addition, the controller 170 may provide overall control to the image display apparatus 100. For example, the controller 170 may control the tuner 110 to select an RF broadcast signal corresponding to a user-selected channel or a pre-stored channel.

The controller 170 may control the image display apparatus 100 according to a user command received through the user input interface 150 or according to an internal program. Especially the controller 170 may access a network and download an application or application list selected by the user to the image display apparatus 100 over the network.

For example, the controller 170 controls the tuner 110 to receive a channel selected according to a specific channel selection command received through the user input interface 150, and processes a video, audio and/or data signal of the selected channel. The controller 170 outputs the processed video or audio signal along with information about the user-selected channel to the display 180 or the audio output unit 185.

In another example, the controller 170 outputs a video or audio signal received from an external device such as a camera or a camcorder through the external device interface 135 to the display 180 or the audio output unit 185 according to an external device video playback command received through the external device interface 150.

The controller 170 may control the display 180 to display images. For instance, the controller 170 may control the display 180 to display a broadcast image received from the tuner 110, an external input image received through the external device interface 135, an image received through the network interface 130, or an image stored in the memory 140. The image displayed on the display 180 may be a Two-Dimensional (2D) or Three-Dimensional (3D) still image or moving picture.

The controller 170 may control content playback. The content may include any content stored in the image display apparatus 100, received broadcast content, and external input content. The content includes at least one of a broadcast image, an external input image, an audio file, a still image, a Web page, or a text file.

Upon receipt of a go-to-home input, the controller 170 may control display of the home screen on the display 180 in an embodiment of the present invention.

The home screen may include a plurality of card objects classified according to content sources. The card objects may include at least one of a card object representing a thumbnail list of broadcast channels, a card object representing a broadcast program guide, a card object representing a program reservation list or a program recording list, or a card object representing a media list of a device connected to the image display apparatus 100. The card objects may further include at least one of a card object representing a list of connected external devices or a card object representing a call-associated list.

The home screen may further include an application menu with at least one application that can be executed.

Upon receipt of a card object move input, the controller 170 may control movement of a card object corresponding to the card object move input on the display 180, or if the card object is not displayed on the display 180, the controller 170 may control display of the card object on the display 180.

When a card object is selected from among the card objects on the home screen, the controller 170 may control display of an image corresponding to the selected card object on the display 180.

The controller 170 may control display of an input broadcast image and an object representing information about the broadcast image in a card object representing broadcast images. The broadcast image may be fixed in size through lock setting.

The controller 170 may control display of a set-up object for at least one of image setting, audio setting, screen setting, reservation setting, setting of a pointer of the remote controller, or network setting on the home screen.

The controller 170 may control display of a log-in object, a help object, or an exit object on a part of the home screen.

The controller 170 may control display of an object representing the total number of available card objects or the number of card objects displayed on the display 180 among all card objects, on a part of the home screen.

If one of the card objects displayed on the display 180 is selected, the controller 170 may fullscreen the selected card object to cover the entirety of the display 180.

Upon receipt of an incoming call at a connected external device or the image display apparatus 100, the controller 170 may control focusing-on or shift of a call-related card object among the plurality of card objects.

If an application view menu item is selected, the controller 170 may control display of applications or a list of applications that are available in the image display apparatus or downloadable from an external network.

The controller 170 may control installation and execution of an application downloaded from the external network along with various UIs. Also, the controller 170 may control display of an image related to the executed application on the display 180, upon user selection.

In an embodiment of the present invention, when the image display apparatus 100 provides a game application, the controller 170 may control assignment of player IDs to specific user terminals, creation of game play information by executing the game application, transmission of the game play information to the user terminals through the network interface 130, and reception of the game play information at the user terminals.

The controller 170 may control detection of user terminals connected to the image display apparatus 100 over a network through the network interface 130, display of a list of the detected user terminals on the display 180 and reception of a selection signal indicating a user terminal selected for use as a user controller from among the listed user terminals through the user input interface 150.

The controller 170 may control output of a game play screen of the game application, inclusive of player information about each user terminal and game play information, through the display 180.

The controller 170 may determine the specific signal received from a user terminal through the network interface 130 as game play information and thus control the game play information to be reflected in the game application in progress.

The controller 170 may control transmission of the game play information about the game application to a specific server connected to the image display apparatus 100 over a network through the network interface 130.

As another embodiment, upon receipt of information about a change in the game play information from the server through the network interface 130, the controller 170 may control output of a notification message in a predetermined area of the display 180.

The image display apparatus 100 may further include a channel browsing processor for generating thumbnail images corresponding to channel signals or external input signals.

The channel browsing processor may extract some of the video frames of each of stream signals TS received from the demodulator 120 or stream signals received from the external device interface 135 and display the extracted video frames on the display 180 as thumbnail images. The thumbnail images may be directly output to the controller 170 or may be output after being encoded. Also, it is possible to encode the thumbnail images into a stream and output the stream to the controller 170. The controller 170 may display a thumbnail list including a plurality of received thumbnail images on the display 180. The thumbnail images may be updated sequentially or simultaneously in the thumbnail list. Therefore, the user can readily identify the content of broadcast programs received through a plurality of channels.

The display 180 may convert a processed video signal, a processed data signal, and an OSD signal received from the controller 170 or a video signal and a data signal received from the external device interface 135 into RGB signals, thereby generating driving signals.

The display 180 may be various types of displays such as a Plasma Display Panel (PDP), a Liquid Crystal Display (LCD), an Organic Light-Emitting Diode (OLED) display, a flexible display, and a 3D display.

The display 180 may also be a touch screen that can be used not only as an output device but also as an input device.

The audio output unit 185 may receive a processed audio signal (e.g., a stereo signal, a 3.1-channel signal or a 5.1-channel signal) from the controller 170 and output the received audio signal as sound. The audio output unit 185 may employ various speaker configurations.

To sense a user gesture, the image display apparatus 100 may further include the sensor unit that has at least one of a touch sensor, a voice sensor, a position sensor, and a motion sensor, as stated before. A signal sensed by the sensor unit may be output to the controller 170 through the user input interface 150.

The image display apparatus 100 may further include the camera unit for capturing images of a user. Image information captured by the camera unit may be input to the controller 170.

The controller 170 may sense a user gesture from an image captured by the camera unit or a signal sensed by the sensor unit, or by combining the captured image and the sensed signal.

The power supply 190 supplies power to the image display apparatus 100. Particularly, the power supply 190 may supply power to the controller 170, the display 180, and the audio output unit 185, which may be implemented as a System On Chip (SOC).

For supplying power, the power supply 190 may include a converter for converting Alternating Current (AC) into Direct Current (DC). If the display 180 is configured with, for example, a liquid crystal panel having a plurality of backlight lamps, the power supply 190 may further include an inverter capable of performing Pulse Width Modulation (PWM) for luminance change or dimming driving.

The remote controller 200 transmits a user input to the user input interface 150. For transmission of user input, the remote controller 200 may use various communication techniques such as Bluetooth, RF communication, IR communication, UWB and ZigBee.

In addition, the remote controller 200 may receive a video signal, an audio signal or a data signal from the user input interface 150 and output the received signals visually, audibly or as vibrations.

The above-described image display apparatus 100 may be a fixed digital broadcast receiver capable of receiving at least one of ATSC (8-VSB) broadcast programs, DVB-T (COFDM) broadcast programs, and ISDB-T (BST-OFDM) broadcast programs.

The block diagram of the image display apparatus 100 illustrated in FIG. 6 is purely exemplary. Depending upon the specifications of the image display apparatus 100 in actual implementation, the components of the image display apparatus 100 may be combined or omitted or new components may be added. That is, two or more components are incorporated into one component or one component may be configured as separate components, as needed. In addition, the function of each block is described for the purpose of describing the embodiment of the present invention and thus specific operations or devices should not be construed as limiting the scope and spirit of the present invention.

Unlike the configuration illustrated in FIG. 6, the image display apparatus 100 may be configured so as to receive and playback video content through the network interface 130 or the external device interface 135, without the tuner 100 and the demodulator 120.

The image display apparatus 100 is an example of image signal processing apparatus that processes a stored image or an input image. Other examples of the image signal processing apparatus include a set-top box without the display 180 and the audio output unit 185, a DVD player, a Blu-ray player, a game console, and a computer. The set-top box will be described later with reference to FIGS. 7 and 8.

Figure 7:
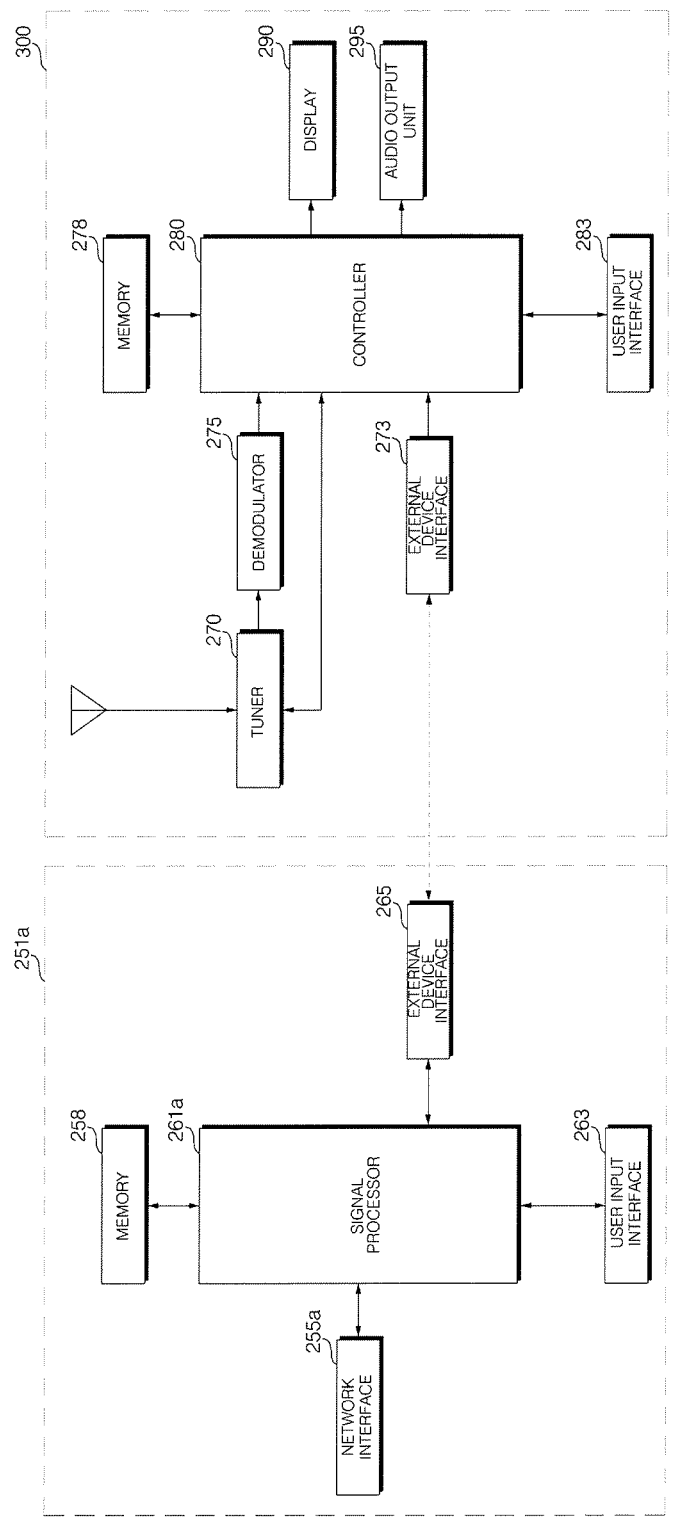
FIGS. 7 and 8 are block diagrams illustrating either of the image display apparatuses separately as a set-top box and a display device according to embodiments of the present invention.
Figure 8:
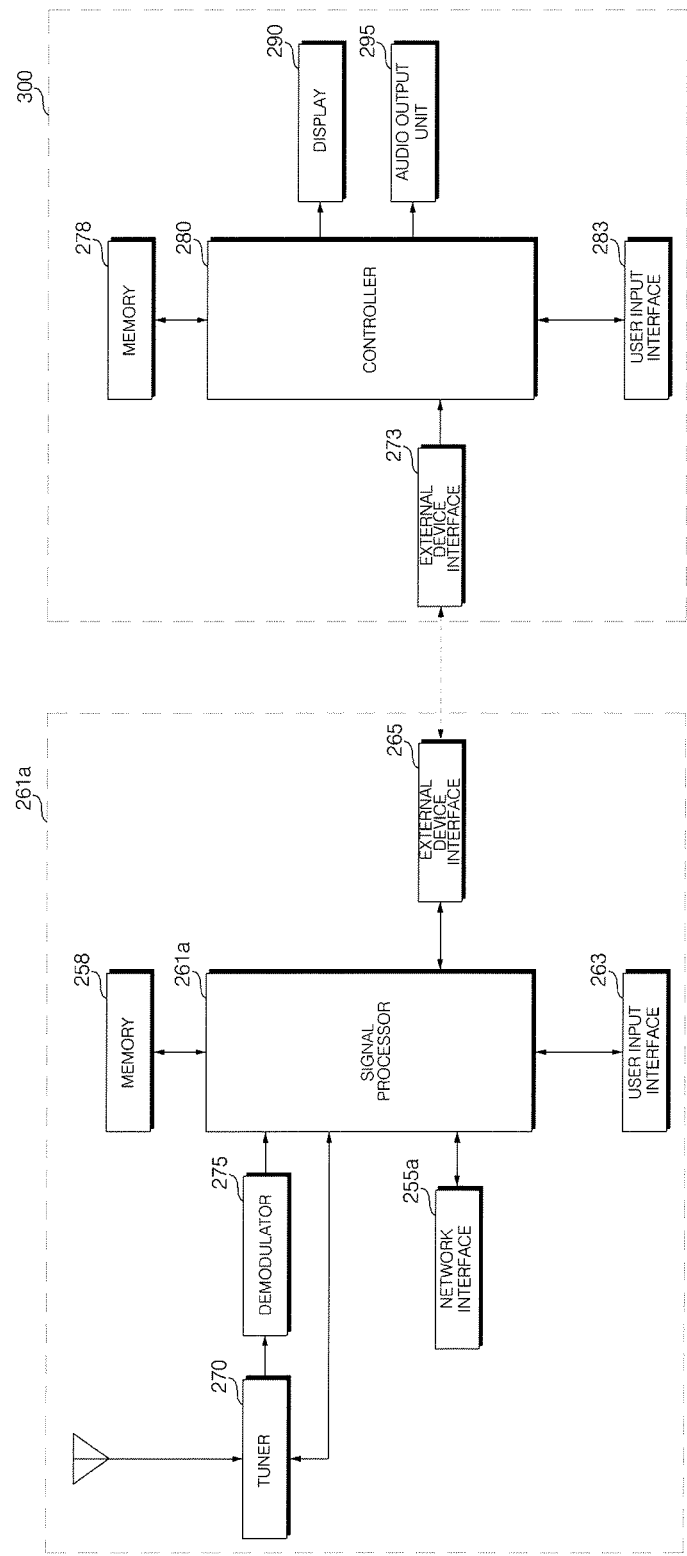

FIGS. 7 and 8 are block diagrams illustrating either of the image display apparatuses separately as a set-top box and a display device according to embodiments of the present invention.

Referring to FIG. 7, a set-top box 250 and a display device 300 may transmit or receive data wirelessly or by wire.

The set-top box 250 may include a network interface 255, a memory 258, a signal processor 260, a user input interface 263, and an external device interface 265.

The network interface 255 serves as an interface between the set-top box 250 and a wired/wireless network such as the Internet. The network interface 255 may transmit data to or receive data from another user or another electronic device over a connected network or over another network linked to the connected network.

The memory 258 may store programs necessary for the signal processor 260 to process and control signals and temporarily store a video, audio and/or data signal received from the external device interface 265 or the network interface 255. The memory 258 may also store platforms illustrated in FIGS. 11 and 12, as described later.

The signal processor 260 processes an input signal. For example, the signal processor 260 may demultiplex or decode an input video or audio signal. For signal processing, the signal processor 260 may include a video decoder or an audio decoder. The processed video or audio signal may be transmitted to the display device 300 through the external device interface 265.

The user input interface 263 transmits a signal received from the user to the signal processor 260 or a signal received from the signal processor 260 to the user. For example, the user input interface 263 may receive various control signals such as a power on/off signal, an operation input signal, and a setting input signal through a local key or the remote controller 200 and output the control signals to the signal processor 260.

The external device interface 265 serves as an interface between the set-top box 250 and an external device that is connected wirelessly or by wire, particularly the display device 300, for signal transmission or reception. The external device interface 265 may also interface with an external device such as a game console, a camera, a camcorder, and a computer (e.g. a laptop computer), for data transmission or reception.

The set-top box 250 may further include a media input unit for media playback. The media input unit may be a Blu-ray input unit, for example. That is, the set-top box 250 may include a Blu-ray player. After signal processing such as demultiplexing or decoding in the signal processor 260, a media signal from a Blu-ray disk may be transmitted to the display device 300 through the external device interface 265 so as to be displayed on the display device 300.

The display device 300 may include a tuner 270, an external device interface 273, a demodulator 275, a memory 278, a controller 280, a user input interface 283, a display 290, and an audio output unit 295.

The tuner 270, the demodulator 275, the memory 278, the controller 280, the user input interface 283, the display 290, and the audio output unit 295 are identical respectively to the tuner 110, the demodulator 120, the memory 140, the controller 170, the user input interface 150, the display 180, and the audio output unit 185 illustrated in FIG. 6 and thus a description thereof is not provided herein.

The external device interface 273 serves as an interface between the display device 300 and a wireless or wired external device, particularly the set-top box 250, for data transmission or reception.

Hence, a video signal or an audio signal received through the set-top box 250 is output through the display 290 or the audio output unit 295 through the controller 280.

Referring to FIG. 8, the configuration of the set-top box 250 and the display device 300 illustrated in FIG. 8 is similar to that of the set-top box 250 and the display device 300 illustrated in FIG. 7, except that the tuner 270 and the demodulator 275 reside in the set-top box 250, not in the display device 300. Thus the following description is given focusing on such difference.

The signal processor 260 may process a broadcast signal received through the tuner 270 and the demodulator 275. The user input interface 263 may receive a channel selection input, a channel store input, etc.

Figure 9:
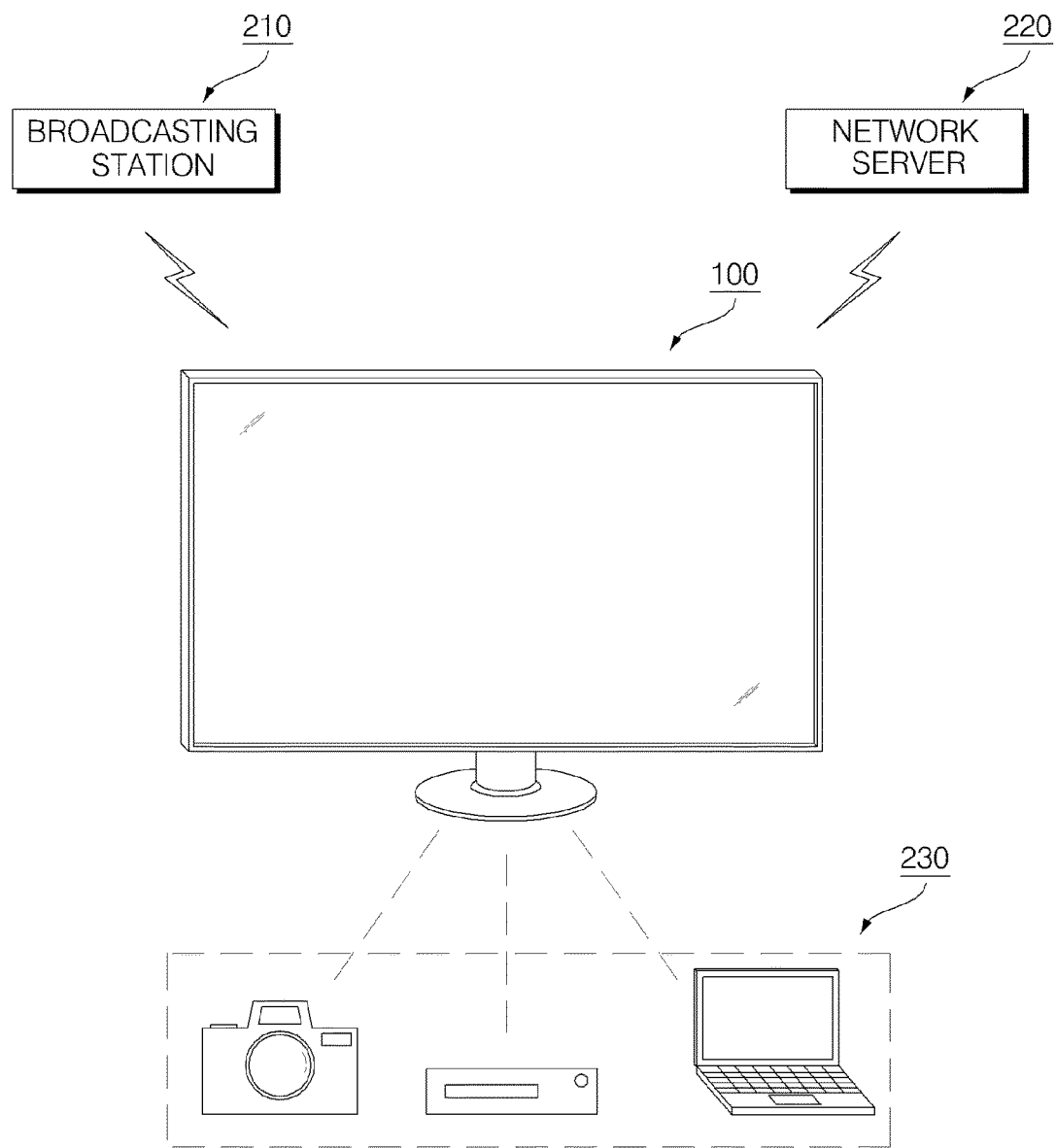
FIG. 9 illustrates an operation for communicating with third devices in either of the image display apparatuses according to an embodiment of the present invention.

FIG. 9 illustrates an operation for communicating with third devices in either of the image display apparatuses according to an embodiment of the present invention. The image display apparatus illustrated in FIG. 9 may be one of the afore-described image display apparatuses according to the embodiments of the present invention.

Referring to FIG. 9, the image display apparatus 100 may communicate with a broadcasting station 210, a network server 220, or an external device 230.

The image display apparatus 100 may receive a broadcast signal including a video signal from the broadcasting station 210. The image display apparatus 100 may process the audio and video signals of the broadcast signal or the data signal of the broadcast signal, suitably for transmission from the image display apparatus 100. The image display apparatus 100 may output images or sound based on the processed video or audio signal.

Meanwhile, the image display apparatus 100 may communicate with the network server 220. The network server 200 is capable of transmitting signals to and receiving signals from the image display apparatus 100 over a network. For example, the network server 220 may be a portable terminal that can be connected to the image display apparatus 100 through a wired or wireless base station. In addition, the network server 200 may provide content to the image display apparatus 100 over the Internet. A CP may provide content to the image display apparatus 100 through the network server 220.

The image display apparatus 100 may communicate with the external device 230. The external device 230 can transmit and receive signals directly to and from the image display apparatus 100 wirelessly or by wire. For instance, the external device 230 may be a media memory device or a player. That is, the external device 230 may be any of a camera, a DVD player, a Blu-ray player, a PC, etc.

The broadcasting station 210, the network server 220 or the external device 230 may transmit a signal including a video signal to the image display apparatus 100. The image display apparatus 100 may display an image based on the video signal included in the received signal. Also, the image display apparatus 100 may transmit a signal received from the broadcasting station 210 or the network server 220 to the external device 230 and may transmit a signal received from the external device 230 to the broadcasting station 210 or the network server 220. That is, the image display apparatus 100 may transmit content included in signals received from the broadcasting station 210, the network server 220, and the external device 230, as well as playback the content immediately.

Figure 10:
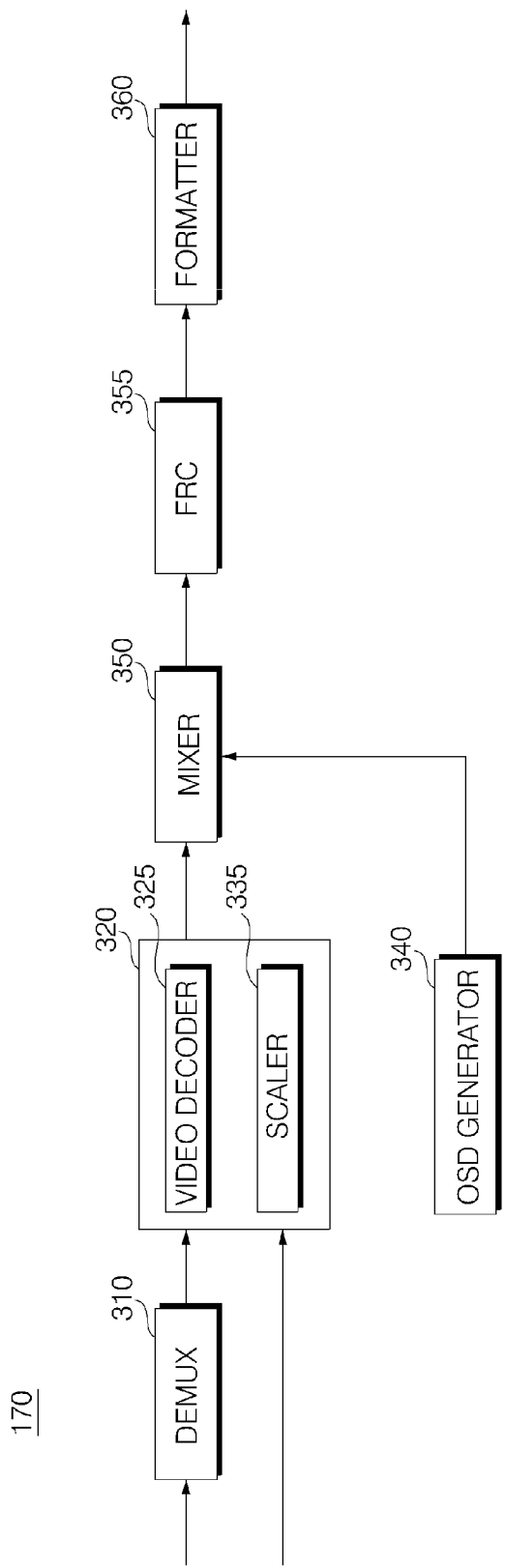
FIG. 10 is a block diagram of a controller illustrated in FIG. 6.

FIG. 10 is a block diagram of the controller illustrated in FIG. 6.

Referring to FIG. 10, the controller 170 may include a DEMUX 310, a video processor 320, an OSD generator 340, a mixer 350, a Frame Rate Converter (FRC) 355, and a formatter 360 according to an embodiment of the present invention. The controller 170 may further include an audio processor and a data processor.

The DEMUX 310 demultiplexes an input stream. For example, the DEMUX 310 may demultiplex an MPEG-2 TS into a video signal, an audio signal, and a data signal. The input stream signal may be received from the tuner 110, the demodulator 120 or the external device interface 135.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal can be displayed on the display 180.

The video decoder 325 may be provided with decoders that operate based on various standards.

If the demultiplexed video signal is, for example, an MPEC-2 encoded video signal, the video signal may be decoded by an MPEC-2 decoder.

On the other hand, if the video signal is an H.264-encoded DMB or DVB-handheld (DVB-H) signal, the video signal may be decoded by an H.264 decoder.

The video signal decoded by the video processor 320 is provided to the mixer 350.

The OSD generator 340 generates an OSD signal autonomously or according to user input. For example, the OSD generator 340 may generate signals by which a variety of information is displayed as images or text on the display 180, according to control signals received from the user input interface 150. The OSD signal may include various data such as a UI, a variety of menu screens, widgets, icons, etc.

For example, the OSD generator 340 may generate a signal by which subtitles are displayed for a broadcast image or Electronic Program Guide (EPG)-based broadcasting information.

The mixer 350 may mix the decoded video signal with the OSD signal and output the mixed signal to the formatter 360. As the decoded broadcast video signal or the external input signal is mixed with the OSD signal, an OSD may be overlaid on the broadcast image or the external input image.

The FRC 355 may change the frame rate of an input image. For example, a frame rate of 60 Hz is converted into a frame rate of 120 or 240 Hz. When the frame rate is to be changed from 60 Hz to 120 Hz, a first frame is inserted between the first frame and a second frame, or a predicted third frame is inserted between the first and second frames. If the frame rate is to be changed from 60 Hz to 240 Hz, three identical frames or three predicted frames are inserted between the first and second frames. It is also possible to maintain the frame rate of the input image without frame rate conversion.

The formatter 360 changes the format of the signal received from the FRC 355 to be suitable for the display 180. For example, the formatter 360 may convert a received signal into an RGB data signal. The RGB signal may be output in the form of a Low Voltage Differential Signal (LVDS) or mini-LVDS.

The audio processor of the controller 170 may process the demultiplexed audio signal. For audio signal processing, the audio processor may have a plurality of decoders.

If the demultiplexed audio signal is a coded audio signal, the audio processor of the controller 170 may decode the audio signal. For example, the demultiplexed audio signal may be decoded by an MPEG-2 decoder, an MPEG-4 decoder, an Advanced Audio Coding (AAC) decoder, or an AC-3 decoder.

The audio processor of the controller 170 may also adjust the bass, treble or volume of the audio signal.

The data processor of the controller 170 may process the data signal obtained by demultiplexing the input stream signal. For example, if the data signal is an encoded signal such as an EPG which includes broadcasting information specifying the start time, end time, etc. of scheduled broadcast TV or radio programs, the controller 170 may decode the data signal. Examples of an EPG include ATSC-Program and System Information Protocol (PSIP) information and DVB-Service Information (SI).

ATSC-PSIP information or DVB-SI may be included in the header of a TS, i.e., a 4-byte header of an MPEG-2 TS.

The block diagram of the controller 170 illustrated in FIG. 10 is an embodiment of the present invention. Depending upon the specifications of the controller 170, the components of the controller 170 may be combined, or omitted. Or new components are added to the controller 170.

Figure 11:
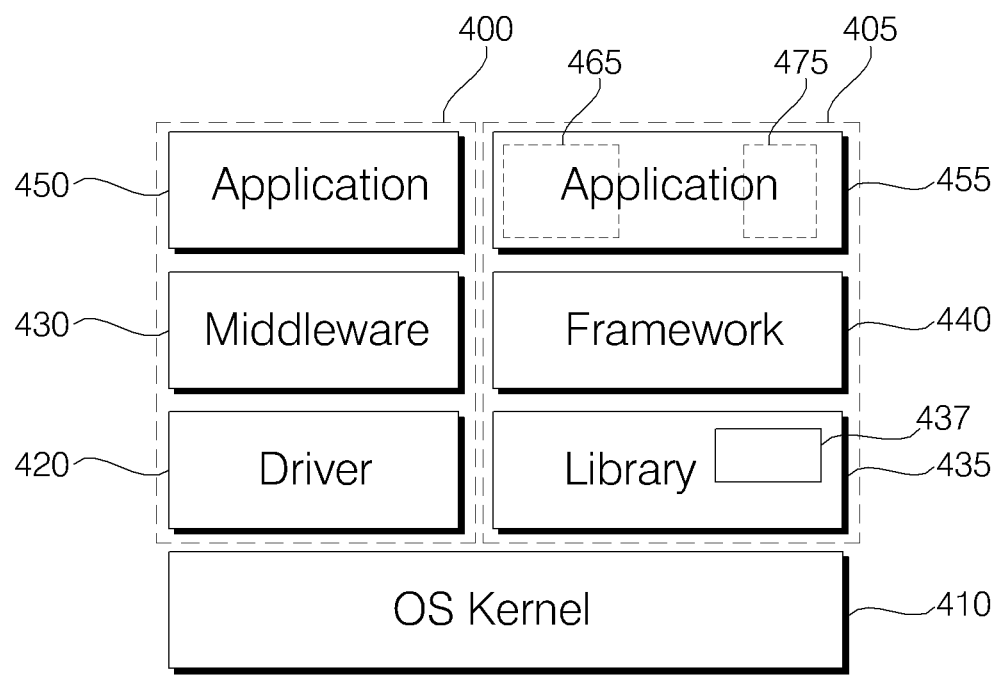
FIG. 11 illustrates a platform architecture for either of the image display apparatuses according to an embodiment of the present invention.
Figure 12:
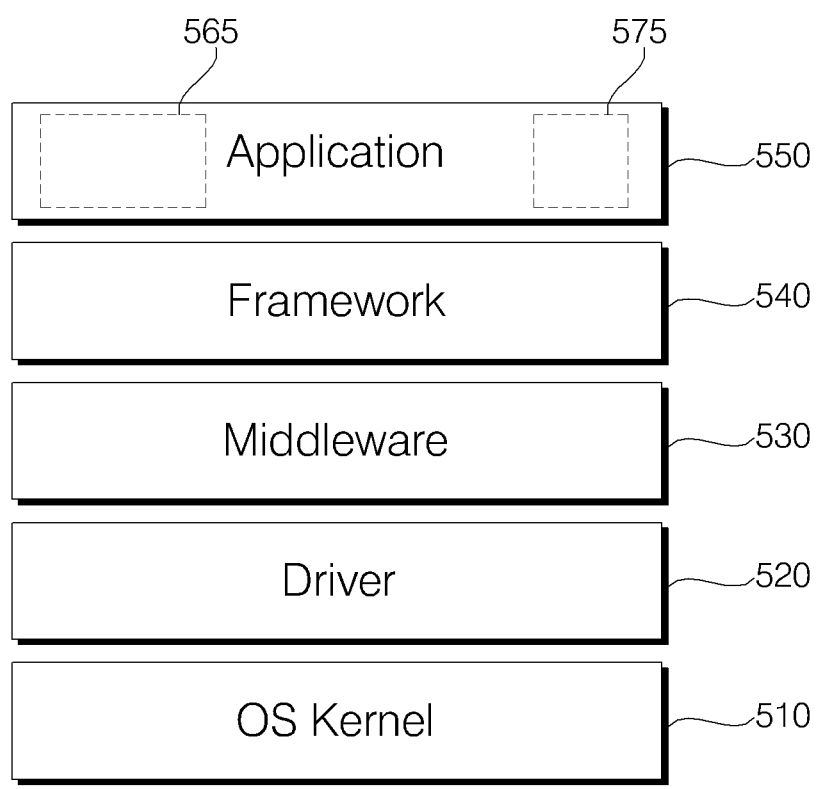
FIG. 12 illustrates a platform architecture for either of the image display apparatuses according to another embodiment of the present invention.

FIG. 11 illustrates a platform architecture for either of the image display apparatuses according to an embodiment of the present invention and FIG. 12 illustrates a platform architecture for either of the image display apparatuses according to another embodiment of the present invention.

A platform for either of the image display apparatuses may have OS-based software to implement the above-described various operations according to an embodiment of the present invention.

Referring to FIG. 11, a platform for either of the image display apparatuses is a separate type according to an embodiment of the present invention. The platform may be designed separately as a legacy system platform 400 and a smart system platform 405. An OS kernel 410 may be shared between the legacy system platform 400 and the smart system platform 405.

The legacy system platform 400 may include a stack of a driver 420, middleware 430, and an application layer 450 on the OS kernel 410.

On the other hand, the smart system platform 405 may include a stack of a library 435, a framework 440, and an application layer 455 on the OS kernel 410.

The OS kernel 410 is the core of an operating system. When the image display apparatus is driven, the OS kernel 410 may be responsible for operation of at least one of hardware drivers, security protection for hardware and processors in the image display apparatus, efficient management of system resources, memory management, hardware interfacing by hardware abstraction, multi-processing, or scheduling associated with the multi-processing. Meanwhile, the OS kernel 410 may further perform power management.

The hardware drivers of the OS kernel 410 may include, for example, at least one of a display driver, a Wi-Fi driver, a Bluetooth driver, a USB driver, an audio driver, a power manager, a binder driver, or a memory driver.

Alternatively or additionally, the hardware drivers of the OS kernel 410 may be drivers for hardware devices within the OS kernel 410. The hardware drivers may include a character device driver, a block device driver, and a network device driver. The block device driver may need a buffer for buffering data on a block basis, because data is transmitted on a block basis. The character device driver may not need a buffer since data is transmitted on a basic data unit basis, that is, on a character basis.

The OS kernel 410 may be implemented based on any of various OSs such as Unix (Linux), Windows, etc. The OS kernel 410 may be a general-purpose open OS kernel which can be implemented in other electronic devices.

The driver 420 is interposed between the OS kernel 410 and the middleware 430. Along with the middleware 430, the driver 420 drives devices for operations of the application layer 450. For example, the driver 420 may include a driver(s) for a microcomputer, a display module, a Graphic Processing Unit (GPU), the FRC, a General-Purpose Input/Output (GPIO) pin, a High-Definition Multimedia Interface (HDMI), a System Decoder (SDEC) or DEMUX, a Video Decoder (VDEC), an Audio Decoder (ADEC), a Personal Video Recorder (PVR), and/or an Inter-Integrated Circuit (I2C). These drivers operate in conjunction with the hardware drivers of the OS kernel 410.

In addition, the driver 420 may further include a driver for the remote controller 200, especially a pointing device to be described below. The remote controller driver may reside in the OS kernel 410 or the middleware 430, instead of the driver 420.

The middleware 430 resides between the OS kernel 410 and the application layer 450. The middleware 430 may mediate between different hardware devices or different software programs, for data transmission and reception between the hardware devices or the software programs. Therefore, the middleware 430 can provide standard interfaces, support various environments, and enable interaction between tasks conforming to heterogeneous communication protocols.

Examples of the middleware 430 in the legacy system platform 400 may include Multimedia and Hypermedia information coding Experts Group (MHEG) and Advanced Common Application Platform (ACAP) as data broadcasting-related middleware, PSIP or SI middleware as broadcasting information-related middleware, and DLNA middleware as peripheral device communication-related middleware.

The application layer 450 that runs atop the middleware 430 in the legacy system platform 400 may include, for example, UI applications associated with various menus in the image display apparatus. The application layer 450 may allow editing and updating over a network by user selection. With use of the application layer 450, the user may enter a desired menu among various UIs by manipulating the remote controller 210 while viewing a broadcast program.

The application layer 450 may further include at least one of a TV guide application, a Bluetooth application, a reservation application, a Digital Video Recorder (DVR) application, and a hotkey application.

In the smart system platform 405, the library 435 is positioned between the OS kernel 410 and the framework 440, forming the basis of the framework 440. For example, the library 435 may include Secure Socket Layer (SSL) being a security-related library, WebKit being a Web engine-related library, c library (libc), and Media Framework being a media-related library specifying, for example, a video format and an audio format. The library 435 may be written in C or C++. Also, the library 435 may be exposed to a developer through the framework 440.

The library 435 may include a runtime 437 with a core Java library and a Virtual Machine (VM). The runtime 437 and the library 435 form the basis of the framework 440.

The VM may be a virtual machine that enables concurrent execution of a plurality of instances, that is, multi-tasking. For each application of the application layer 455, a VM may be allocated and executed. For scheduling or interconnection between instances, the binder driver of the OS kernel 410 may operate.

The binder driver and the runtime 437 may connect Java applications to C-based libraries.

The library 435 and the runtime 437 may correspond to the middleware 430 of the legacy system platform 400.

In the smart system platform 405, the framework 440 includes programs on which applications of the application layer 455 are based. The framework 440 is compatible with any application and may allow component reuse, movement or exchange. The framework 440 may include supporting programs and programs for interconnecting different software components. For example, the framework 440 may include an activity manager related to activities of applications, a notification manager, and a CP for abstracting common information between applications. This framework 440 may be written in Java.

The application layer 455 on top of the framework 440 includes a variety of programs that are executed and displayed in the image display apparatus. The application layer 455 may include, for example, a core application that is a suit having at least one solution of e-mail, Short Message Service (SMS), calendar, map, or browser. The application layer 455 may be written in Java.

In the application layer 455, applications may be categorized into user-undeletable applications 465 stored in the image display apparatus 100 that cannot be modified and user-installable or user-deletable applications 475 that are downloaded from an external device or a network and stored in the image display apparatus.

With the applications of the application layer 455, a variety of functions such as Internet telephony, VoD, Web album, Social Networking Service (SNS), Location-Based Service (LBS), map service, Web browsing, and application search may be performed through network access. In addition, other functions such as gaming and schedule management may be performed by the applications.

Referring to FIG. 12, a platform for the image display apparatus according to another embodiment of the present invention is an integrated type. The integrated platform may include an OS kernel 510, a driver 520, middleware 530, a framework 540, and an application layer 550.

Compared to the separate-type platform illustrated in FIG. 11, the integrated-type platform is characterized by the absence of the library 435 and the application layer 550 being an integrated layer. The driver 520 and the framework 540 correspond to the driver 420 and the framework 440 of FIG. 5, respectively.

The library 435 of FIG. 11 may be incorporated into the middleware 530. That is, the middleware 530 may include both the legacy system middleware and the image display system middleware. As described before, the legacy system middleware includes MHEG or ACAP as data broadcasting-related middleware, PSIP or SI middleware as broadcasting information-related middleware, and DLNA middleware as peripheral device communication-related middleware, whereas the image display system middleware includes SSL as a security-related library, WebKit as a Web engine-related library, libc, and Media Framework as a media-related library. The middleware 530 may further include the afore-described runtime.

The application layer 550 may include a menu-related application, a TV guide application, a reservation application, etc. as legacy system applications, and e-mail, SMS, a calendar, a map, and a browser as image display system applications.

In the application layer 550, applications may be categorized into user-undeletable applications 565 that are stored in the image display apparatus and user-installable or user-deletable applications 575 that are downloaded from an external device or a network and stored in the image display apparatus.

Based on the afore-described platforms illustrated in FIGS. 11 and 12, a variety of Application Programming Interfaces (APIs) and Software Development Kits (SDKs) necessary to develop applications may be opened. APIs may be implemented functions that provide connectivity to specific sub-routines, for execution of the functions within a program. Or APIs may be implemented programs.

For example, sources related to hardware drivers of the OS kernel 410, such as a display driver, a WiFi driver, a Bluetooth driver, a USB driver or an audio driver, may be opened. Related sources within the driver 420 such as a driver for a microcomputer, a display module, a GPU, an FRC, an SDEC, a VDEC, an ADEC or a pointing device may be opened. In addition, sources related to PSIP or SI middleware as broadcasting information-related middleware or sources related to DLNA middleware may be opened.

Such various open APIs allow developers to create applications executable in the image display apparatus 100 or applications required to control operations of the image display apparatus 100 based on the platforms illustrated in FIGS. 11 and 12.

The platforms illustrated in FIGS. 11 and 12 may be general-purpose ones that can be implemented in many other electronic devices as well as in image display apparatuses. The platforms may be stored or loaded in the memory 140, the controller 170, or any other processor. To execute applications, an additional application processor may be further provided.

Figure 13:
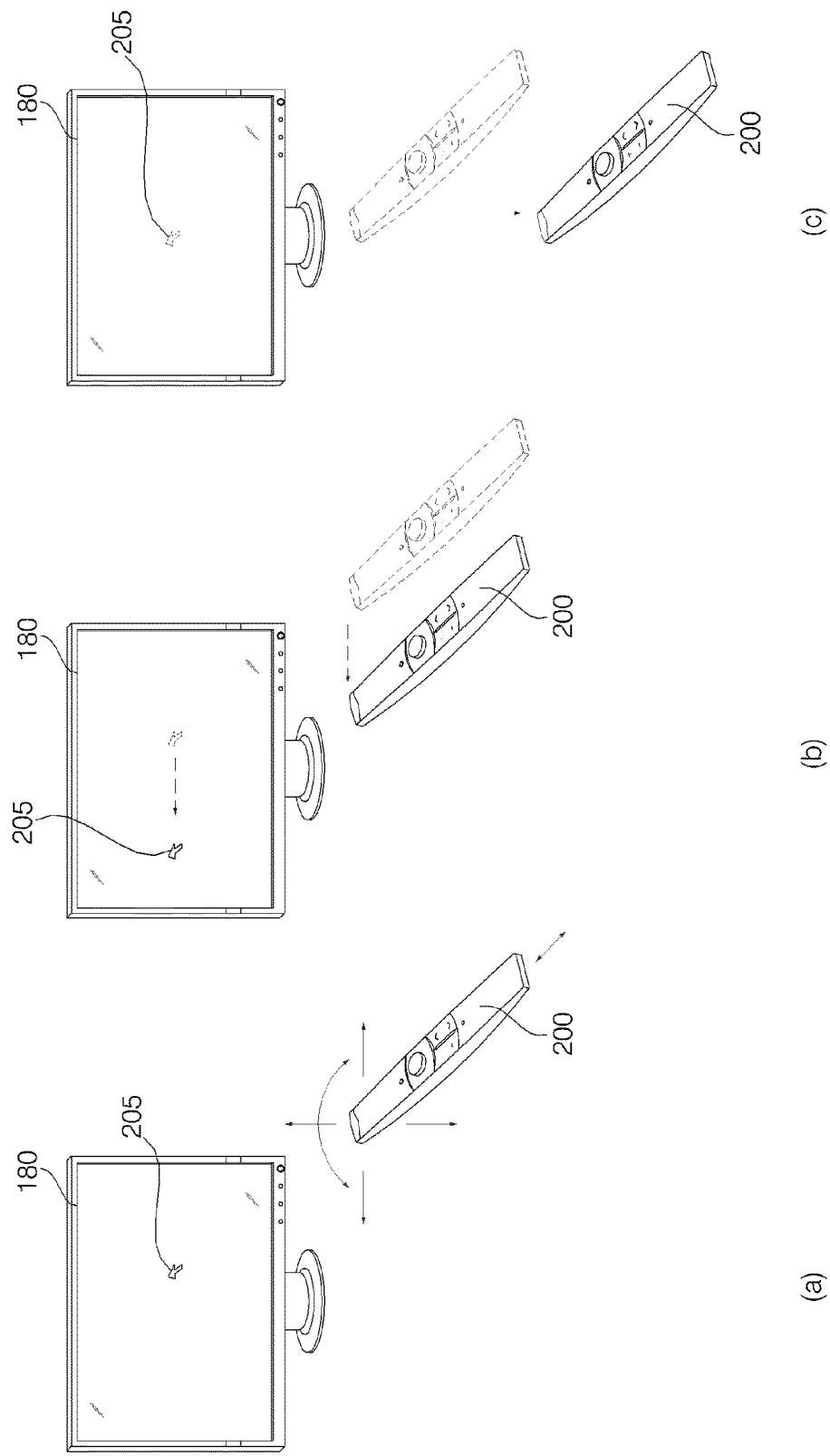
FIG. 13 illustrates a method for controlling either of the image display apparatuses in a remote controller according to an embodiment of the present invention.

FIG. 13 illustrates a method for controlling either of the image display apparatuses using a remote controller according to an embodiment of the present invention.

FIG. 13(*a*) illustrates a pointer 205 representing movement of the remote controller 200 displayed on the display 180.

The user may move or rotate the remote controller 200 up and down, side to side (FIG. 13(*b*)), and back and forth (FIG. 13(*c*)). Since the pointer 205 moves in accordance with the movement of the remote controller 200, the remote controller 200 may be referred to as a pointing device.

Referring to FIG. 13(*b*), if the user moves the remote controller 200 to the left, the pointer 205 moves to the left on the display 180. A sensor of the remote controller 200 detects the movement of the remote controller 200 and transmits motion information corresponding to the result of the detection to the image display apparatus. Then, the image display apparatus determines the movement of the remote controller 200 based on the motion information received from the remote controller 200, and calculates the coordinates of a target point to which the pointer 205 should be shifted in accordance with the movement of the remote controller 200 based on the result of the determination. The image display apparatus then displays the pointer 205 at the calculated coordinates.

Referring to FIG. 13(*c*), while pressing a predetermined button of the remote controller 200, the user moves the remote controller 200 away from the display 180. Then, a selected area corresponding to the pointer 205 may be zoomed in on and enlarged on the display 180. On the contrary, if the user moves the remote controller 200 toward the display 180, the selection area corresponding to the pointer 205 is zoomed out and thus contracted on the display 180. The opposite case is possible. That is, when the remote controller 200 moves away from the display 180, the selection area may be zoomed out and when the remote controller 200 approaches the display 180, the selection area may be zoomed in.

With the predetermined button pressed in the remote controller 200, the up, down, left and right movements of the remote controller 200 may be ignored. That is, when the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The speed and direction of the pointer 205 may correspond to the speed and direction of the remote controller 200.

The pointer 205 is an object displayed on the display 180 in correspondence with the movement of the remote controller 200. Therefore, the pointer 205 may have various shapes other than the arrow illustrated in FIG. 13. For example, the pointer 205 may be a dot, a cursor, a prompt, a thick outline, etc. The pointer 205 may be displayed across a plurality of points, such as a line and a surface, as well as at a single point on horizontal and vertical axes.

Figure 14:
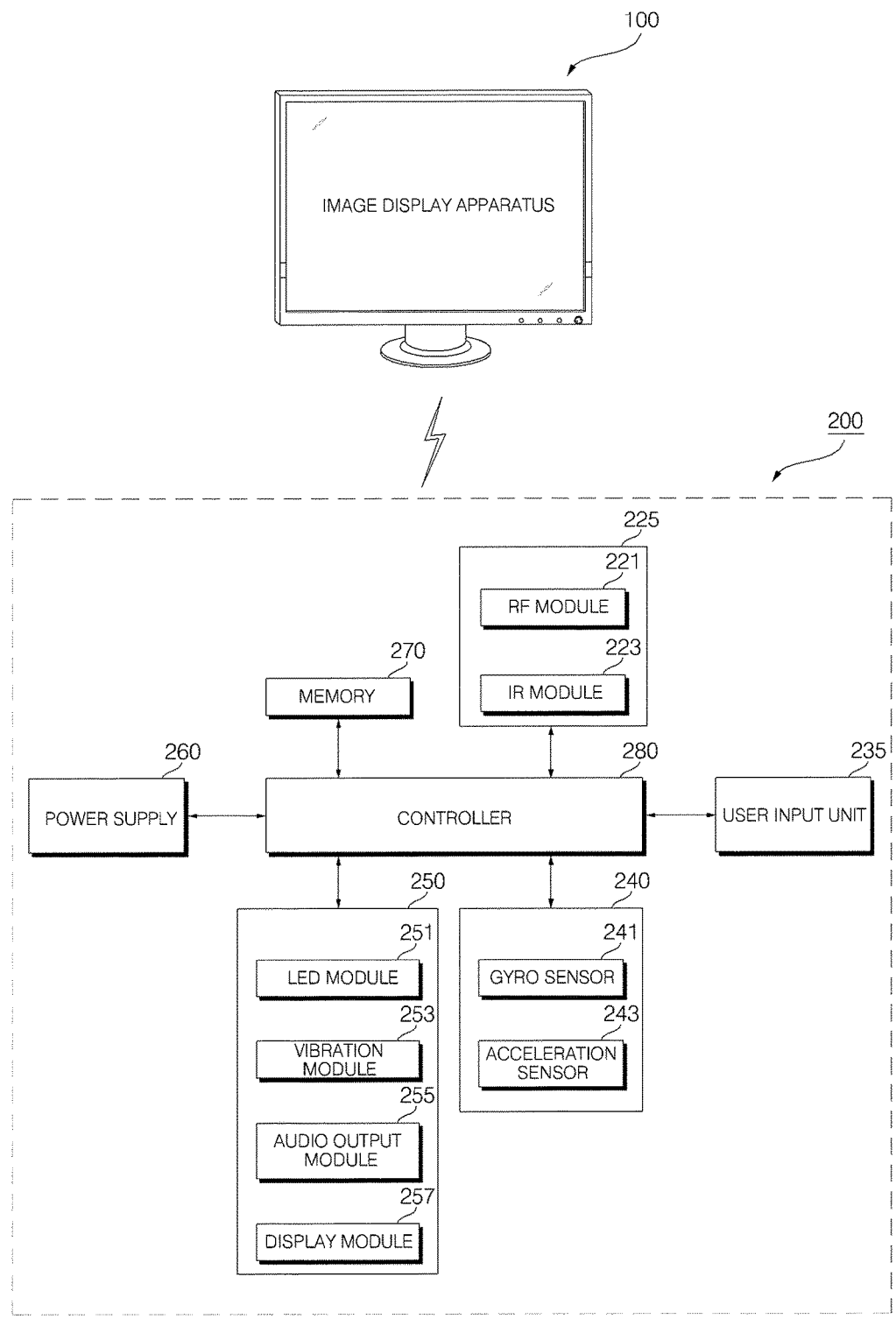
FIG. 14 is a detailed block diagram of the remote controller in either of the image display apparatuses according to an embodiment of the present invention.

FIG. 14 is a detailed block diagram of the remote controller in either of the image display apparatuses according to an embodiment of the present invention.

Referring to FIG. 14, the remote controller 200 may include a wireless communication module 225, a user input unit 235, a sensor unit 240, an output unit 250, a power supply 260, a memory 270, and a controller 280.

The wireless communication module 225 transmits signals to and/or receives signals from either of the aforedescribed image display apparatuses according to the embodiments of the present invention, herein, the image display apparatus 100.

The wireless communication module 225 may include an RF module 221 for transmitting RF signals to and/or receiving RF signals from the image display apparatus 100 according to an RF communication standard. The wireless communication module 225 may also include an IR module 223 for transmitting IR signals to and/or receiving IR signals from the image display apparatus 100 according to an IR communication standard.

The remote controller 200 transmits motion information representing the movement of the remote controller 200 to the image display apparatus 100 through the RF module 221 in this embodiment. The remote controller 200 may also receive signals from the image display apparatus 100 through the RF module 221. As needed, the remote controller 200 may transmit commands such as a power on/off command, a channel switch command, or a volume change command to the image display apparatus 100 through the IR module 223.

The user input unit 235 may include a keypad, a plurality of buttons, a touchpad and/or a touch screen. The user may enter commands to the image display apparatus 100 by manipulating the user input unit 235. If the user input unit 235 includes a plurality of hard buttons, the user may input various commands to the image display apparatus 100 by pressing the hard buttons. Alternatively or additionally, if the user input unit 235 includes a touch screen displaying a plurality of soft keys, the user may input various commands to the image display apparatus 100 by touching the soft keys. The user input unit 235 may also include various input tools other than those set forth herein, such as a scroll key and/or a jog wheel, which should not be construed as limiting the present invention.

The sensor unit 240 may include a gyro sensor 241 and/or an acceleration sensor 243. The gyro sensor 241 may sense the movement of the remote controller 200, for example, in X-, Y-, and Z-axis directions, and the acceleration sensor 243 may sense the speed of the remote controller 200. The sensor unit 240 may further include a distance sensor for sensing the distance between the remote controller 200 and the display 180.

The output unit 250 may output a video and/or audio signal corresponding to manipulation of the user input unit 235 or corresponding to a signal received from the image display apparatus 100. The user may easily identify whether the user input unit 235 has been manipulated or whether the image display apparatus 100 has been controlled, based on the video and/or audio signal output by the output unit 250.

The output unit 250 may include a Light Emitting Diode (LED) module 251 which is turned on or off whenever the user input unit 235 is manipulated or whenever a signal is received from or transmitted to the image display apparatus 100 through the wireless communication module 225, a vibration module 253 which generates vibrations, an audio output module 255 which outputs audio data, and/or a display module 257 which outputs video data.

The power supply 260 supplies power to the remote controller 200. If the remote controller 200 is kept stationary for a predetermined time or longer, the power supply 260 may, for example, reduce or shut off supply of power to the spatial remote controller 200 in order to save power. The power supply 260 may resume power supply if a predetermined key on the spatial remote controller 200 is manipulated.

The memory 270 may store various types of programs and application data necessary to control or drive the remote controller 200. The spatial remote controller 200 may wirelessly transmit signals to and/or receive signals from the image display apparatus 100 over a predetermined frequency band with the aid of the RF module 221. The controller 280 of the remote controller 200 may store information regarding the frequency band used for the remote controller 200 to wirelessly transmit signals to and/or wirelessly receive signals from the paired image display apparatus 100 in the memory 270, for later use.

The controller 280 provides overall control to the remote controller 200. The controller 280 may transmit a signal corresponding to a key manipulation detected from the user input unit 235 or a signal corresponding to motion of the spatial remote controller 200, as sensed by the sensor unit 240, to the image display apparatus 100.

FIGS. 15 to 18 illustrate UIs in either of the image display apparatuses according to embodiments of the present invention.

Figure 15:
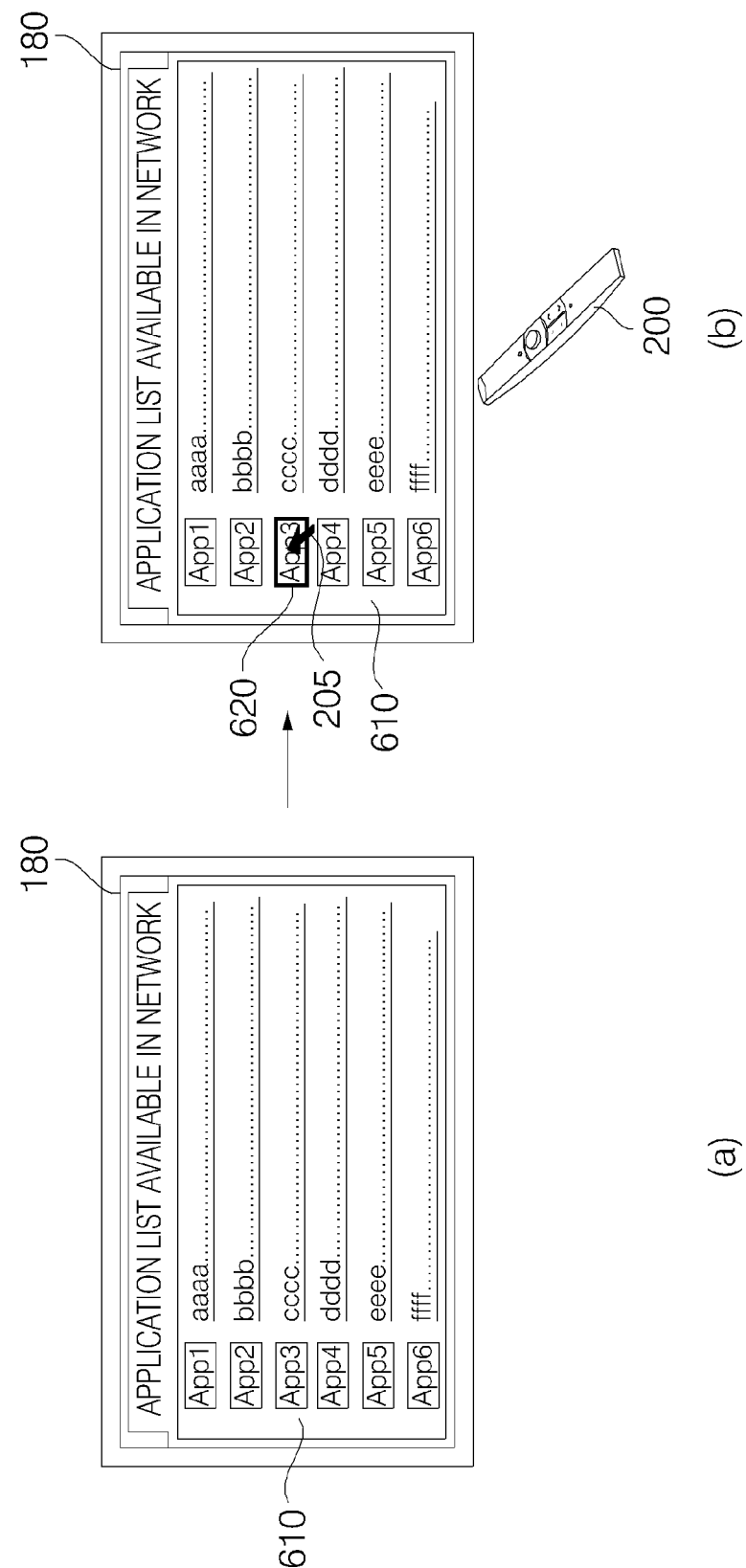
FIG. 15 illustrates a UI in either of the image display apparatuses according to an embodiment of the present invention.

Referring to FIG. 15, an application list available from a network is displayed on the display 180. A user may access a CP or an NP directly, search for various applications, and download the applications from the CP or the NP.

Specifically, FIG. 15(a) illustrates an application list 610 available in a connected server, displayed on the display 180. The application list 610 may include an icon representing each application and a brief description of the application. Because each of the image display apparatuses according to the embodiments of the present invention is capable of full browsing, it may enlarge the icons or descriptions of applications received from the connected server on the display 180. Accordingly, the user can readily identify applications, which will be described later.

FIG. 15(b) illustrates selection of one application 620 from the application list 610 using the pointer 205 of the remote controller 200. Thus, the selected application 620 may be easily downloaded.

Figure 16:
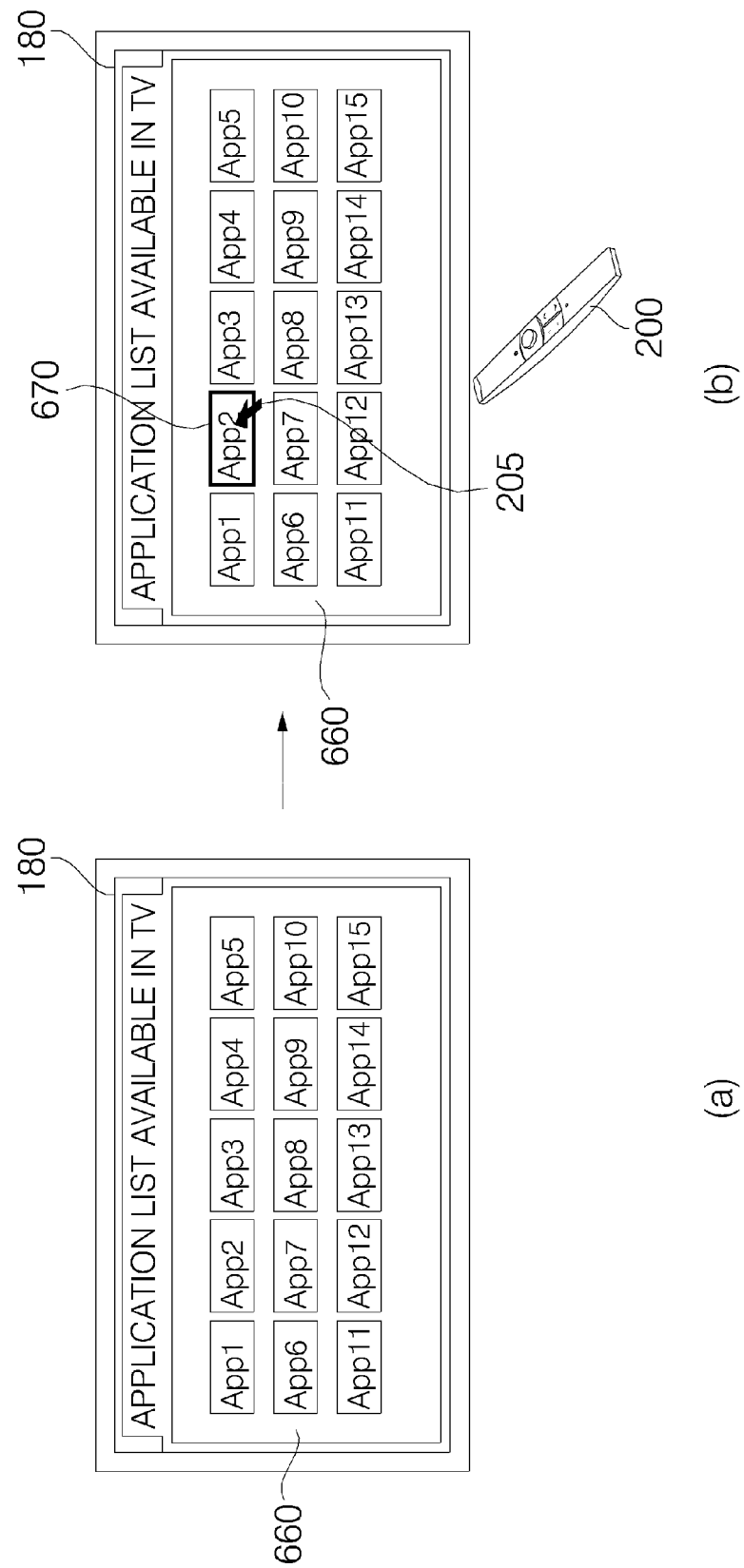
FIG. 16 illustrates a UI in either of the image display apparatuses according to another embodiment of the present invention.

FIG. 16 illustrates an application list available in the image display apparatus, displayed on the display 180. Referring to FIG. 16(a), when the user selects an application list view menu by manipulating the remote controller 200, a list of applications 660 stored in the image display apparatus is displayed on the display 180. While only icons representing the applications are shown in FIG. 16, the application list 660 may further include brief descriptions of the applications, like the application list 610 illustrated in FIG. 15. Therefore, the user can readily identify the applications.

FIG. 16(b) illustrates selection of one application 670 from the application list 660 using the pointer 205 of the remote controller 200. Thus, the selected application 670 may be easily executed.

While it is shown in FIGS. 15 and 16 that the user selects a desired application by moving the pointer 205 using the remote controller 200, the application may be selected in many other ways. For example, the user may select a specific application using a cursor displayed on the display 180 by a combined input of a local key and an OK key in the remote controller 200.

In another example, if the remote controller 200 has a touch pad, the pointer 205 moves on the display 180 according to touch input of the touch pad. Thus the user may select a specific menu using the touch-based pointer 205.

Figure 17:
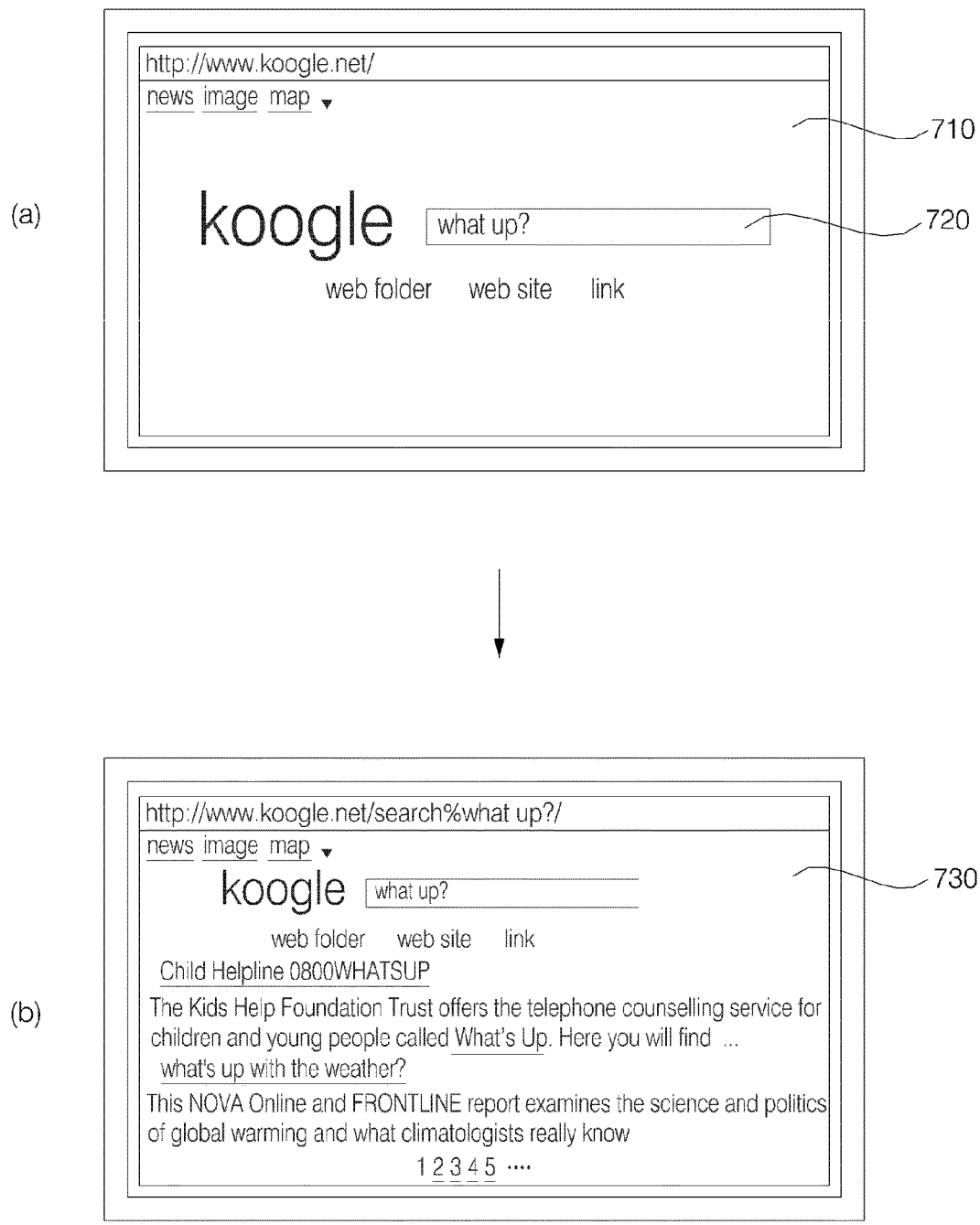
FIG. 17 illustrates a UI in either of the image display apparatuses according to another embodiment of the present invention.

FIG. 17 illustrates a Web page displayed on the display 180. Specifically, FIG. 17(a) illustrates a Web page 710 with a search window 720, displayed on the display 180. The user may enter a character into the search window 720 by use of character keys of a keypad displayed on a screen, character keys provided as local keys, or character keys of the remote controller 200.

FIG. 17(b) illustrates a search result page 730 having search results matching a keyword entered into the search window 720. Since the image display apparatuses according to the embodiments of the present invention are capable of fully browsing a Web page, the user can easily read the Web page.

Figure 18:
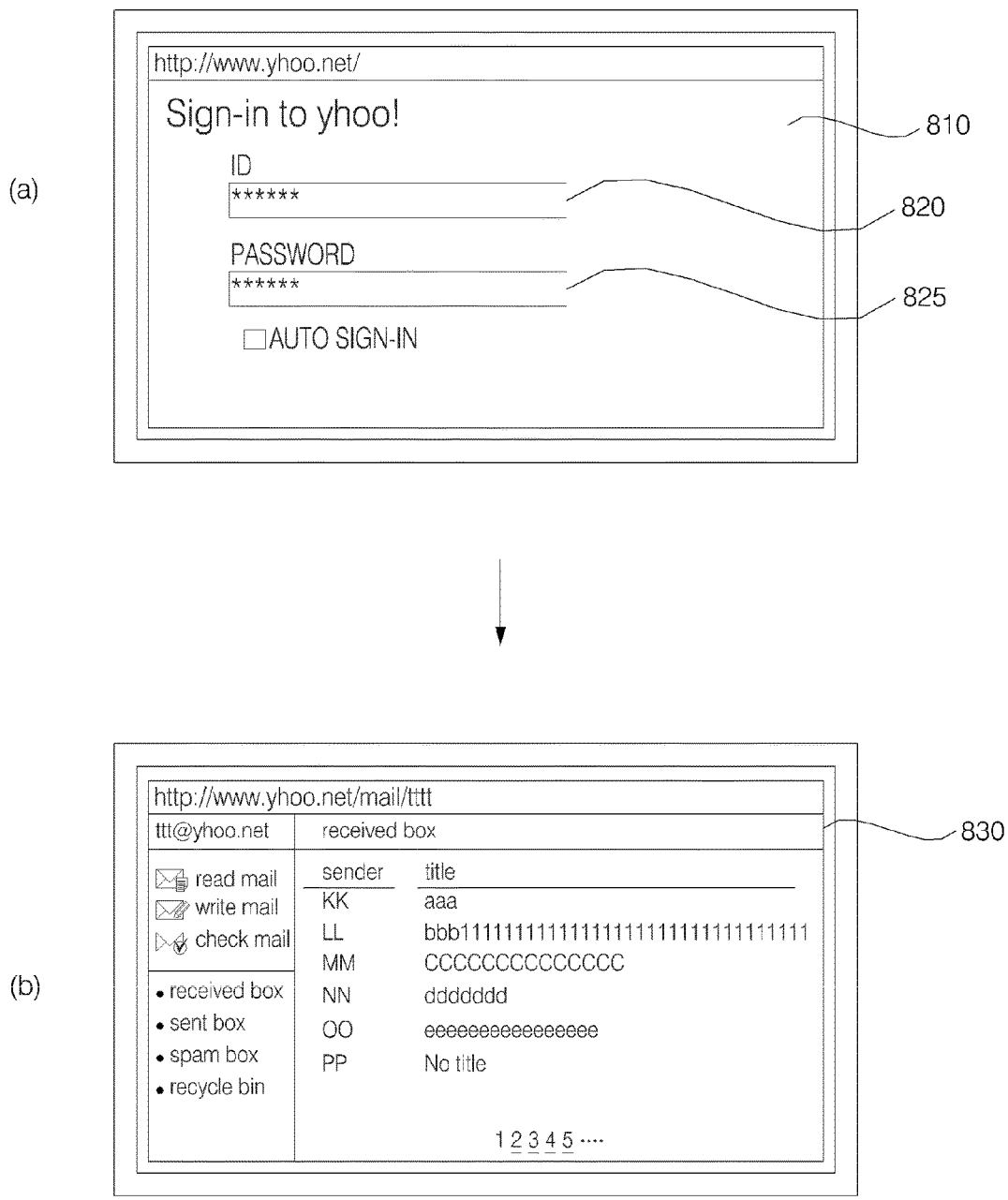
FIG. 18 illustrates a UI in either of the image display apparatuses according to a further embodiment of the present invention.

FIG. 18 illustrates another Web page displayed on the display 180. Specifically, FIG. 18(a) illustrates a mail service page 810 including an ID input window 820 and a password input window 825, displayed on the display 180. The user may enter a specific numeral and/or text into the ID input window 820 and the password input window 825 using a keypad displayed on the mail service page 810, character keys provided as local keys, or character keys of the remote controller 200. Hence, the user can log in to a mail service.

FIG. 18(b) illustrates a mail page 830 displayed on the display 180, after log-in to the mail service. For example, the mail page 830 may contains items "read mail", "write mail", "sent box", "received box", "recycle bin", etc. In the "received box" item, mail may be ordered by sender or by title.

The image display apparatuses according to the embodiments of the present invention are capable of full browsing when displaying a mail service page. Therefore, the user can use the mail service conveniently.

Figure 19:
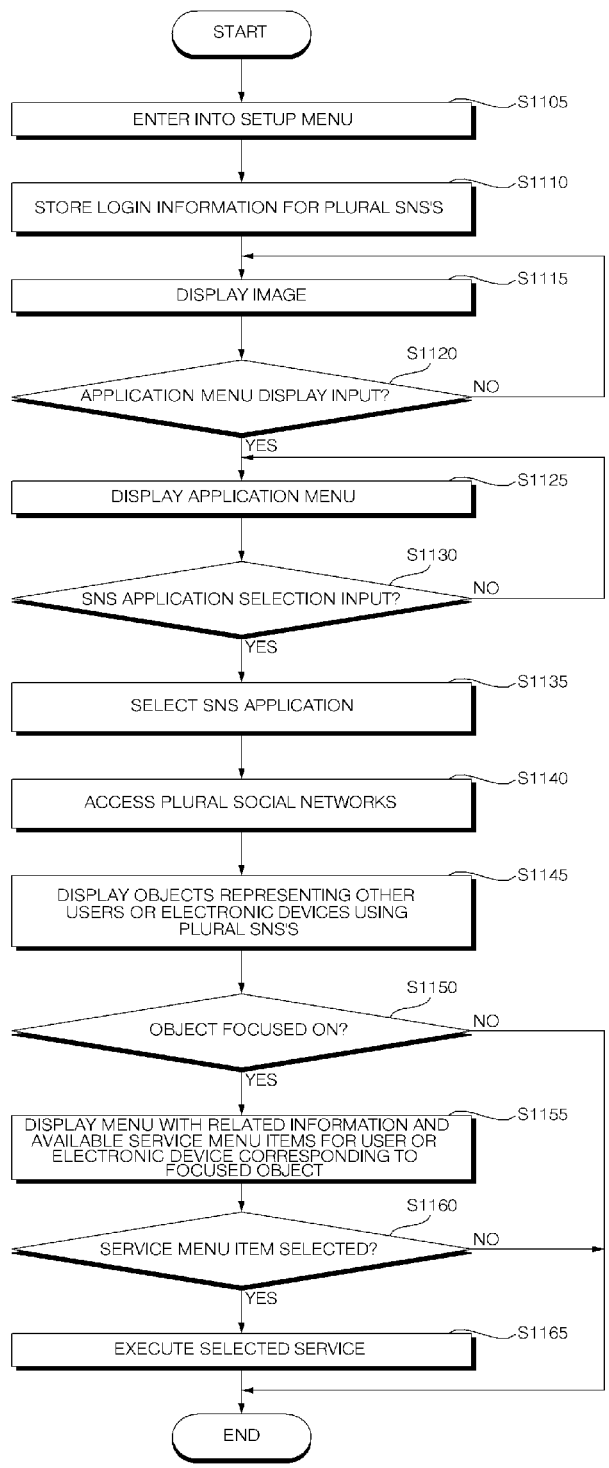
FIG. 19 is a flowchart illustrating a method for operating an image display apparatus according to an embodiment of the present invention.

FIG. 19 is a flowchart illustrating a method for operating an image display apparatus according to an embodiment of the present invention, and FIGS. 20 to 45 are views referred to for describing the method for operating an image display apparatus illustrated in FIG. 19.

Referring to FIG. 19, the image display apparatus 100 enters a setup menu (S1105). Specifically, the controller 170 enters the setup menu according to a control signal received from a local key or the remote controller 200.

Figure 22:
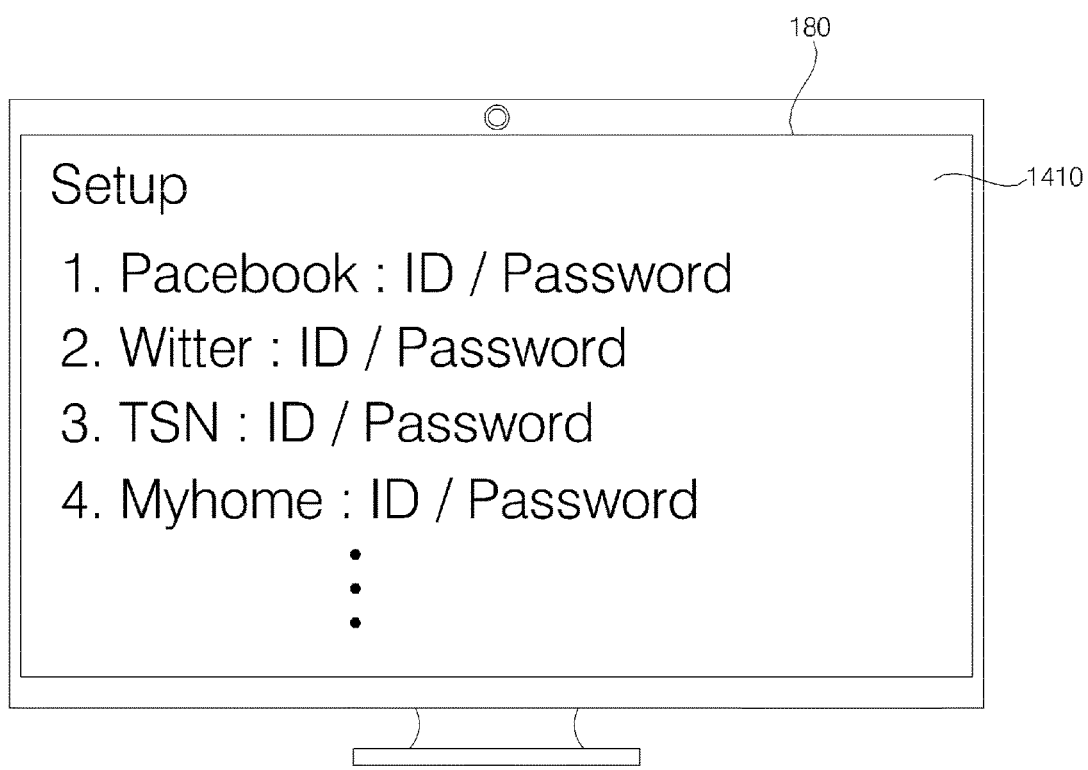

FIG. 21 illustrates exemplary selection of a setup object 1318 using the pointer 205 that moves in correspondence with movement of the remote controller 200, with a broadcast image 1315 and the setup object 1318 displayed on the display 180. Upon selection of the setup object 1318, a setup menu 1410 appears on the display 180, as illustrated in FIG. 22.

In FIG. 21, the broadcast image 1315 is displayed along with various types of content, by way of example.

The screen configuration illustrated in FIG. 21 may be a default screen configuration for a smart TV. The screen may be set as an initial screen that is displayed when the image display apparatus 100 is powered on, or as a default screen that is displayed when a local key or a Home key of the remote controller 200 is manipulated. A card object area and an application menu area may be defined on the screen.

The card object area may include a plurality of card objects 1310, 1330 and 1350 classified according to content sources. In FIG. 21, the card object 1310 is named BROADCAST and displays a broadcast image. The card object 1330 is named NETCAST and provides a CP list. The card object 1350, which is named APP STORE, provides a list of applications. Other card objects may further be included in the card object area, such as a card object for providing a thumbnail list of broadcast channels, a card object for providing a program list, a card object for providing a reserved program list, and a card object for providing a media list available in a device.

The BROADCAST card object 1310 may contain a broadcast image 1315, an object 1316 representing an external device, and the setup object 1318. Upon selection of the setup object 1318, the setup menu 1410 appears so that the user can set login information (an ID and a password) for a plurality of Social Network Services (SNSs), as illustrated in FIG. 22.

The NETCAST card object 1330 may contain a CP list. While Yakoo, Metflix, weather.com, Picason, and My tube are shown as CPs in the CP list in FIG. 21, others may be displayed.

The APP STORE card object 1350 may contain a list of applications available in an APP STORE. The applications may be sorted, for example, by popularity (HOT) and by time (NEW) as illustrated in FIG. 21, which should not be interpreted as limiting the present invention.

While the three card objects 1310, 1330 and 1350 are shown in FIG. 21 as displayed on the display 180, this is purely exemplary. Thus, the number of displayed card objects may be changed. For instance, the card object 1310 may be displayed alone or along with another card object on the display 180.

Any of the card objects displayed on the display 180 may be exchanged with another card object. Specifically, the card object 1330 or 1350 may be exchanged with any other card object according to a control signal received from a local key or the remote controller 200, thereby allowing the user to simply select an intended service. Herein, the card object 1310 having the broadcast image 1315 may be kept displayed so that the user can continue viewing the broadcast image 1315.

An application menu 1320 may be displayed in the application menu area defined on a lower part of the display 180. The application menu 1320 includes a plurality of application menu items, particularly preferred application menu items (Search and App Store) and optional application menu items (DVR, Bluray, MAZON, and SNS) set by the user. The SNS menu item may represent an application that can execute a plurality of SNSs.

With the setup object 1318 displayed on the display 180, the user may enter the setup menu using the pointer 205 of the controller 200, which should not be interpreted as limiting the present invention. To enter the setup menu, many other settings are possible. For instance, the setup menu may be directly entered through input of a Setup key of the remote controller 200. With the setup object 1318 displayed on the display 180, the setup menu may be directly entered through input of a local key or through input of a directional key and/or an OK key of the remote controller 200.

Login information for a plurality of SNSs is stored in the setup menu (S1110).

Referring to FIG. 22, the user sets login information for a plurality of SNSs such as Pacebook, Witter, TSN, and Myhome in the setup menu 1410, by way of example. Other SNSs including blogs and messengers are also available. The login information may include an ID and a password.

The user may enter an ID and a password for each SNS using local keys, letter keys of the remote controller 200, or a letter key object displayed on the display 180.

Upon receipt of a save input for the login information after the login information is completely entered, the controller 170 controls saving of the login information in the memory 140.

FIG. 20 illustrates an example of data transmission and reception between the image display apparatus 100 and social network servers 1210-1 to 1210-*n* that provide a plurality of SNSs. In accordance with an embodiment of the present invention, the image display apparatus 100 may access the plurality of SNSs and display the SNSs or other users or electronic devices subscribed to the SNSs on the display 180. Herein, the term 'other electronic devices' may refer to electronic devices (e.g. mobile phones, PCs, TVs, etc.) registered with the SNSs.

If an SNS is not accessible using login information set for the SNS, the controller 170 may display an object notifying that the login information is not valid on the display 180.

Since login information is preliminarily stored for a plurality of SNSs as described above, the user may directly access the SNSs using the stored login information without a login procedure.

After the login information is stored, an image is displayed on the display 180 (S1115). Specifically, once the setup menu is exited, the controller 170 controls display of an image on at least a part of the display 180. The image may be a broadcast image or an external input image.

Upon completion of saving the login information in the setup menu 1410 of FIG. 22 triggered by selecting the setup object 1318 of FIG. 21, the image display apparatus 100 may return to the screen of FIG. 21 or 23 in which the broadcast image 1315 is displayed on a part of the display 180.

Figure 26:
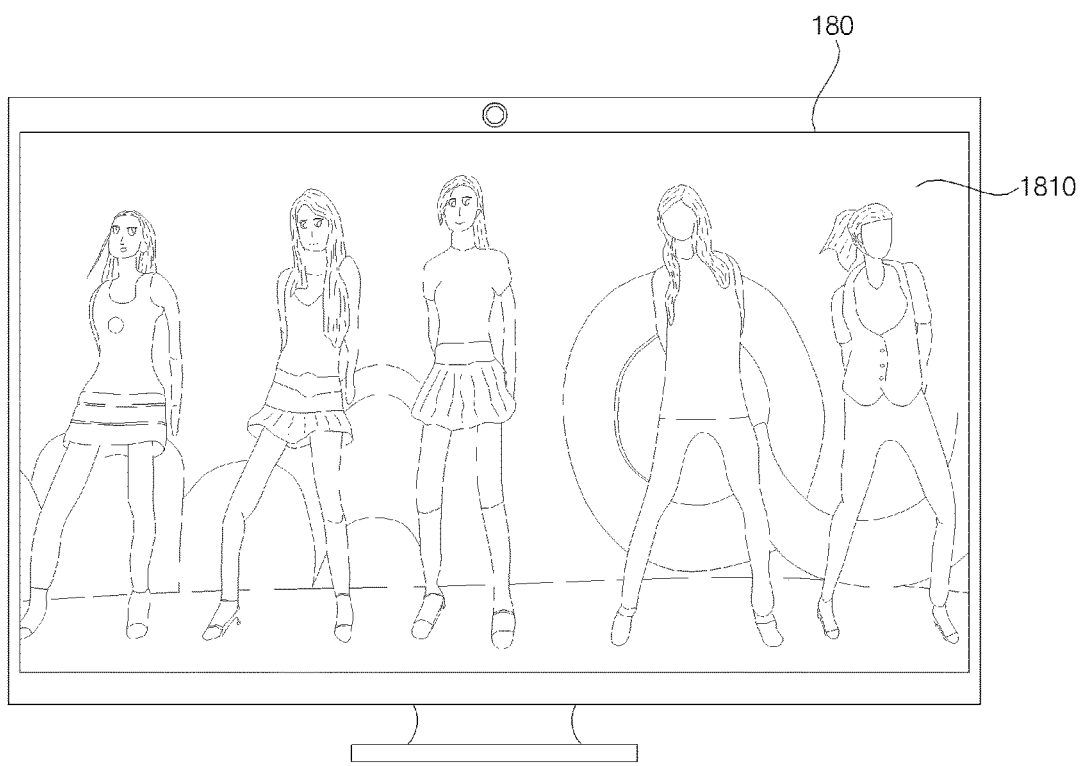

FIG. 26 illustrates an exemplary broadcast image 1810 fullscreened on the display 180. When the setup menu 1410 is exited, the broadcast image 1810 may be displayed alone on the display 180, compared to the screen illustrated in FIG. 21 or 23.

It is determined whether an application menu display input has been received (S1120). Upon receipt of the application menu display input, an application menu is displayed on at least a part of the display 180 (S1125).

More specifically, the controller 180 monitors receipt of the application menu display input according to a control signal received from a local key or the remote controller 200. Upon receipt of the application menu display input, the controller 180 controls display of the application menu on at least a part of the display 180.

The application menu display input may be created using an additional menu displayed on the display 180, using a local key set as a hot key, or a hot key provided in the remote controller 200. The hot key functions to directly open an application menu.

Figure 27:
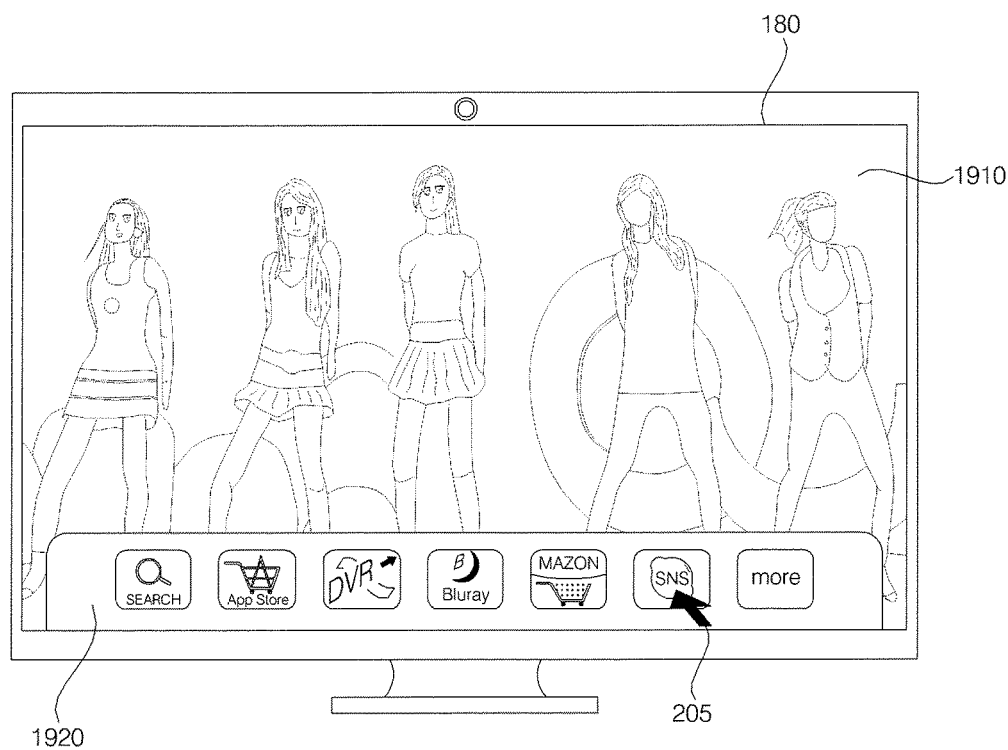

FIG. 27 illustrates an example in which an application menu 1920 is displayed along with an already displayed broadcast image 1910. Upon receipt of the application menu display input while the broadcast image 1810 is being displayed as illustrated in FIG. 26, the application menu 1920 is additionally displayed on the lower part of the display 180 as illustrated in FIG. 27.

Unlike the screen configuration illustrated in FIG. 27, the screen illustrated in FIG. 21 or FIG. 23 is configured so as to include the application menu 1320. Therefore, when the image display apparatus 100 is powered on or a local key or the Home key of the remote controller is manipulated, the application menu 1320 may be displayed.

It is determined whether an SNS selection input has been received (S1130). Upon receipt of the SNS selection input, the SNS application menu item is selected in the application menu (S1135). Subsequently, a plurality of social network servers are accessed based on the stored login information (S1140) and objects representing other users or electronic devices subscribed to the plurality of SNSs are displayed on at least a part of the display 180 (S1145).

Specifically, the controller 170 determines whether an application menu item representing SNS has been selected in the application menu according to a control signal received from a local key or the remote controller 200. Upon selection of the SNS application menu item, the controller 170 controls execution of the SNSs. That is, the controller 170 controls access to a plurality of social network servers using the stored login information and controls display of objects representing other users or electronic devices subscribed to the plurality of SNSs on at least a part of the display 180.

FIG. 23 illustrates exemplary selection of an application menu item 1326 representing SNS in the application menu 1320 using the pointer 205 of the remote controller 200. The selection of the SNS application menu item 1326 triggers execution of a plurality of SNSs.

Figure 24:
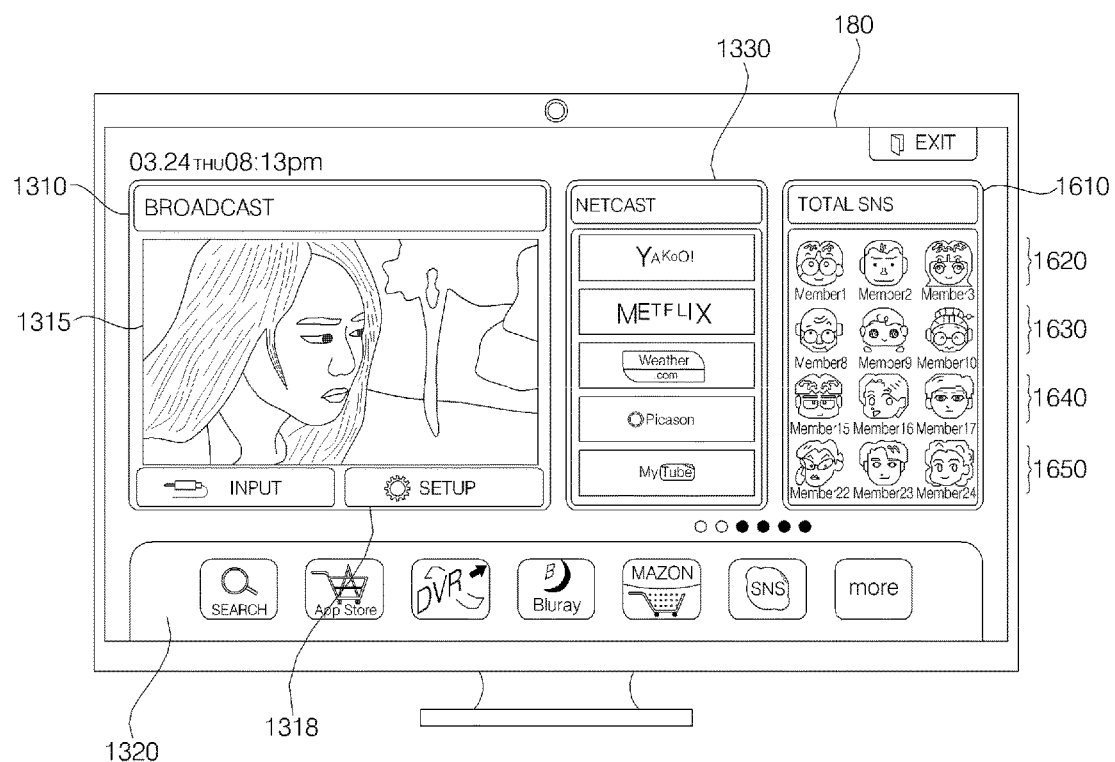

FIG. 24 illustrates exemplary display of a card object 1610 named TOTAL SNS, representing a plurality of SNSs on the display 180, upon execution of the SNSs. It is noted that the APP STORE card object 1350 representing an application list has been replaced with the TOTAL SNS card object 1610 on the display 180.

The TOTAL SNS card object 1610 contains objects representing other users or electronic devices subscribed to the plurality of SNSs. Each of these objects may include an avatar, an image, an icon, or text indicating a name, which represents a user or electronic device. The objects may be sorted by SNS. The term used herein 'other electronic devices' may refer to electronic devices registered with the plurality of SNSs, such as mobile phones, PCs, TVs, etc.

In FIG. 24, the objects are sorted from a first SNS to a fourth SNS. Specifically, objects 1620 represent other users or electronic devices subscribed to the first SNS, objects 1630 represents other users or electronic devices subscribed to the second SNS, objects 1640 represent other users or electronic devices subscribed to the third SNS, and objects 1650 represent other users or electronic devices subscribed to the fourth SNS. Meanwhile, the objects may be sorted such that logged-in users are distinguished from logged-out users in the card object 1610. Also, the objects may be sorted according to user-set groups (e.g. friend, family, company, etc.)

In this manner, a plurality of SNSs are displayed on at least a part of the display 180, thereby allowing the user to easily identify other users or electronic devices subscribed to each SNS in the embodiment of the present invention. Accordingly, user convenience is increased.

As stated before with reference to FIG. 22, login information necessary to access the first to fourth SNSs may be stored in advance.

Figure 28:
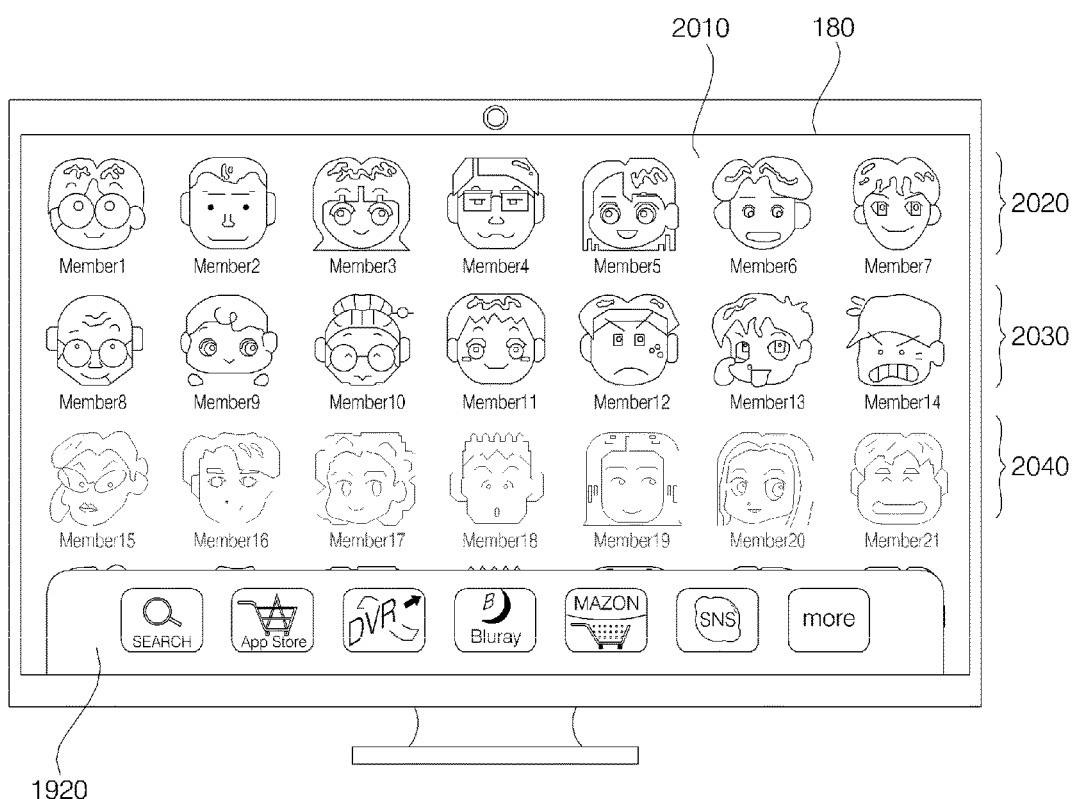

FIG. 28 illustrates an exemplary object screen 2010 containing objects representing other users or electronic devices subscribed to a plurality of SNSs, displayed on the display 180. Each of the objects may include an avatar, an image, an icon, or text, which represents a user or electronic device. The objects may be sorted by SNS or from logged-in users to logged-out users. The term used herein 'other electronic devices' may refer to electronic devices such as mobile phones, PCs, TVs, etc. registered with the SNSs.

In FIG. 28, objects 2020 and objects 2030 are arranged in different rows. The objects 2020 represent other users or electronic devices logged-in to the first SNS and the objects 2030 represent other users or electronic devices logged in to the second SNS. Objects 2040 representing other users or electronic devices logged out from the first or second SNS are arranged in a row. To distinguish the objects 2020 and 2030 representing the logged-in users from the object 2040 representing the logged-out users, the objects 2040 may be displayed differently from the objects 2020 and 2030, in terms of at least one of color, brightness, contrast or outline thickness. Therefore, the user can readily distinguish the logged-in users from the logged-out users.

Because the object screen 2010 illustrated in FIG. 28 is larger than the card object 1610 illustrated in FIG. 24, the object screen 2010 may display more objects than the card object 1610. Hence, the user can more easily identify other users of the SNSs.

It is also possible to continue to display the application menu 1920 in the lower part of the display 180 along with the objects 2020, 2030 and 2040 representing other users or electronic devices of the SNSs, as illustrated in FIG. 28.

Figure 29:
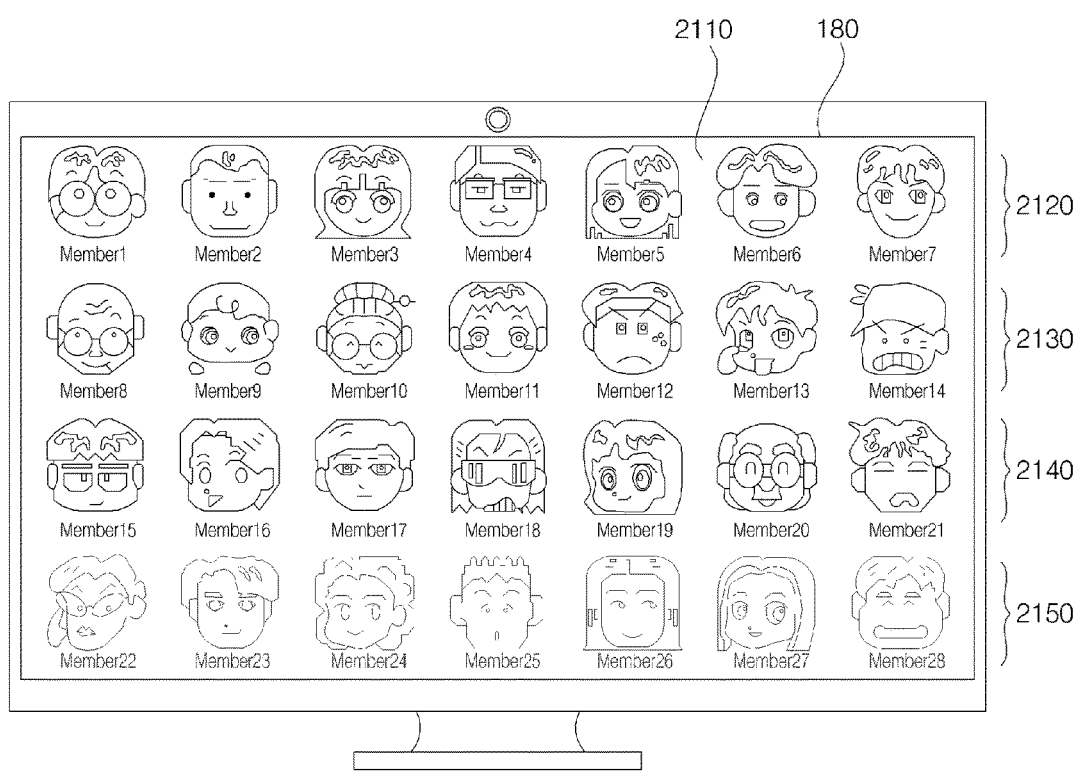

On the other hand, FIG. 29 illustrates an example of displaying an object screen 2110 alone without the application menu 1920. Referring to FIG. 29, in addition to objects 2120, 2130 and 2140 representing other users or electronic devices logged-in to the first and second SNSs, objects 2140 representing other users or electronic devices logged-in to a third SNS are arranged in a row. Thus the objects 2120, 2130 and 2140 are distinguished from one another on a row basis. Objects 2150 representing other users or electronic devices logged-out from the first, second and third SNSs are arranged in a row. Therefore, the user can readily tell the logged-in users from the logged-out users.

Figure 30:
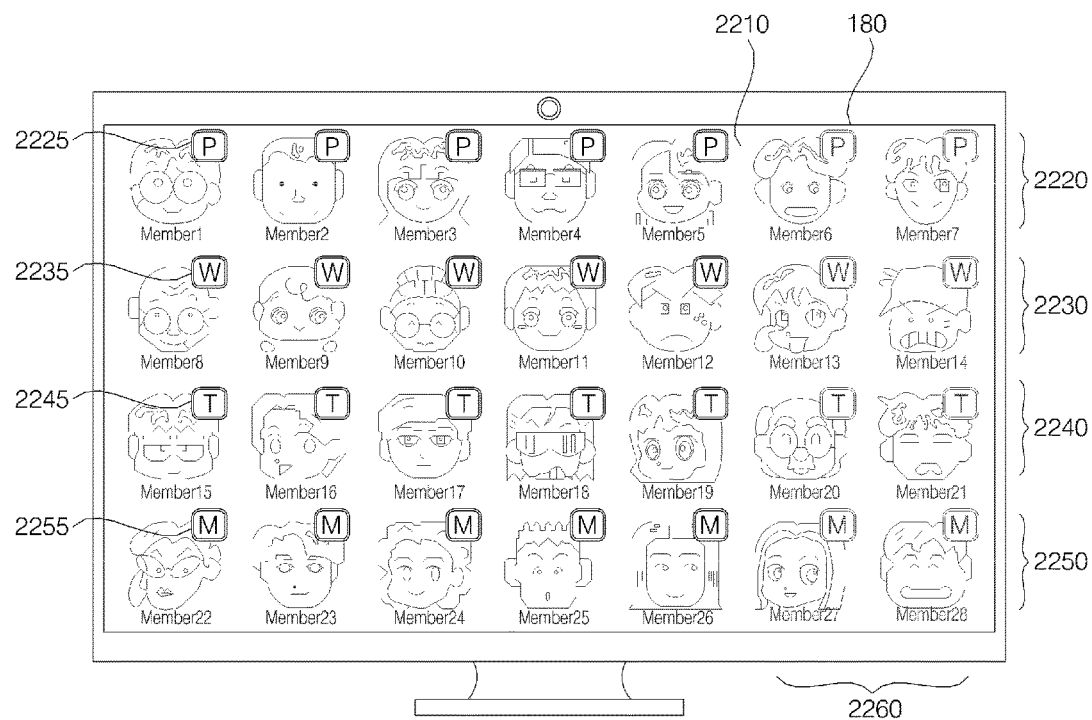

The screen configuration of FIG. 30 is the same as the screen configuration of FIG. 29 in that an object screen 2210 is displayed alone on the display 180 without an application menu, and different from the latter in that each object further includes an icon that identifies an SNS. Hence, the same icon represents the same SNS and different icons represent different SNSs.

Referring to FIG. 30, each of objects 2220 representing other users or electronic devices logged-in to the first SNS may include an icon 2225 indicating Pacebook besides an avatar, an image or text (member 1). Thus, the user can identify the SNSs of other users or electronic devices by such icons.

Similarly, each of objects 2230 representing other users or electronic devices logged-in to the second SNS may further include an icon 2235 indicating Witter, each of objects 2240 representing other users or electronic devices logged-in to the third SNS may further include an icon 2245 indicating TSN, and each of objects 2250 representing other users or electronic devices logged-in to the fourth SNS may further include an icon 2255 indicating Myhome.

Objects 2260 representing other users or electronic devices logged-out from the first to fourth SNSs may be different from the objects 2220 to 2250, in color, brightness, etc.

While not shown in FIG. 30, each object may further include an icon representing an electronic device connected to an SNS. For example, if a mobile phone or a TV is connected to the first SNS, an icon representing a mobile phone or a TV may further be displayed. Therefore, if different electronic devices are connected to an SNS for the same user, different icons may be displayed for the user. It is also possible to configure an object to be shaped into an electronic device connected to an SNS.

It is determined whether an object representing another user or electronic device has been focused on (S1150). Upon focusing of an object representing another user or electronic device, a menu including information about the user or electronic device or service menu items available for the user or electronic device is displayed (S1155).

Specifically, upon focusing on an object representing another user or electronic device according to a control signal received from a local key or the remote controller 200, the controller 170 may control display of a menu including information about the user or electronic device or service menu items available for the user or electronic device on the display 180.

In the menu, the information about the user or electronic device may include an ID, a nickname, and a profile of the user or electronic device, and the service menu items may include video call, voice call, SMS, and file share.

Figure 25:
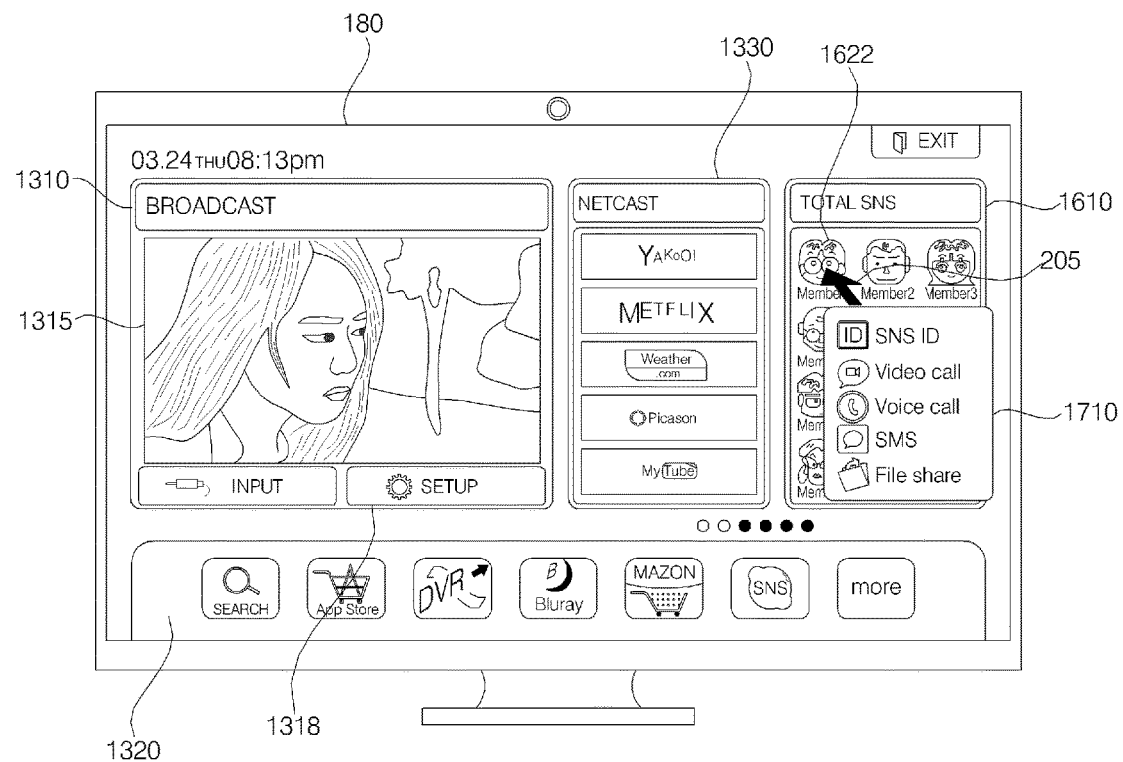

FIG. 25 illustrates an example in which with the card object 1610 displayed on the display 180, an object 1622 is focused on in the card object 1610 using the pointer 205 of the remote controller 200. Upon focusing on the object 1622, a menu 1710 including video call, voice call, SMS and file share as menu items appears in the form of a pop-up menu. However, the menu 1710 may take many other forms including a full-down menu.

FIG. 31 illustrates an example in which with the object screen 2010 displayed on the display 180, an object 2122 is focused on in the object screen 2010 using the pointer 205 of the remote controller 200. Upon focusing on the object 2122, a menu 2310 including video call, voice call, SMS and file share as menu items appears in the form of a pop-up menu. However, the menu 2310 may take many other forms including a full-down menu.

Although it is preferable to provide a common menu for a plurality of SNSs, it is also possible to provide different menus for the SNSs, if different services are provided for the SNSs.

Different menus may be provided for an object representing a logged-in user or electronic device and an object representing a logged-out user or electronic device. For example, the afore-described video call and voice call menu items may not be provided for the logged-out user or electronic device.

It is determined whether a menu item has been selected in the menu (S1160). Upon selection of a menu item, a service corresponding to the menu item is executed (S1165).

More specifically, upon selection of one of related information, video call, voice call, SMS, and file share in the menu according to a control signal received from a local key or the remote controller 200, the controller 170 may control execution of a service corresponding to the selected menu item.

FIG. 32 illustrates exemplary selection of a video call menu item 2314 in a menu 2310. Upon selection of the video call menu item 2314, at least one of the color or brightness of the video call menu item 2314 may be changed. Alternatively or additionally, the video call menu item 2314 may be highlighted. Thus, the user can easily notice that the video call menu item 2314 has been selected.

Figure 33:
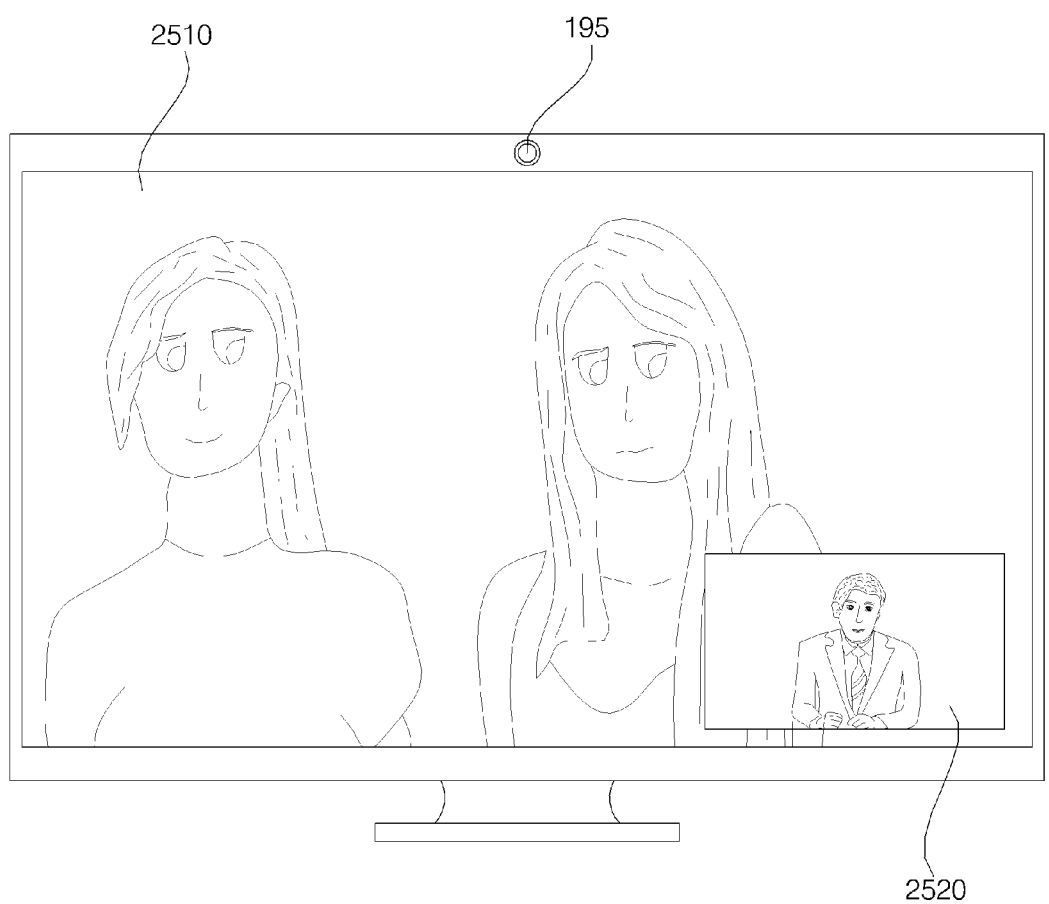

FIG. 33 illustrates an example in which a video call is placed according to the selected video call menu item 2314. Specifically, the controller 170 controls capturing of an image 2520 of the user by operating the camera module 195 of the image display apparatus 100 and controls transmission of the captured image 2520 to another user or electronic device. Then the controller 180 controls display of the captured image 2520 and a received captured image 2510 of the other user on the display 180. In this manner, the user can simply execute a desired service.

The captured image 2510 of the other user may be utilized as an object representing the other user as a subscriber to an SNS. As described above, an image object may be created based on the captured image 2510 of the other user.

FIGS. 34 to 39 are views referred to for describing automatic log-in to a plurality of Web sites.

Referring to FIG. 34, with the broadcast image 1315 and the setup object 1318 displayed on the display 180, the setup object 1318 is selected using the pointer 205 of the remote controller 200, as illustrated in FIG. 21. The selection of the setup object 1318 triggers opening of the setup menu 1410, as illustrated in FIG. 35.

Figure 35:
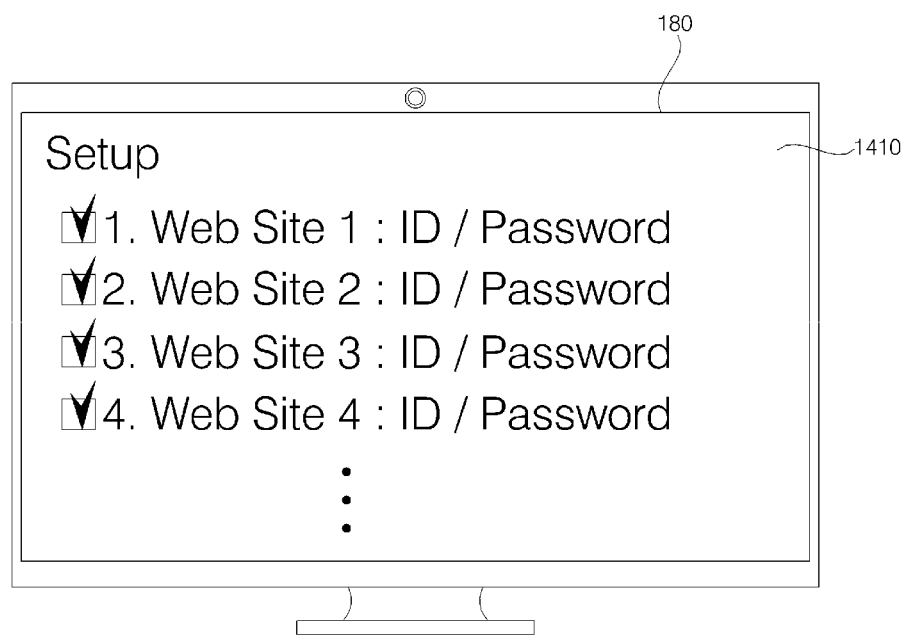

Referring to FIG. 35, the setup menu 1410 may contain a Web site list listing a plurality of Web sites along with login information for accessing the Web sites. The Web sites are shown to be Web Site 1 to Web Site 4, by way of example. The login information for each Web site may include an ID and a password.

The user may enter an ID and a password for each Web site using a local key, a letter key of the remote controller 200, or a letter key object displayed on the display 180.

Upon receipt of a save input after the login information is completely set for the plurality of Web sites, the controller 170 may control saving of the Web site list listing the plurality of Web sites along with the login information for the Web sites in the memory 140.

The user may select only a Web site that he or she wants to automatically access in the Web site list. In the illustrated case of FIG. 35, the boxes beside Web Site 1 to Web Site 4 are all checked, that is, Web Site 1 to Web Site 4 are all selected, by way of example.

As illustrated in FIG. 34, in the case where selection of the setup object 1318 triggers the setup menu 1410 of FIG. 35, the screen of FIG. 34 or FIG. 36 may be returned to, upon completion of saving the login information.

FIG. 36 illustrates exemplary selection of an application menu item 2318 representing the Internet in the application menu 1320 using the pointer 205 of the remote controller 200. Upon selection of the Internet application menu item 2318, the Internet is accessed.

Compared to the application menu 1320 illustrated in FIG. 21, the application menu 1320 illustrated in FIG. 36 further includes the Internet application menu item 2318 and a mail application menu item.

FIG. 37 illustrates an example in which once the Internet is accessed, a card object 2610 (CONNECTED SITE) representing a plurality of connected Web sites is displayed on the display 180.

Referring to FIG. 37, the APP STORE card object 1350 representing an application list has been replaced with the card object 2610.

The card object 2610 represents Web sites that have been connected based on the Web site list containing a plurality of Web sites along with login information for the Web sites, as illustrated in FIG. 35.

The card object 2610 contains a connected site list 2620. The connected site list 2620 may include icons 2630 representing automatically logged-in Web sites and text 2635 specifying the names of the Web sites.

Figure 38:
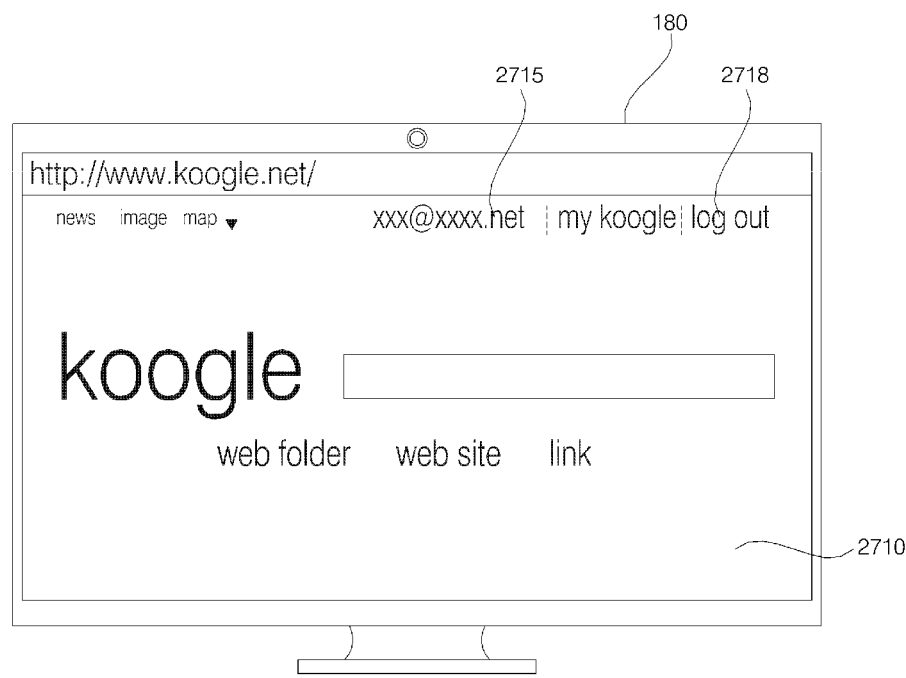

With the card object 2610 displayed on the display 180 as illustrated in FIG. 37, upon selection of an icon 2630 representing Web Site 1 using the pointer 205 of the remote controller 200, an automatically logged-in Web page 2710 is displayed on the display 180, as illustrated in FIG. 38.

Referring to FIG. 38, the automatically logged-in Web page 2710 may include a user account 2715 on the Web site and a logout menu item 2718.

Since login information for accessing a plurality of Web sites has already been stored in advance, the Web sites can be accessed directly based on the stored login information without a login procedure.

Figure 39:
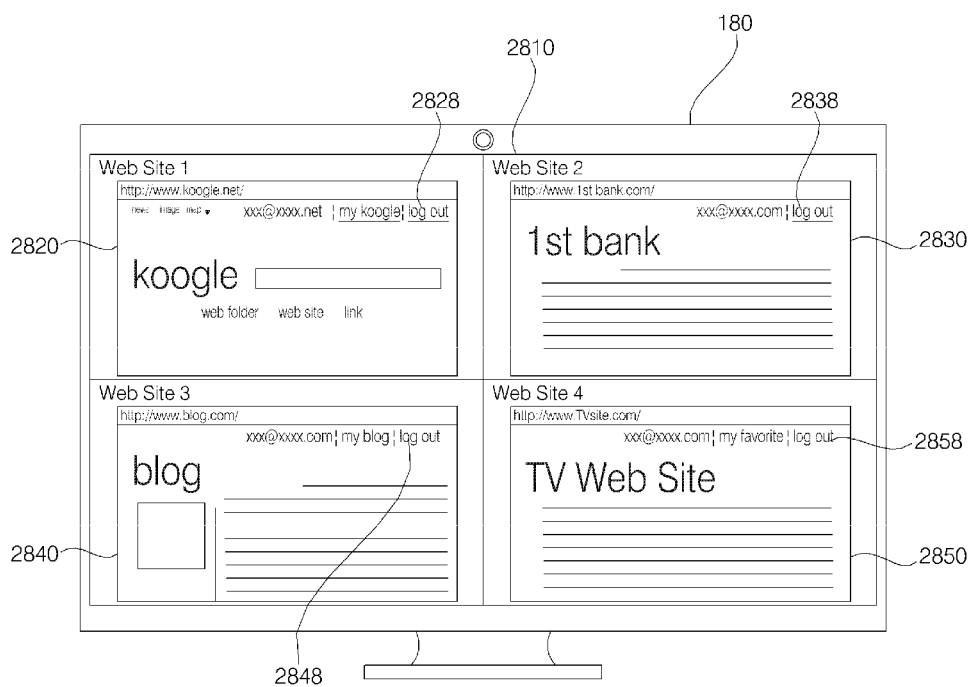

With the CONNECTED SITE card object 2610 displayed on the display 180 as illustrated in FIG. 37, upon selection of the name of the card object 2610, CONNECTED SITE using the pointer 205 of the remote controller 200, a screen 2810 including Web pages of automatically logged-in Web sites may all be displayed on the display 180, as illustrated in FIG. 39.

Upon selection of the Internet application menu item 2318 in the application menu 2320 using the pointer 205 of the remote controller 200 as illustrated in FIG. 36, the screen 2810 may be displayed on the display 180, without the card object 2610 of FIG. 37.

Referring to FIG. 39, the screen 2810 includes Web pages 2820 to 2850 of the plurality of connected Web sites, Web Site 1 to Web Site 4. Web Site 1 to Web Site 4 are shown in FIG. 39 as a search site, an Internet banking site, a Blog, and a broadcasting station site, respectively. Many other Web sites may be automatically logged in.

The Web pages 2820 to 2850 may include logout menu items 2828, 2838, 2848 and 2858, respectively. In addition, the Web pages 2820 to 2850 may include user accounts on the Web sites.

As described above, since the automatically logged-in Web pages are displayed on the single screen 2810, the user can access desired Web sites at the same time and view Web pages of the Web sites in an organized manner.

The mechanism of automatic log-in to a plurality of Web sites as described with reference to FIGS. 34 to 39 may be applicable to automatic log-in to the Web sites of CPs (Yakoo, Metflix, weather.com, Picason, and My tube) listed in the card object 1330 illustrated in FIG. 34. The App Store of the card object 1350 illustrated in FIG. 34 may also be automatically logged in. For instance, in the presence of a plurality of App Stores, the App Stores may be automatically logged in.

Web site lists, each listing a plurality of Web sites along with login information for the Web sites, as described before with reference to FIGS. 34 to 39 may be sorted on a user basis, when they are stored. It is also possible to automatically log in to the stored plurality of Web sites on a user basis, which will be described later with reference to FIGS. 40 to 45.

Each user may be identified using the camera module 195 or using information about a finger print of the users on the remote controller 200. Many other implementations are possible for identifying a user. In addition, a user may be identified based on a character input.

FIGS. 40 to 45 are views referred to for describing automatic login to a plurality of Web sites on a user basis.

Referring to FIG. 40, the BROADCAST card object 1310 for displaying the broadcast image 1315, the NETCAST card object 1320 for providing a CP list, the APP STORE card object 1350 for providing an application list, and an application menu 2320 are displayed on the display 180, like the screen configuration of FIG. 34. However, a login menu item 2910 may be displayed above the card object 1330 or 1350, unlike FIG. 34.

The login menu item 2910 may be used to identify a user. For example, the login menu item 2910 may be used, when a user accesses a Web site, receives content from a CP, accesses an App Store, logs in to a network connected to the image display apparatus 100, or logs in to the image display apparatus 100.

Figure 41:
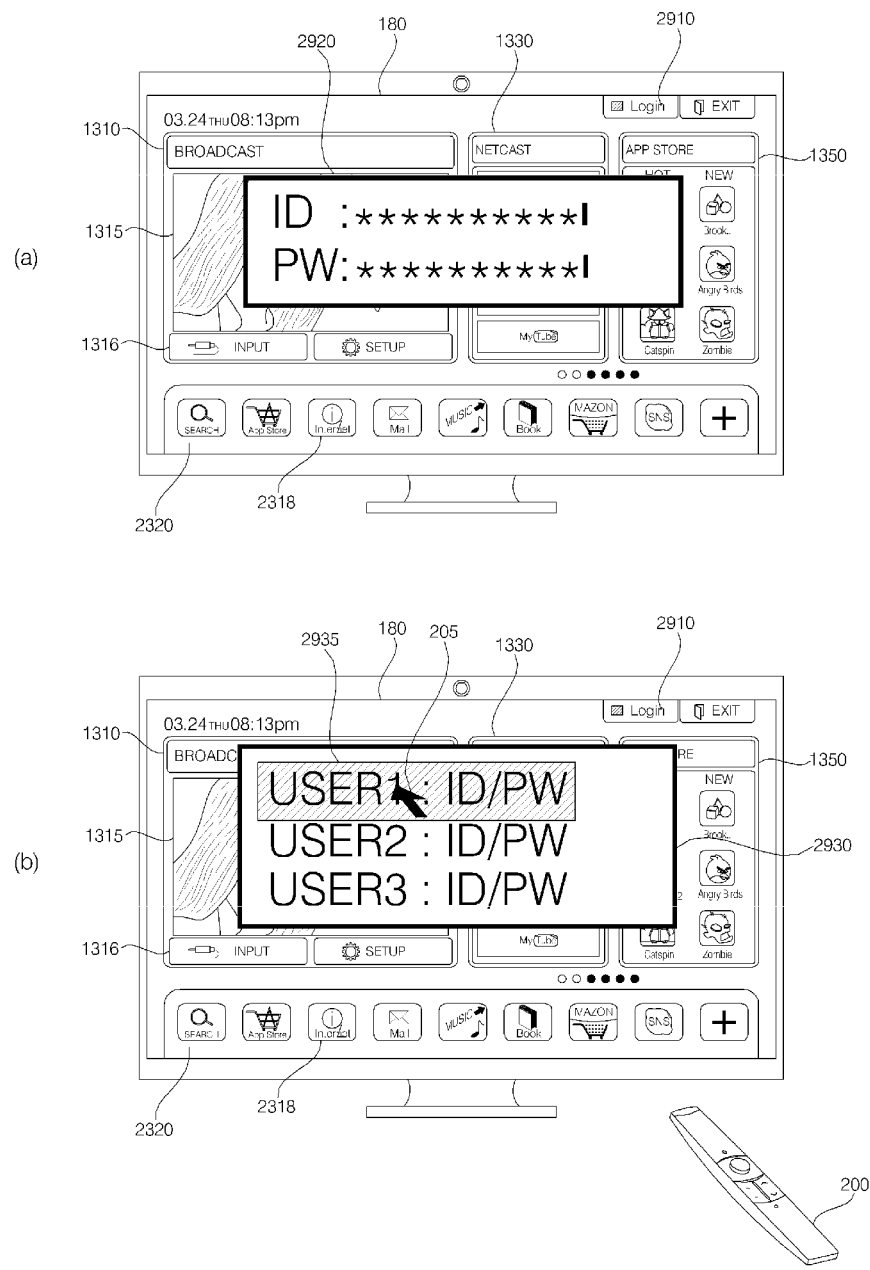

FIG. 40 illustrates exemplary selection of the login menu item 2910 displayed on the display 180, using the pointer 205 of the remote controller 200. Upon selection of the login menu item 2910, a login menu 2920 or 2930 may be displayed as illustrated in FIG. 41.

The login menu 2920 or 2930 may be displayed as a pop-up window, to which the present invention is not limited. Thus, the login menu 2920 or 2930 may be displayed as an independent login screen on the display 180.

Referring to FIG. 41(a), the user may enter login information (an ID and a password) directly into the login menu 2920, for example, using letter keys of the remote controller 200.

Referring to FIG. 40(b), if login information is pre-stored in the memory 140 on a user basis, a user may select his or her login information 2935 in the login menu 2930. In FIG. 41(b), login information of User 1 is selected.

Therefore, the user can log in to the image display apparatus 100.

FIG. 42 illustrates exemplary login of a user to the image display apparatus 100 using the login menu 2920 of FIG. 41. Thus, the login menu item 2910 is replaced with a logout menu item 2915.

In FIG. 42, after the user logs in to the image display apparatus 100, the user selects the setup object 1318 using the pointer 205 of the remote controller 200, with the broadcast image 1315 and the setup object 1318 displayed on the display 180. Therefore, the setup menu 1410 appears as illustrated in FIG. 43.

Figure 43:
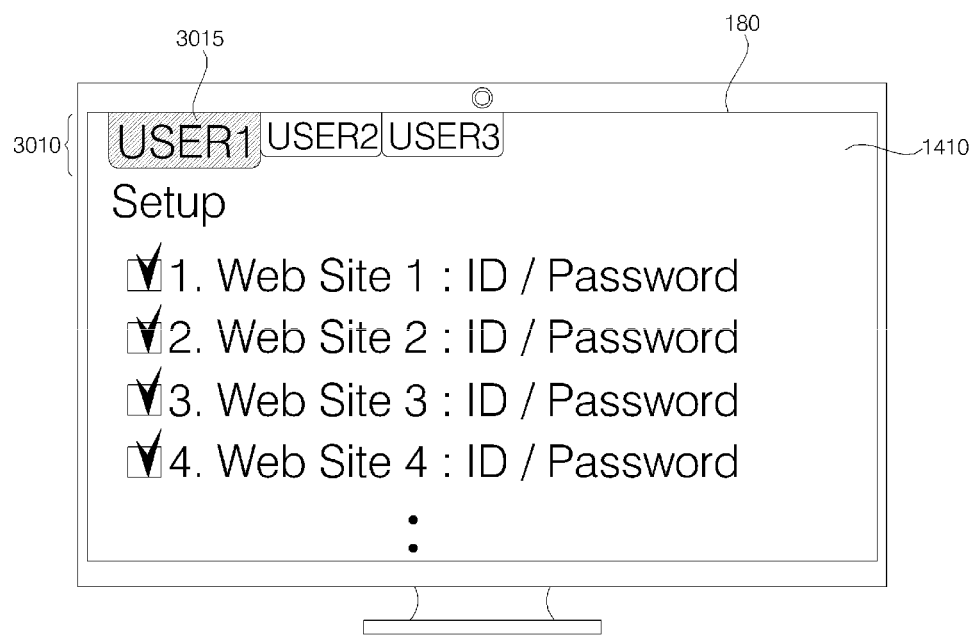

The setup menu 1410 of FIG. 43 is the same as the setup menu 1410 of FIG. 35 in that it may include a Web site list listing a plurality of Web sites along with login information for the Web sites, except that a tab menu 3015 representing a logged-in user is further displayed. In FIG. 43, a Web site list lists a plurality of Web sites for User 1 among User 1, User 2 and User 3 along with login information for the Web sites.

Figure 45:
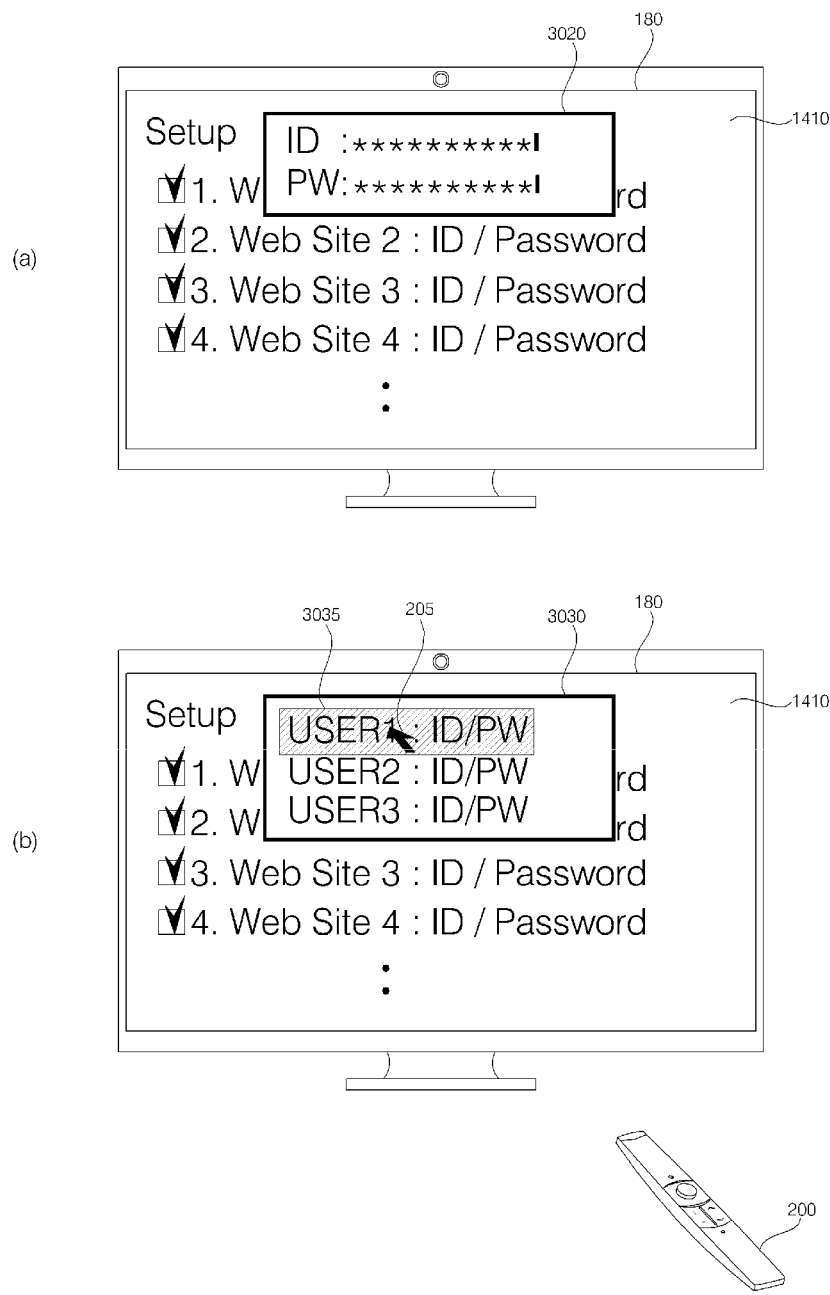

Unlike FIG. 42, FIG. 44 illustrates an example in which the user selects the setup object 1318 using the pointer 205 of the remote controller 200 without logging in to the image display apparatus 100, with the broadcast image 1315 and the setup object 1318 displayed on the display 180. Hence, the setup menu 1410 is entered as illustrated in FIG. 45. Herein, the login menu 3020 or 3030 may be displayed as a popup window on the setup menu 1410.

Referring to FIG. 45(a), the user may enter login information (an ID and a password) directly into a login menu 3020, for example, using letter keys of the remote controller 200.

Referring to FIG. 45(b), in the case where login information is pre-stored for each user in the memory 140, the user may select user login information 3035, herein login information for USER 1.

In this manner, a plurality of Web sites may be set on a user basis. Accordingly, upon selection of the Internet application menu item 2318 in the application menu 2320, a plurality of Web sites to which USER1 subscribed may be automatically logged in.

As is apparent from the above description of the present invention, a plurality of social network services are displayed on at least a part of a display in such a manner that a user can identify other users subscribed to each social network service at one time. Therefore, user convenience can be increased.

The plurality of social network services are distinguishably displayed to the user. Especially, the social network services are represented as icons, thereby allowing the user to readily identify them.

Objects representing other users or electronic devices logged into the plurality of social network services are displayed distinguishably from objects representing other users or electronic devices logged out from the plurality of social network services. Thus, the user can easily tell the logged-in users or electronic devices from the logged-out users or electronic devices.

When one of a plurality of objects is focused on, a menu including information about a user or electronic device represented by the focused object and available service menu items for the user or electronic device is displayed so that the user can easily get to know the user or electronic device.

A Web site list listing a plurality of Web sites along with login information for the Web sites is stored. Hence, the user can automatically log in to the plurality of Web sites. Especially since the Web sites are accessed on a user basis, user convenience can be increased.

The user convenience can be further increased because the image display apparatus provides the user with various user interfaces.

The image display apparatus and the method for operating the same according to the foregoing exemplary embodiments are not restricted to the embodiments set forth herein. Therefore, variations and combinations of the embodiments set forth herein may fall within the scope of the present invention.

The method for operating an image display apparatus according to the foregoing exemplary embodiments may be implemented as code that can be written on a computer-readable recording medium and thus read by a processor. The computer-readable recording medium may be any type of recording device in which data is stored in a computer-readable manner. Examples of the computer-readable recording medium include a ROM, a RAM, a CD-ROM, a magnetic tape, a floppy disc, optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. An image display apparatus remotely controlled by a remote controller, comprising:
    a tuner;
    a display;
    a controller operatively connected to the display to present various user interfaces, wherein the controller is configured to:
    in response to a first input from the remote controller, display a user interface for setting login information of a plurality of social network services (SNSs) on the display;
    in response to a second input from the remote controller, store the login information of the plurality of social network services (SNSs) set by the user in a memory, wherein the memory further stores information regarding a frequency band used to wirelessly transmit signals to or wirelessly receive signals from the image display apparatus paired with the remote controller;
    in response to a third input from the remote controller, display a home screen on the display, wherein the home screen includes at least a broadcast image on a first area of the home screen based on a broadcast signal received from the tuner, an application menu displays a plurality of application menu items on a second area of the home screen, and an app store object displays a list of applications available in the app store on a third area of the home screen;
    in response to a fourth input from the remote controller for selecting an SNS application menu item in the application menu, execute an SNS application and replace the app store object on the third area of the home screen with a total SNS object displaying a plurality of objects representing other users or electronic devices subscribed to the plurality of SNSs based on the stored login information of the plurality of social network services (SNSs) set by the user;
    wherein the remote controller includes:
    an IR module for transmitting an IR signal corresponding to a power on/off command, a channel switch command, or a volume change command;
    an RF module configured to transmit motion information representing movement of the remote controller and display a pointer on the display based on the transmitted motion information from the remote controller;
    letter keys for entering identification information and a password for the login information of each of the plurality of SNSs;
    a predetermined button for performing predetermined operations, wherein when the remote controller is moved away from the display while one of the predetermined buttons of the remote controller is pressed, a selected area corresponding to the pointer is zoomed in the display, wherein when the remote controller is approached toward the display while the one of the predetermined buttons of the remote controller is pressed, the selected area corresponding to the pointer is zoomed out in the display, and while the predetermined button is pressed in the remote controller, only back and forth movements of the remote controller to the display are sensed, while up, down, left and right movements of the remote controller are ignored.

2. The image display apparatus of claim 1, wherein the controller is further configured to change a channel of the broadcast image on the first area of the home screen on the display in response to a user input from the remote controller, and to display a broadcast image of the changed channel.

3. The image display apparatus of claim 1, wherein the total SNS object displayed on the third area of the home screen on the display comprises a plurality of other users SNSs ID information or images representing the other users of the SNSs.

4. The image display apparatus of claim 3, wherein the controller is further configured to, in response to a user input from the remote controller for focusing or selecting one of the other users SNSs ID information or image representing the other user of the SNSs, display a pop-up window including at least one of a video call item, a voice call item, a message item, and a data share item.

5. The image display apparatus of claim 1, wherein the controller is further configured to, in response to the fourth input from the remote controller, execute a total SNS application and access a plurality of SNSs servers for providing the plurality of SNSs of the user and other users.

6. The image display apparatus of claim 1, wherein a size of the broadcast image on the first area is greater than a size of the total SNS object on the third area in the home screen.

7. The image display apparatus of claim 1, wherein the controller is further configured to, in response to a user input from the remote controller for selection a login menu item displayed on the home screen, display a login information including the user's ID and password for logging in to the image display apparatus.

8. The image display apparatus of claim 7, wherein the controller is further configured to display the login information including the user's ID and password as a pop-up window.

9. The image display apparatus of claim 1, wherein the controller is further configured to:
    display a plurality of other users IDs for logging in to the image display apparatus,
    in response to a user input from the remote controller, select a first user ID of the plurality of other users IDs and execute login to the image display apparatus using the selected first user ID.

10. The image display apparatus of claim 9, wherein the controller is further configured to:
    after executing login to the image display apparatus using the selected first user ID, replace the login menu item displayed on the home screen with a logout item.

11. The image display apparatus of claim 1, wherein the controller is further configured to:
    select the SNS application item in the application menu displayed on the second area of the home screen based on the pointer of the remote controller, and
    execute the SNS application in response to a selection of the SNS application item based on the pointer of the remote controller.

12. The image display apparatus of claim 1, wherein the remote controller further includes:
    a gyro sensor configured to sense movement of the remote controller; and
    an acceleration sensor configured to sense speed of the remote controller,
    wherein the RF module is configured to transmit the motion information representing movement of the remote controller based on information from the gyro sensor and the acceleration sensor.

* * * * *